(12) United States Patent
Kusaka et al.

(10) Patent No.: US 7,466,358 B1
(45) Date of Patent: Dec. 16, 2008

(54) SOLID-STATE IMAGING DEVICE FOR ENLARGEMENT OF DYNAMIC RANGE

(75) Inventors: Hiroya Kusaka, Hyogo (JP); Shigeo Sakaue, Osaka (JP); Tomoaki Tsutsumi, Osaka (JP); Yasutoshi Yamamoto, Osaka (JP); Masaaki Nakayama, Osaka (JP)

(73) Assignee: Panasonic Corporation, Osaka (JP)

( * ) Notice: Subject to any disclaimer, the term of this patent is extended or adjusted under 35 U.S.C. 154(b) by 1209 days.

(21) Appl. No.: 10/130,696

(22) PCT Filed: Nov. 20, 2000

(86) PCT No.: PCT/JP00/08153

§ 371 (c)(1),
(2), (4) Date: May 22, 2002

(87) PCT Pub. No.: WO01/39490

PCT Pub. Date: May 31, 2001

(30) Foreign Application Priority Data

Nov. 22, 1999 (JP) ................................. 11-331224
May 30, 2000 (JP) .............................. 2000-159907

(51) Int. Cl.
*G03B 7/00* (2006.01)
(52) U.S. Cl. ................. 348/362; 348/221.1; 348/222.1; 348/322
(58) Field of Classification Search ................ 348/322, 348/229.1, 363, 362, 371, 373, 208.13, 221.1, 348/222.1
See application file for complete search history.

(56) References Cited

U.S. PATENT DOCUMENTS

| | | | |
|---|---|---|---|
| 4,179,711 A * | 12/1979 | Nagumo ..................... 348/247 |
| 5,191,409 A * | 3/1993 | Hamaguchi et al. ......... 358/505 |
| 5,608,451 A * | 3/1997 | Konno et al. .................. 348/69 |
| 5,801,773 A * | 9/1998 | Ikeda ....................... 348/229.1 |
| 6,208,382 B1 * | 3/2001 | Glenn ......................... 348/448 |
| 6,744,471 B1 * | 6/2004 | Kakinuma et al. .......... 348/371 |
| 6,801,248 B1 * | 10/2004 | Horiuchi ................ 348/208.13 |
| 6,822,680 B1 * | 11/2004 | Kanda ......................... 348/273 |
| 6,952,234 B2 * | 10/2005 | Hatano ........................ 348/363 |

(Continued)

FOREIGN PATENT DOCUMENTS

JP  62-108678 A  5/1987

(Continued)

OTHER PUBLICATIONS

M. Yoneyama, et al "Hyper-D Signal Processing for Single Chip CCD Color Camera" ITE Technical Report, vol. 22, No. 3, pp. 1-6.

*Primary Examiner*—Tuan Ho
*Assistant Examiner*—Usman Khan
(74) *Attorney, Agent, or Firm*—McDermott Will & Emery LLP

(57) ABSTRACT

An inter-line CCD(IT-CCD) capable of reading signals in two read modes, a field read mode and a frame read mode, is used to control, by a system control means, a CCD exposure and a signal read mode, a short-time exposure signal(Short signal) acquires an image by a field read and a long-time exposure signal(Long signal) acquires an image by a frame read, and these two images are synthesized by a signal synthesizing means to expand a dynamic range.

21 Claims, 53 Drawing Sheets

U.S. PATENT DOCUMENTS

| | | | |
|---|---|---|---|
| 7,098,946 B1 * | 8/2006 | Koseki et al. | 348/229.1 |
| 2002/0057254 A1 * | 5/2002 | Yanai et al. | 348/273 |
| 2002/0057354 A1 * | 5/2002 | Yanai et al. | 348/273 |

FOREIGN PATENT DOCUMENTS

| | | |
|---|---|---|
| JP | 62290982 A * | 12/1987 |
| JP | 4-207581 A | 7/1992 |
| JP | 8-154201 A | 6/1996 |
| JP | 08-154202 | 6/1996 |
| JP | 9-214829 | 8/1997 |
| JP | 9-275527 | 10/1997 |
| JP | 11-075109 | 3/1999 |
| JP | 2001-054009 | 2/2001 |

* cited by examiner

→ Indicates charge movement

Short signal

| | Number of horizontal pixels | | | | | Number of horizontal pixels | | |
|---|---|---|---|---|---|---|---|---|
| Number of lines | 1 | 2 | 3 | | Number of lines | 1 | 2 | 3 |
| 1 | (Ye+Mg)L11 | (Cy+G)L12 | (Ye+Mg)L13 | | 1 | YL11 | YL12 | YL13 |
| 2 | (Ye+Mg)L21 | (Cy+G)L22 | (Ye+Mg)L23 | | 2 | YL21 | YL22 | YL23 |
| 3 | (Ye+G)L31 | (Cy+Mg)L32 | (Ye+G)L33 | | 3 | YL31 | YL32 | YL33 |

$YL11=(Ye+Mg)L11+(Cy+G)L12$
$YL12=(Cy+G)L12+(Ye+Mg)L13$
⋮

Long signal        Long brightness signal

Long brightness signal level

Long brightness signal (Y: Brightness signal, Y=Ye+Mg+Cy+G)

Number of lines

1 | Y Y Y Y Y Y

2 | Y Y Y Y Y Y

3 | Y Y Y Y Y Y

4 | Y Y Y Y Y Y

N/2 | Y Y Y Y Y Y (N/2) lines

Short brightness signal (Y: Brightness signal, Y=Ye+Mg+Cy+G)

(a) Output of brightness signal extraction means 70401 (Short brightness signal)

(b) Output of brightness signal extraction means 12 (Short brightness signal after interpolation processing)

FIG. 29

Number of lines

| | | | | | | |
|---|---|---|---|---|---|---|
| 1 | Ye+Mg | Cy+G | Ye+Mg | Cy+G | Ye+Mg | Cy+G |
| 2 | Ye+Mg | Cy+G | Ye+Mg | Cy+G | Ye+Mg | Cy+G |
| 3 | Ye+G | Cy+Mg | Ye+G | Cy+Mg | Ye+G | Cy+Mg |
| 4 | Ye+G | Cy+Mg | Ye+G | Cy+Mg | Ye+G | Cy+Mg |
| 5 | Ye+Mg | Cy+G | Ye+Mg | Cy+G | Ye+Mg | Cy+G |
| 6 | Ye+Mg | Cy+G | Ye+Mg | Cy+G | Ye+Mg | Cy+G |
| 7 | Ye+G | Cy+Mg | Ye+G | Cy+Mg | Ye+G | Cy+Mg |
| 8 | Ye+G | Cy+Mg | Ye+G | Cy+Mg | Ye+G | Cy+Mg |

| | | | | | | |
|---|---|---|---|---|---|---|
| N | Ye+G | Cy+Mg | Ye+G | Cy+Mg | Ye+G | Cy+Mg |

| | | | | | | | |
|---|---|---|---|---|---|---|---|
| 3 | Ye+G | Cy+Mg | Ye+G | Cy+Mg | Ye+G | Cy+Mg | 2B−G |
| 4 | Ye+G | Cy+Mg | Ye+G | Cy+Mg | Ye+G | Cy+Mg | 2B−G |
| 5 | Ye+Mg | Cy+G | Ye+Mg | Cy+G | Ye+Mg | Cy+G | 2R−G |
| 6 | Ye+Mg | Cy+G | Ye+Mg | Cy+G | Ye+Mg | Cy+G | 2R−G |
| 7 | Ye+G | Cy+Mg | Ye+G | Cy+Mg | Ye+G | Cy+Mg | 2B−G |

(a) Synthesis signal (b) Signal inputted into synchronizer means 19

Signal on solid-state imaging element 3

Short signal (a) Short signal before interpolation processing (b) Short signal after interpolation processing

FIG. 47

| G | R | G | R | G |
|---|---|---|---|---|
| B | G | B | G | B |
| G | R | G | R | G |
| B | G | B | G | B |
| G | R | G | R | G |
| B | G | B | G | B |

FIG. 48

| G | R | G | B | G |
|---|---|---|---|---|
| R | G | B | G | R |
| G | R | G | B | G |
| R | G | B | G | R |
| G | R | G | B | G |
| R | G | B | G | R |

FIG. 51

Horizontal direction →

Vertical direction ↓

| G | R | B | G | R |
|---|---|---|---|---|
| R | B | G | R | B |
| B | G | R | B | G |
| G | R | B | G | R |
| R | B | G | R | B |
| B | G | R | B | G |

FIG. 52

Horizontal direction →

Vertical direction ↓

| R | G | R | G | R |
|---|---|---|---|---|
| R | G | R | G | R |
| B | G | B | G | B |
| B | G | B | G | B |
| R | G | R | G | R |
| R | G | R | G | R |

FIG. 62

| | | | | | |
|---|---|---|---|---|---|
| 1 | 9 | 17 | 25 | 33 | 41 |
| 2 | 10 | 18 | 26 | 34 | 42 |
| 3 | 11 | 19 | 27 | 35 | 43 |
| 4 | 12 | 20 | 28 | 36 | 44 |
| 5 | 13 | 21 | 29 | 37 | 45 |
| 6 | 14 | 22 | 30 | 38 | 46 |
| 7 | 15 | 23 | 31 | 39 | 47 |
| 8 | 16 | 24 | 32 | 40 | 48 |

First of fields divided into blocks

Outdoor fields

Indoor fields

SOLID-STATE IMAGING DEVICE FOR ENLARGEMENT OF DYNAMIC RANGE

TECHNICAL FIELD

The present invention relates to a solid-state imaging device capable of expanding the dynamic range of picked up images.

BACKGROUND ART

Heretofore, a solid-state imaging device for synthesizing two image signals having the amount of exposure different from each other to obtain an image signal with a wide dynamic range is disclosed in, for example, the gazette of Japanese Laid-Open Patent No. HEI9-214829 and the gazette of Japanese Laid-Open Patent No. HEI9-275527.

The gazette of Japanese Laid-Open Patent No. HEI9-214829 discloses a digital still camera capable of obtaining an image signal with a wide dynamic range by level shifting two continuous field images picked up by the change of the exposure time, and then synthesizing them into one frame image.

The gazette of Japanese Laid-Open Patent No. HEI9-275527 discloses a digital still camera capable of obtaining an image signal with a wide dynamic range by level shifting a plurality of frame images having a different exposure times obtained from a plurality of CCDs, and then synthesizing them into one frame image.

In addition, there has been known an example of a video camera which expands the dynamic range by using a special CCD capable of reading a long-time exposure signal and a short-time exposure signal within one field period ("Development of method of processing single-plate Hyper-D color camera signal," Image Media Society Technical Report, Vol. 22, No. 3, pp. 1-6 (1998)).

However, for example, in the digital still camera disclosed in the gazette of Japanese Laid-Open Patent No. HEI9-214829, two continuous field images picked up by the change of the exposure time are synthesized, so that the image after synthesized only has an image resolution for one field, that is, a resolution of a half of the number of pixels of CCD, whereby a short in the resolution of picked up image is concerned about.

On the other hand, in the digital still camera disclosed in the gazette of Japanese Laid-Open Patent No. HEI9-275527, image signals having a different exposure times picked up by a plurality of CCDs are synthesized, so that the image after synthesized has an image resolution for one frame, that is, a resolution for the number of pixels of CCD, and however, a plurality of CCDs are required, which is disadvantageous in the size/cost of the imaging device.

For the imaging device having been reported in "Development of method of processing single-plate Hyper-D color camera signal," Image Media Society Technical Report, Vol. 22, No. 3, pp. 1-6 (1998), a special CCD is required to expand the dynamic range of picked up images.

It is an object of the present invention to provide a solid-state imaging device capable of picking up an image with an expanded dynamic range at a lower cost and at an image resolution equivalent to the number of pixels of CCD by using one CCD used generally with such a solid-state imaging device regardless of consumer or business applications.

DISCLOSURE OF THE INVENTION

The solid-state imaging device of the present invention has a solid-state imaging element for outputting a plurality of image signals having different exposure times, and signal synthesizer means for synthesizing image signals outputted from the above-mentioned solid-state imaging element; at least one of image signals outputted from the above-mentioned solid-state imaging element by the signal synthesizer means is processed as an image signal having a small number of pixels than other image signals, thereby allowing an image with an expanded dynamic range to be picked up at an image resolution equivalent to the number of pixels of CCD.

BRIEF DESCRIPTION OF THE DRAWINGS

FIG. 29 is an illustrative view to explain a synthesization processing by the synthesizer means in Embodiment 3 of the present invention.

FIG. 47 is a view showing another example of the arrangement of color filters formed on the solid-state imaging element (of bayer method).

FIG. 48 is a view showing another example of the arrangement of color filters formed on the solid-state imaging element (of inter-line method).

FIG. 51 is a view showing another example of the arrangement of color filters formed on the solid-state imaging element (of diagonal stripe method).

FIG. 52 is a view showing another example of the arrangement of color filters formed on the solid-state imaging element (of G stripe RB line sequential method).

FIG. 62 is a typical view showing a state of the screen block division in Embodiment 7 of the present invention.

BEST MODE FOR CARRYING OUT THE INVENTION

Embodiment 1

Figure 1:
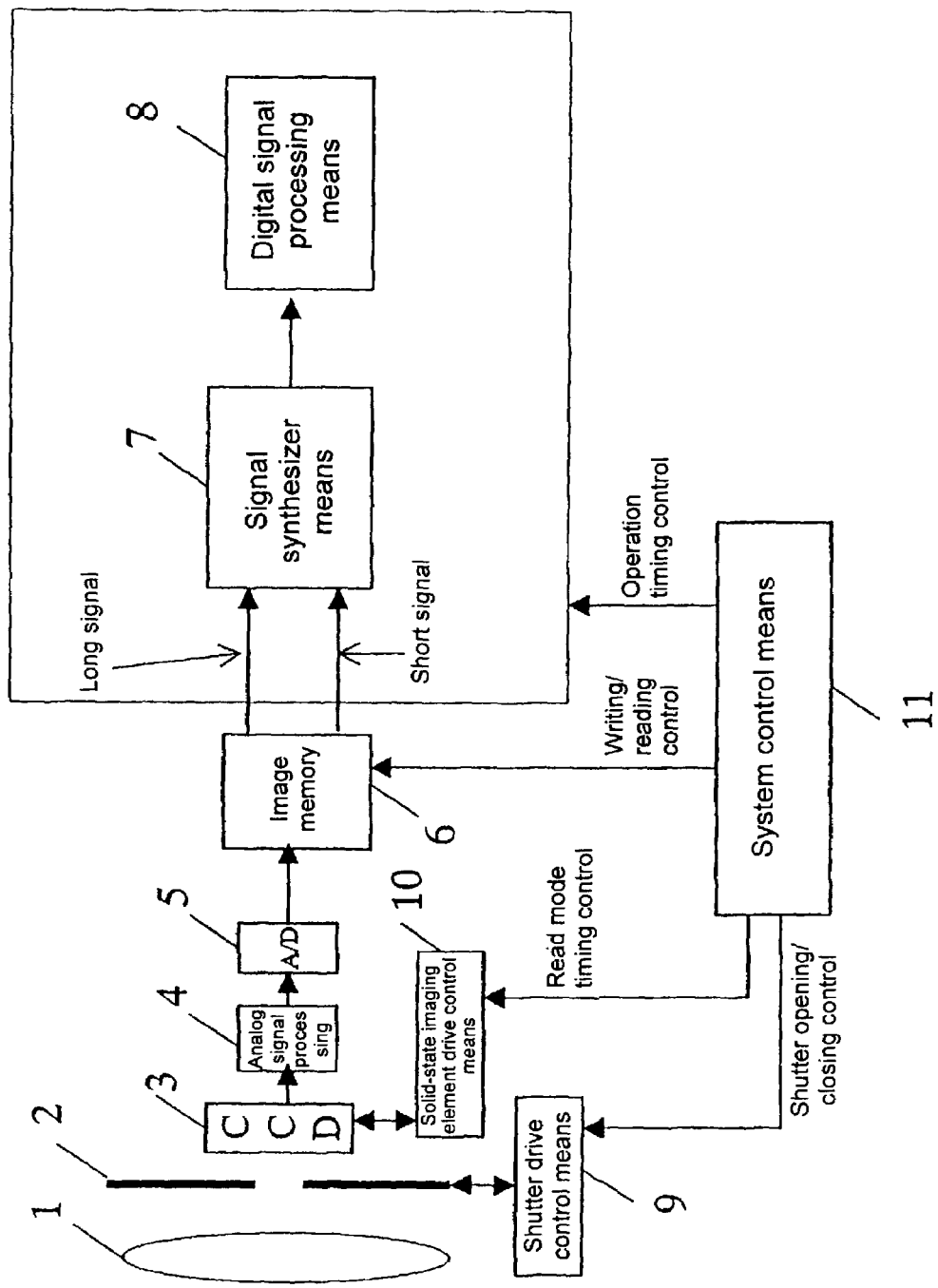
FIG. 1 is a block diagram showing a solid-state imaging device according to Embodiment 1 of the present invention.

FIG. 1 is a block diagram of a solid-state imaging device in a best mode (hereinafter called Embodiment 1) in order to carry out the present invention. In the diagram, the numeral 1 designates an optical lens; the numeral 2, a mechanical shutter as light shutter means also used for an optical aperture; and the numeral 3, a solid-state imaging device, the solid-state imaging device being an inter line transfer CCD (IT-CCD) generally used with a consumer solid-state imaging device. Other than the CCD, there are a frame inter-line transfer CCD (FIT-CCD) and a CMOS sensor. The numeral 4 designates an analog signal processing means consisting of a co-related double sampling circuit and of an automatic gain control (AGC) circuit; the numeral 5, an A/D converter means; the numeral 6, an image memory for storing an image signal converted to a digital signal by the A/D converter means 5; and the numeral 7, signal synthesizer means for synthesizing two-system image signals read from the image memory 6.

A signal obtained by the signal synthesizer means 7 is subject to processings such as separating of brightness signal from color signal, noise removing, edge enhancing, matrix operating, and encoding to a specific format in a digital signal processing means 8. A mechanical shutter drive control means 9 controls the opening or closing of the mechanical shutter 2; and a solid-state imaging element drive control means 10 controls the exposure control, signal read mode and timing of the solid-state imaging element 3. The operation mode and operation timing of all of the above-mentioned components including these means should be controlled integrally by a system control means 11.

Figure 2:
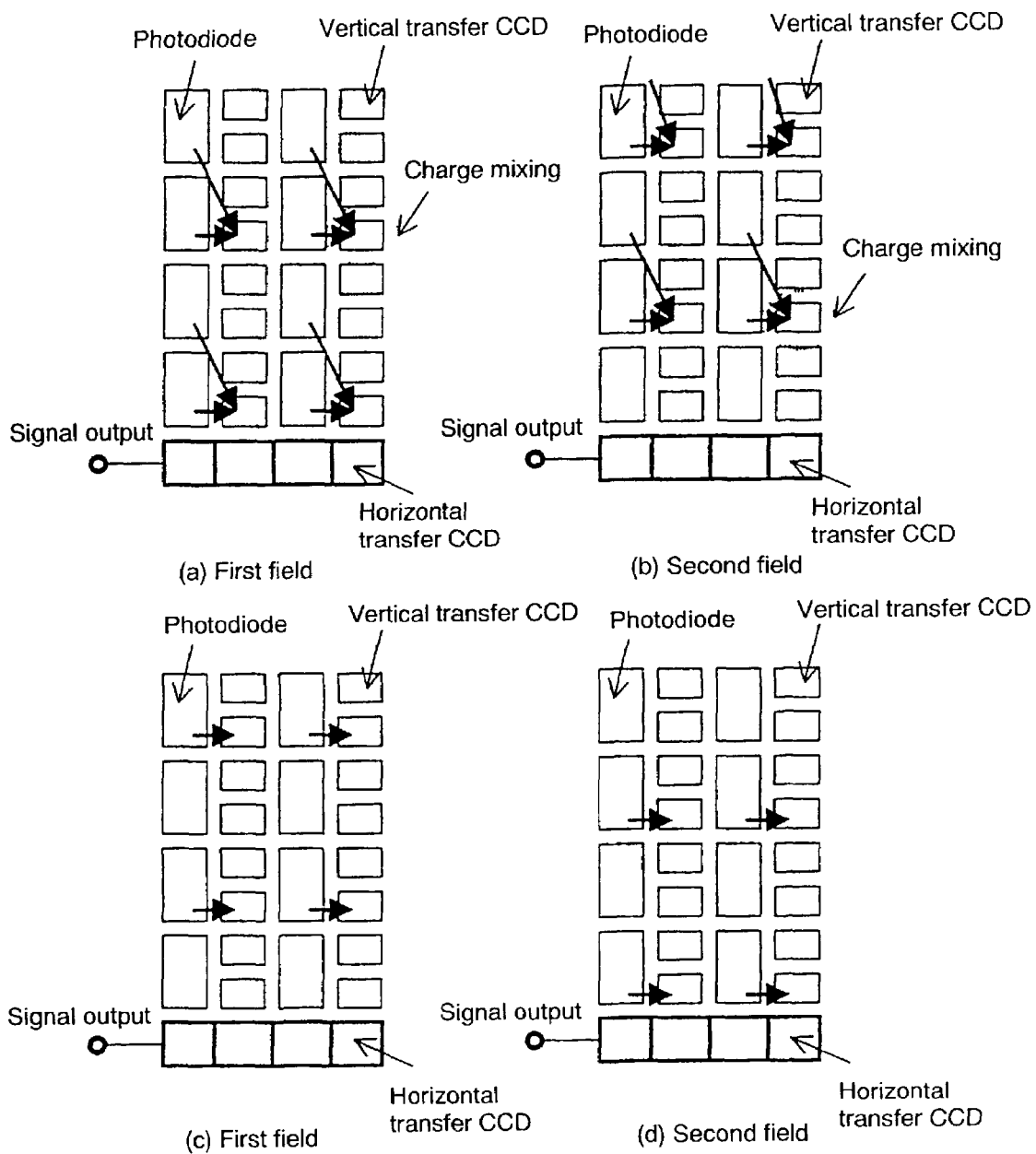
FIG. 2 is an illustrative view of a mode of reading signal from the solid-state imaging device in Embodiment 1 of the present invention.

FIGS. 2(*a*), 2(*b*), 2(*c*) and 2(*d*) are typical views to explain the operation/configuration of the solid-state imaging element 3. The solid-state imaging element 3 is an inter-line transfer CCD (IT-CCD) capable of reading a signal in two read modes of a field read mode and a frame read mode, which for the sake of explanation, will be explained with a configuration consisting of four vertical pixels and two horizontal pixels, the so that 4×2 pixels arranged in the two dimensional plane such as in matrix shape as shown in FIG. 2.

FIGS. 2(*a*) and 2(*b*) are views to explain the field read mode in the IT-CCD. In FIG. 2(*a*), a photodiode as an element for storing a charge corresponding to the amount of an incident light is a portion in which a signal charge according to light intensity by photoelectric conversion is stored, and after a certain time, the accumulated charge is transferred to a vertical transfer CCD by an applied control pulse. At this time, charges of two upper/lower photodiodes adjacent to each other are mixed on the vertical transfer CCD, and outputted through a horizontal transfer CCD to the outside. The above-mentioned operation is the read operation of a first field.

In a second field, as shown in FIG. 2(*b*), a pair of photodiodes mixed on the vertical transfer CCD are dislocated by one pixel in the vertical direction compared to that for the first field. Thus, the signal read for two fields allows said image signal equivalent to one frame of the interlace method to be read.

Using FIGS. 2(*c*) and 2(*d*), the frame read mode will be explained hereinafter. In the frame read mode, first in the first field (FIG. 2(*c*)), the charge accumulated in the photodiode by one pixel jumping in the vertical direction is transferred to the vertical transfer CCD, and then outputted through the horizontal transfer CCD to the outside. In the second field (FIG. 2(*d*)), the charge of the photodiode not transferred to the vertical transfer CCD in the first field is transferred to the vertical transfer CCD, and then outputted through the horizontal transfer CCD to the outside. In this manner, in the frame read mode, the charges on the photodiode are not mixed in the vertical transfer CCD and outputted to the outside. Thus, the signal read for two fields allows said image signal equivalent to one frame of the interlace method to be read.

Figure 3:
FIG. 3 is a view showing an example of the arrangement of color filters formed on the solid-state imaging device in Embodiment 1 of the present invention.

FIG. 3 is an arrangement view of complementary-color checkered type color filters formed on the solid-state imaging element 3. In FIG. 3, Mg represents magenta color; G, green color; Ye, yellow color; and Cy, cyan color. As shown in FIG. 3, one pixel of photodiode corresponds to one-color color filter.

Figure 4:
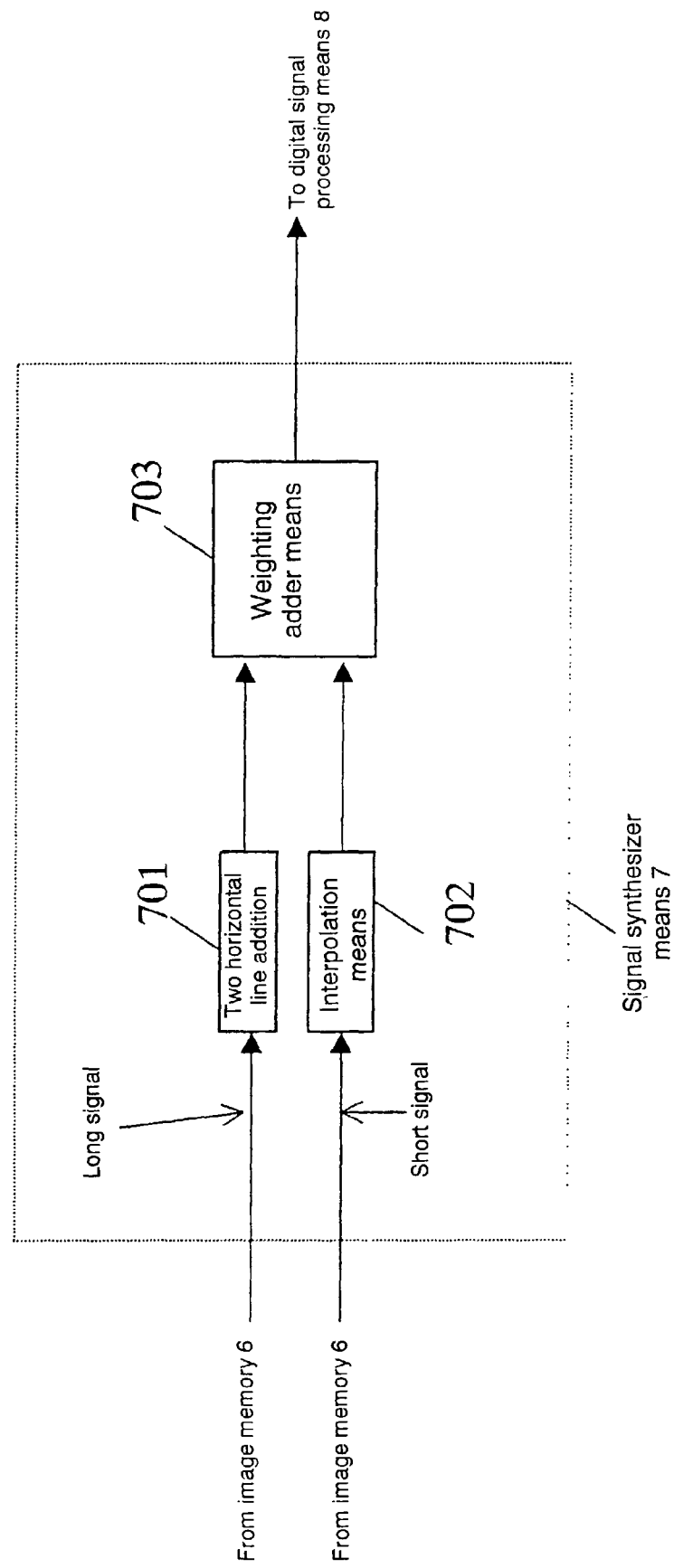
FIG. 4 is a block diagram showing a configuration of signal synthesizer means in Embodiment 1 of the present invention.

FIG. 4 is a block diagram showing a configuration example of the signal synthesizer means 7. In the diagram, the numeral 701 designates two horizontal line adder means for adding image signals for two horizontal scan lines of said image signals outputted from the image memory 6 (hereinafter, an image signal equivalent to the horizontal scan line is called simply the horizontal line or the horizontal line signal). The numeral 702 designates interpolation means for interpolating in the vertical direction said image signals outputted from the image memory 6. Weighting adder means 703 weights and adds the output from the two horizontal line adder means 701 and the interpolation means 702.

Figure 5:
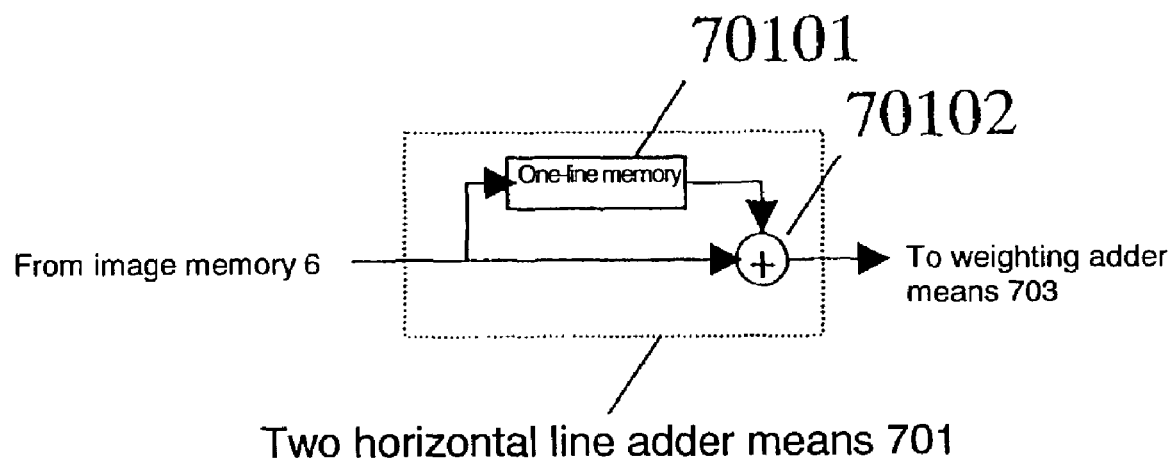
FIG. 5 is a block diagram showing a configuration of two horizontal line adder means in Embodiment 1 of the present invention.

FIG. 5 is a block diagram showing a configuration example of the two horizontal line adder means 701. In the diagram, the numeral 70101 designates a one-line memory which is means for delaying by one horizontal synchronous period said image signal for one line outputted from the image memory 6. The numeral 70102 designates an adder in which the horizontal line signal delayed at the one-line memory 70101 and the horizontal line signal inputted into the two horizontal line adder means 701 are added to cause two upper/lower lines adjacent to each other to be added.

Figure 6:
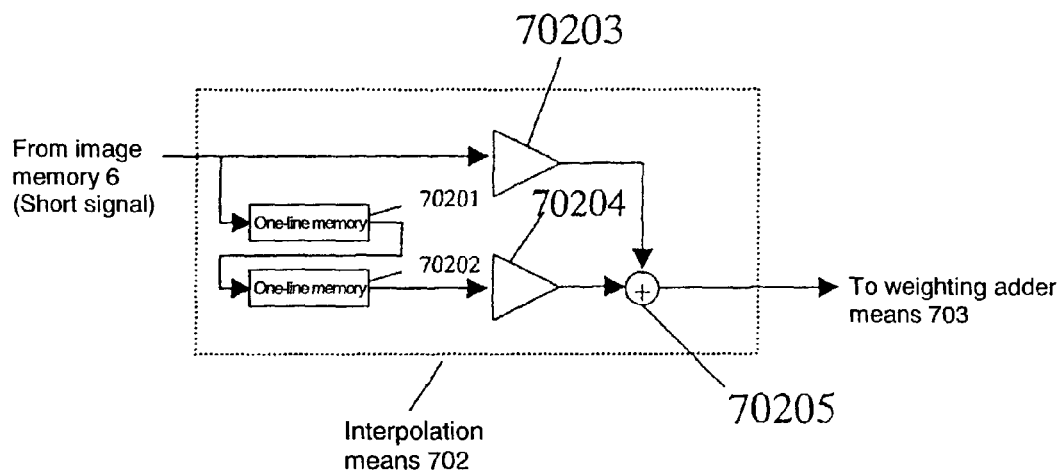
FIG. 6 is a block diagram showing a configuration of interpolation means in Embodiment 1 of the present invention.

FIG. 6 is a block diagram showing a configuration of the interpolation means 702. In the diagram, the numerals 70201 and 70202 designate one-line memories which are meanss for delaying by one horizontal synchronous period said image signal for one line outputted from the image memory 6. The numerals 70203 and 70204 designate amplifier means for multiplying the input signal from the image memory 6 and the output signal of the one-line memory 70202 by a certain gain. The numeral 70205 designates an adder for adding the signals multiplied by the gain at the amplifier means 70203 and 70204.

Figure 7:
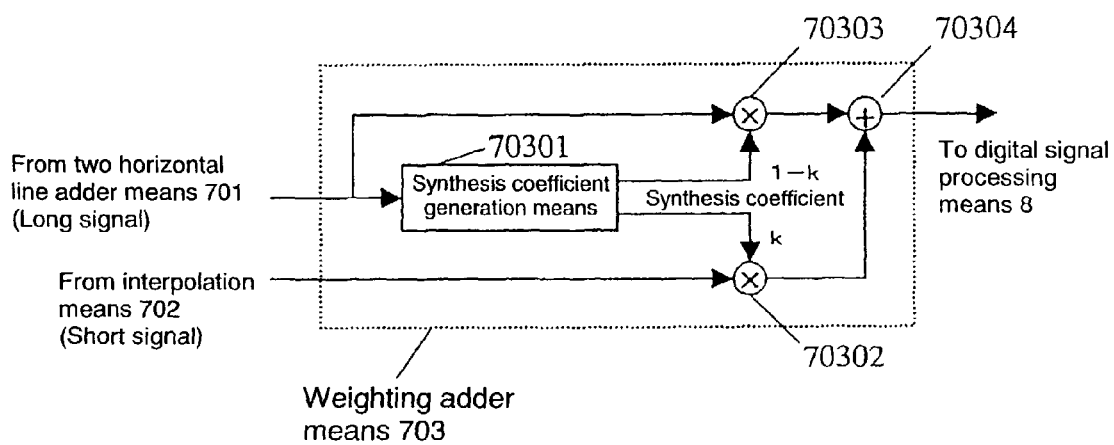
FIG. 7 is a block diagram showing a configuration of weighting adder means in Embodiment 1 of the present invention.

FIG. 7 is a block diagram showing a configuration of the weighting adder means 703. In the diagram, the numeral 70301 designates synthesis coefficient generation means for generating a coefficient k ($1 \geq k \geq 0$) according to the signal level for each pixel of the signals through the two horizontal line adder means 701 and giving k value and 1−k value to multipliers 70302 and 70303. The multipliers 70302 and 70303 multiply the signal through the interpolation means 702 and the signal through the two horizontal line adder means 701 by k value and 1−k value, the results being added to the adder 70304 to output.

With respect to the solid-state imaging device of the present invention configured as described above, the operation thereof will be explained hereinafter.

Figure 8:
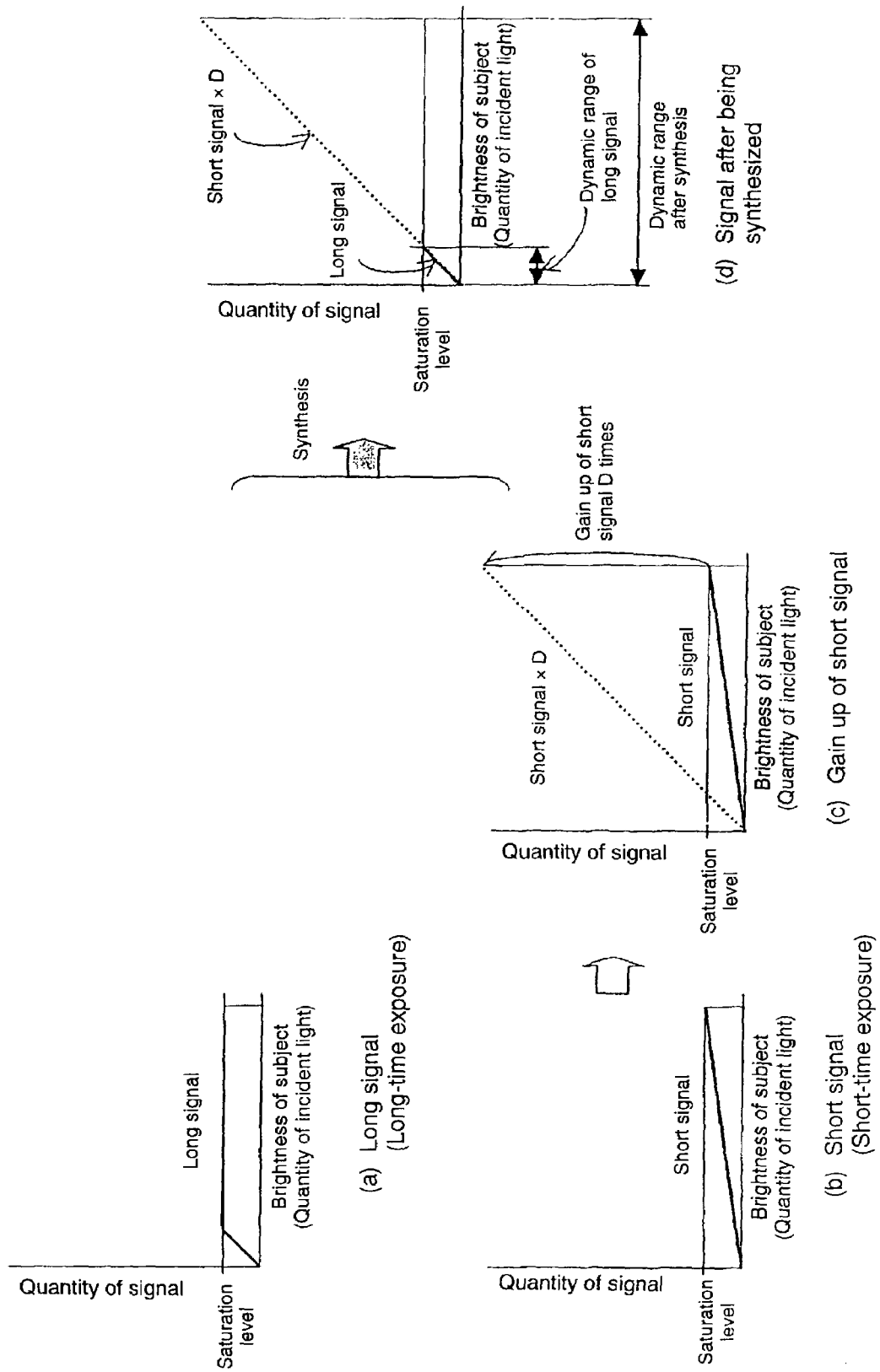
FIG. 8 is an illustrative view to explain the principle of the dynamic range expansion in Embodiment 1 of the present invention.

This device is wherein it picks up two images of a short-time exposure signal (hereinafter called the short signal) and a long-time exposure signal (hereinafter called the long signal), and synthesizes the two images to pick up an image with an expanded dynamic range. The principle of such a dynamic range expansion will be explained using FIG. 8. FIGS. 8(*a*)

and 8(b) show a relationship between the brightness of a subject when exposed (amount of incident light to the solid-state imaging element) and the quantity of the signal outputted from the solid-state imaging element. As shown in FIG. 8(a), at a long-time exposure, the amount of the charge generated on the photodiode of the solid-state imaging element by the incident light becomes large, and thus naturally the quantity of the outputted signal becomes large. However, the amount of the charge accumulated on the photodiode has an upper limit, and when exceeding the upper limit, an phenomenon of saturation, that is, a broken signal occurs, so that the subject image cannot be correctly reproduced. On the contrary, as shown in FIG. 8(b), setting the exposure time at short allows the saturation to be avoided, which in turn causes the S/N of the low brightness portion in the subject to be degraded. Thus, using the signal obtained by a long-time exposure (the long signal) and the signal obtained by a short-time exposure (the short signal), synthesizing an image consisting of the long signal for the low brightness portion and of short signal for the high brightness portion allows the subject to be reproduced from the low brightness portion to the high brightness portion, thereby allowing the dynamic range of the imaging device to be expanded. At this time, after multiplying the short signal by a gain equivalent to the ratio in the amount of exposed light to the long signal (the ratio in exposure time) as shown in FIG. 8(c), and synthesizing them allows the expansion of the dynamic range according to the ratio in the amount of exposed light to be achieved as shown in FIG. 8(d). For example, when the ratio in the amount of exposure of the long signal to the short signal is 1:D, the dynamic range can be expanded by D times.

Hereinafter, there will be explained a concrete example of the imaging device capable of expanding the dynamic range of the picked up images according to the above-mentioned principle.

Figure 9:
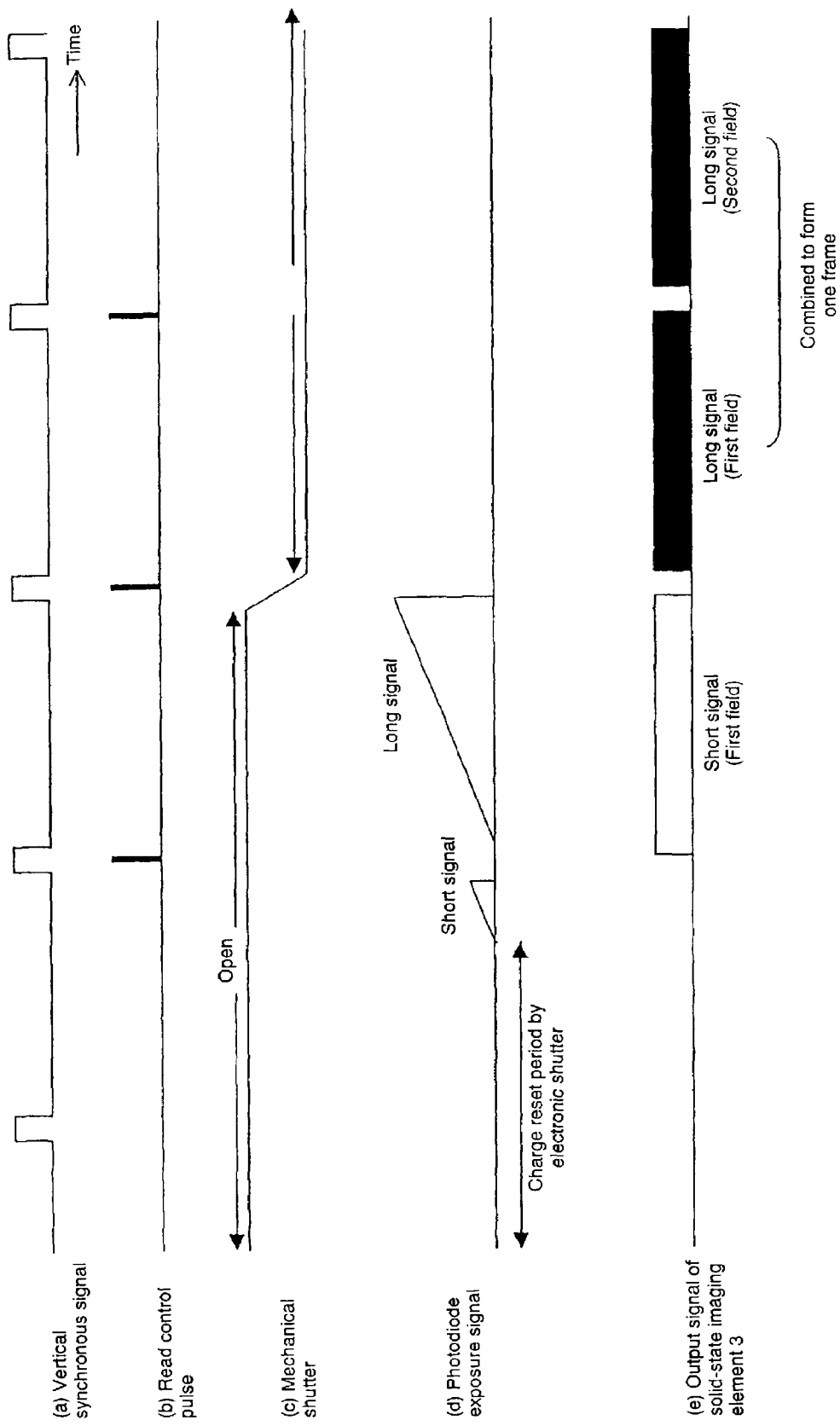
FIG. 9 is an illustrative view to explain the timing of the exposure and read of the long signal and the short signal in Embodiment 1 of the present invention.

First, using FIG. 9, a method of picking up the short signal and the long signal will be explained. FIG. 9 is a timing chart with respect to the exposure of a subject image, and to the read of an exposed signal in the solid-state imaging element 3. In the chart, the item (a) indicates a synchronous signal in the vertical direction; the item (b), a read control pulse for controlling the read of the signal charge from the photodiode of the solid-state imaging element 3; the item (c), the opening/closing state of the mechanical shutter 2; the item (d), an exposure signal on the photodiode of the solid-state imaging element 3; and the item (e), a signal outputted from the solid-state imaging element 3.

Figure 10:
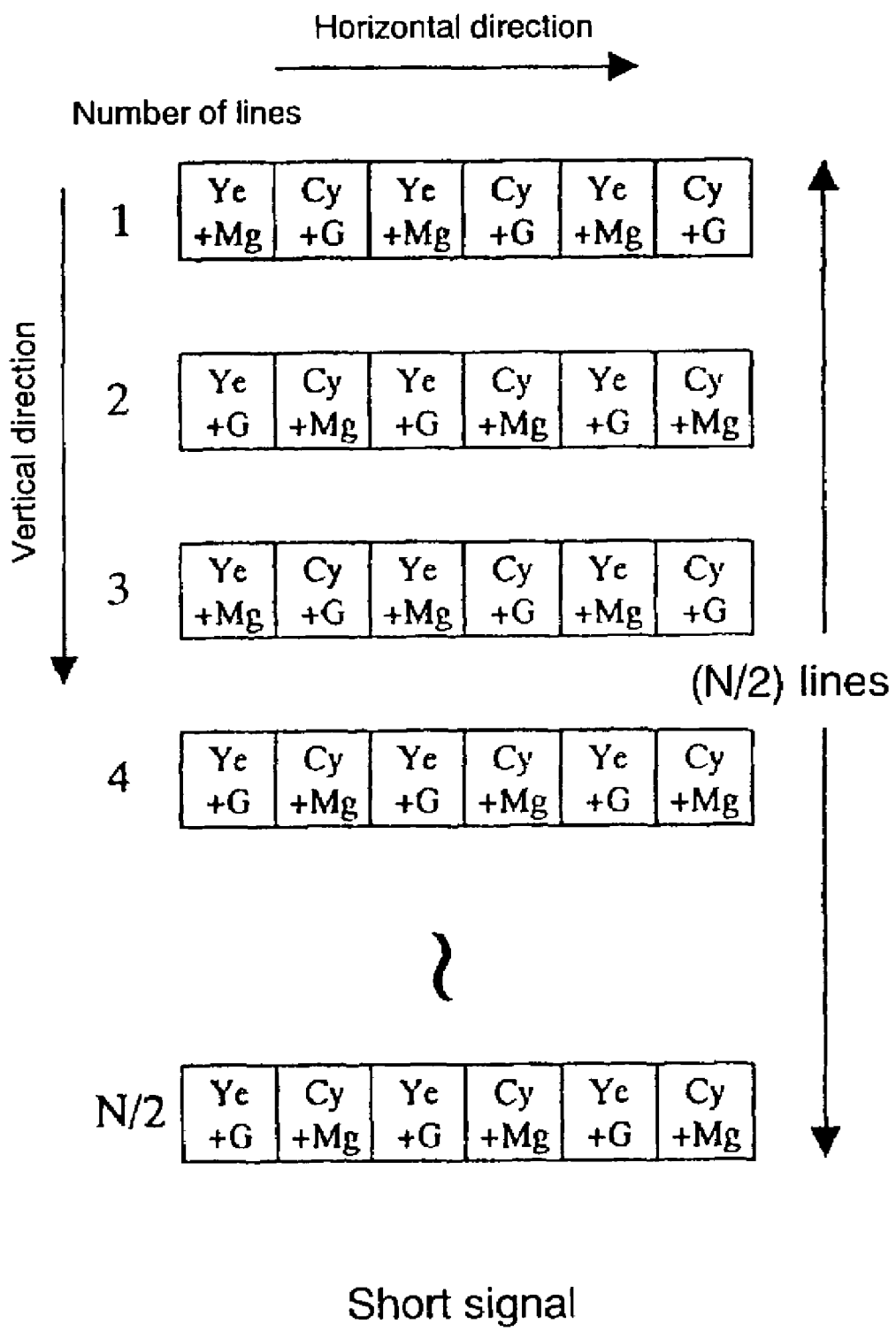
FIG. 10 is an illustrative view to explain the short signal in Embodiment 1 of the present invention.

At the short signal exposure, with the mechanical shutter 2 being opened, using an electrical shutter function, the exposure is performed for a required exposure time, for example, one thousandth of a second. After the exposure for one thousandth of a second is finished, the charge accumulated on the photodiode is moved to the vertical transfer CCD by the read control pulse. At this time, the solid-state imaging element 3 should drive in the field read mode, and as explained in FIG. 2(a), the charges accumulated on the photodiode are mixed on vertical transfer CCD and read to the outside. At this time, said image signal to be read should be only the signal for the first field. FIG. 10 shows the short signal read in the field read mode. The number of the photodiodes in the vertical direction of the solid-state imaging element 3 is taken as N (for the sake of explanation, N is taken as even number, but not limited to it). As shown in FIG. 10, the read short signal becomes four-kind signals Ye+Mg, Cy+G, Ye+G and Cy+Mg obtained by adding four colors Ye, Cy, G and Mg to each other, respectively. The number of the lines in the vertical direction is a half of the number N in the vertical direction of photodiodes.

Then, while reading the short signal, long signal is exposed. The exposure time of the long signal is taken as, for example, one hundredth of a second. The exposure time of the long signal should be controlled by the opening/closing of the mechanical shutter 2, and after one hundredth of a second following the start of the exposure of the long signal, the mechanical shutter 2 is closed to complete the exposure. In this manner, the closing of the mechanical shutter 2 causes the exposed signal for a long time not to be exposed extra during reading.

Figure 11:
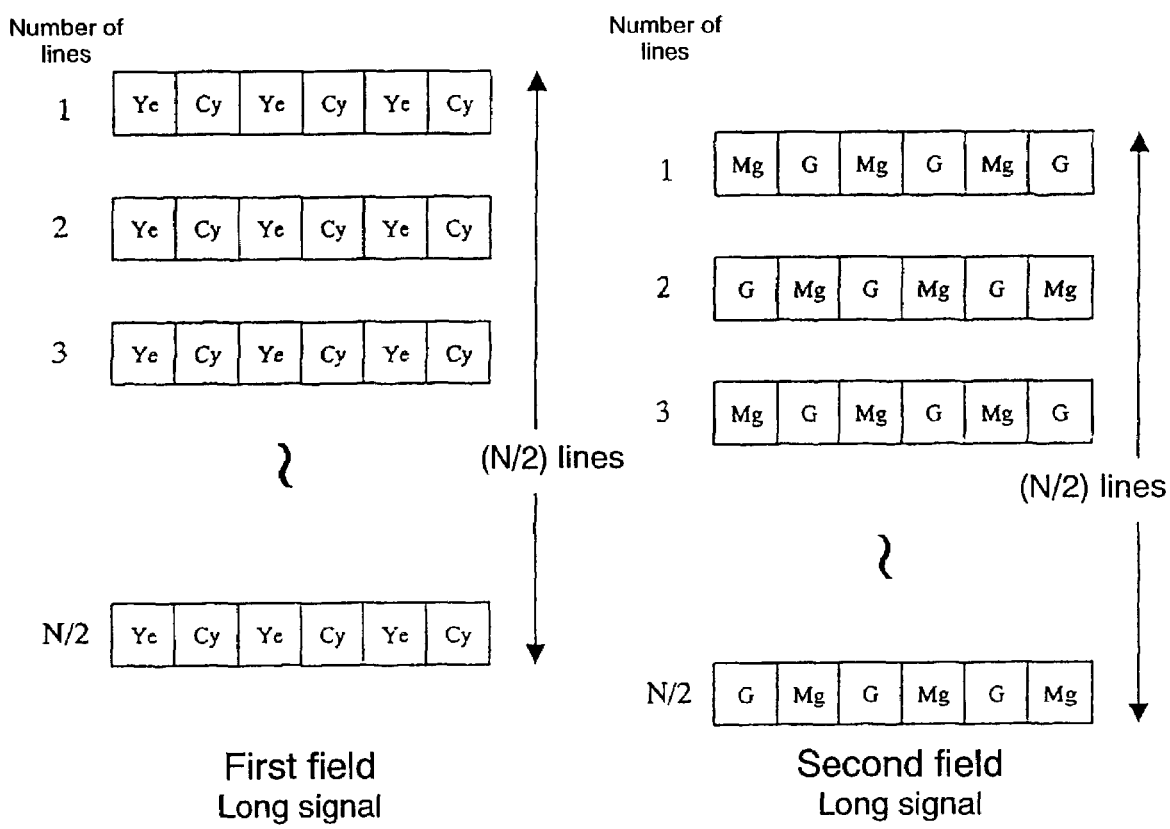
FIG. 11 is an illustrative view to explain the long signal in Embodiment 1 of the present invention.

When the exposure of the long signal is completed, the charge accumulated on the photodiode is transferred to the vertical transfer CCD by the read control pulse. At this time, the solid-state imaging element 3 should drive in the frame read mode, and as explained in FIG. 2(c), the charge of the photodiode equivalent to the odd number line in the vertical direction is read by the first field. After the signal read of the first field is finished, then the charge of the photodiode equivalent to the even number line in the vertical direction is read (the second field), whereby the long signal equivalent to one frame is read from the solid-state imaging element 3. The cycle of the vertical synchronous signal shown in FIG. 9(a) is taken as, for example, one hundredth of a second, and the signal read for one field from the solid-state imaging element 3 should be completed within one cycle of the vertical synchronous signal. FIG. 11 shows the long signal read in the frame read mode. As shown in FIG. 11, the read long signal becomes a signal with two colors of Ye and Cy for the first field, and a signal with two colors of G and Mg for the second field. The number of the lines in the vertical direction is a half of the number N of the photodiodes in the vertical direction for each field, and thus combining the two fields causes the N-line signal equivalent to one frame to be obtained.

The performing the exposure and the signal read as described above allows two signals having different exposure times, that is, the short signal as one field image and the long signal as one frame image to be obtained. The short signal is a half in the number of horizontal lines of the long signal, so that the short signal has a small number of pixels than the long signal.

Then, the two signals with different exposure times obtained by the solid-state imaging element 3 are sent through the analog signal processing means 4, converted by the A/D converter means 5 to digital signals and stored for a time on the image memory 6.

The long signal and the short signal are read from the image memory 6. In reading the long signal from the image memory 6, the long signal should be sequentially read from the leading line when assumed as one frame image in a manner that the first line of the first field, the first line of the second field, followed by the second line of the first field are read. The long signal read from the image memory 6 is sent to the two horizontal line adder means 701. In the two horizontal line adder means 701, the long signals of the two upper/lower lines adjacent to each other when assumed as frame signals are added and mixed. This is because in synthesizing the long signal and the short signal, two signals when being of different signal types cannot be synthesized, so that the long signal is subject to the same processing as the pixel mixing on the vertical transfer CCD of the solid-state imaging element 3 by the two horizontal line adder means 701, while for the short signal, one field image is converted by the interpolation means 702 to one frame image.

FIG. 12(a) shows the long signal after the two upper/lower line signals adjacent to each other are added and mixed in the two horizontal line adder means 701; FIG. 12(b), the short signal before the interpolation processing; and FIG. 12(c), the short signal after the interpolation processing. As shown in FIGS. 12(a) and 12(c), the horizontal line addition processing for the long signal and the interpolation processing for the short signal causes the long signal and the short signal to be matched in the signal type with each other.

In the interpolation means 702, the field image shown in FIG. 12(b) is converted by the interpolation processing to the frame image shown in FIG. 12(c), which method will be explained hereinafter.

For example, when the horizontal line signal between the second line and the third line in FIG. 12(b) is determined, it is necessary to produce a horizontal line signal consisting of the signals Ye+G and Cy+Mg. At this time, the line consisting of the near most signals Ye+G and Cy+Mg are the second line and the fourth line, so that from both the lines, a line between the second line and the third line is determined by the interpolation processing. However, the spatial distances between the position at which the horizontal line signal is determined by the interpolation processing and the second line and the fourth line are not equidistant, so that the weighting becomes necessary according to the distance. Thus, the interpolation means 702 has a configuration such that of the three-line horizontal line signals inputted continuously, the upper/lower end lines except the center line are inputted into the multipliers 70203 and 70204, so that it is sufficient that the numbers to be multiplied in the multipliers 70203 and 70204 are ¼ and ¾, respectively, to be used for weighting, and the multiplied results are added in the adder 70205.

The numbers to be multiplied in the multipliers 70203 and 70204 are decided by the fact that the ratio in spatial distance between the position at which the horizontal line signal is determined by the interpolation processing and the second line and the fourth line is 1:3.

Similarly, when determining a horizontal line signal between the third line and the fourth line by the interpolation processing, it is necessary to produce the horizontal line signal consisting of Ye+Mg signal and Cy+G signal, and at this time, the lines consisting of Ye+Mg signal and Cy+G signal are the third line and the fifth line, so that weighting is performed according to the ratio in distance between both the lines, thereby allowing the line between the third line and the fourth line to be determined by the interpolation processing.

With the above-mentioned processing, a signal equivalent to one frame obtained through the interpolation processing from the long signal for one frame and the short signal for one field is produced.

Means for synthesizing the long signal and the short signal to synthesize a signal with an expanded dynamic range is the weighting adder means 703. In the weighting adder means 703, the synthesis coefficient k according to the signal level for each pixel of the long signal by the synthesis coefficient generation means 70301 shown in FIG. 7 is determined, and the long signal and the short signal which becomes one frame image by the interpolation processing and exists on the same spatial position on the screen are synthesized in one pixel units according to the synthesis coefficient k.

Figure 13:
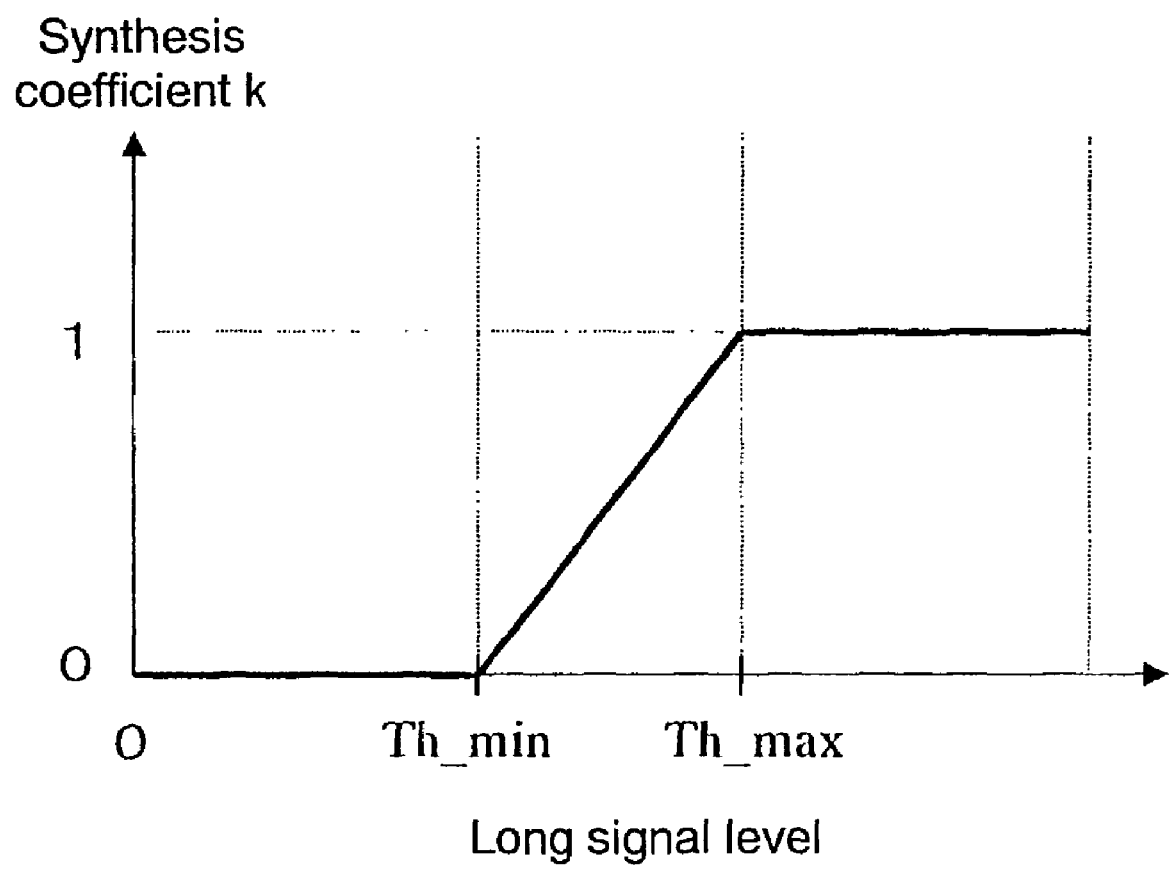
FIG. 13 is a graph to explain a synthesis coefficient deciding method in Embodiment 1 of the present invention.

FIG. 13 is an example of a method of determining the synthesis coefficient k for each pixel from the signal level of the long signal in the synthesis coefficient generation means 70301. As shown in FIG. 13, two thresholds Th_min and Th_max are set for the long signal; when the long signal level is of the expression (1), that is, when the long signal level is Th_min or less and has no possibility of saturation, the synthesis coefficient k is taken as 0, while when the long signal level is of the expression (2), that is, when the long signal level is Th_max or more and the output of the solid-state imaging element is close to the saturation level, the synthesis coefficient k is taken as 1. The thresholds Th_min and Th_max are appropriately determined according to the saturation characteristics of the solid-state imaging element to be used and to the S/N.

$$0 \leq \text{long signal level} \leq Th\_min \quad (1)$$

$$Th\_max \leq \text{long signal level} \quad (2)$$

When the long signal level is of the expression (3), that is, when the long signal level is intermediate, as shown in FIG. 13, the synthesis coefficient k is decided by the linear equation of the equation (4).

$$Th\_min < \text{long signal level} < Th\_max \quad (3)$$

$$K = \{1/(Th\_max - Th\_min)\} \times (\text{long signal level}) - \{Th\_min/(Th\_max - Th\_min)\} \quad (4)$$

Using the synthesis coefficient k thus determined, the long signal and the short signal are synthesized by the equation (5) for each pixel. A signal obtained by synthesizing the long signal and the short signal is taken as a synthesis signal.

$$\text{Synthesis signal} = (1-k) \times \text{long signal} + k \times \text{short signal} \times D \quad (5)$$

Figure 14:
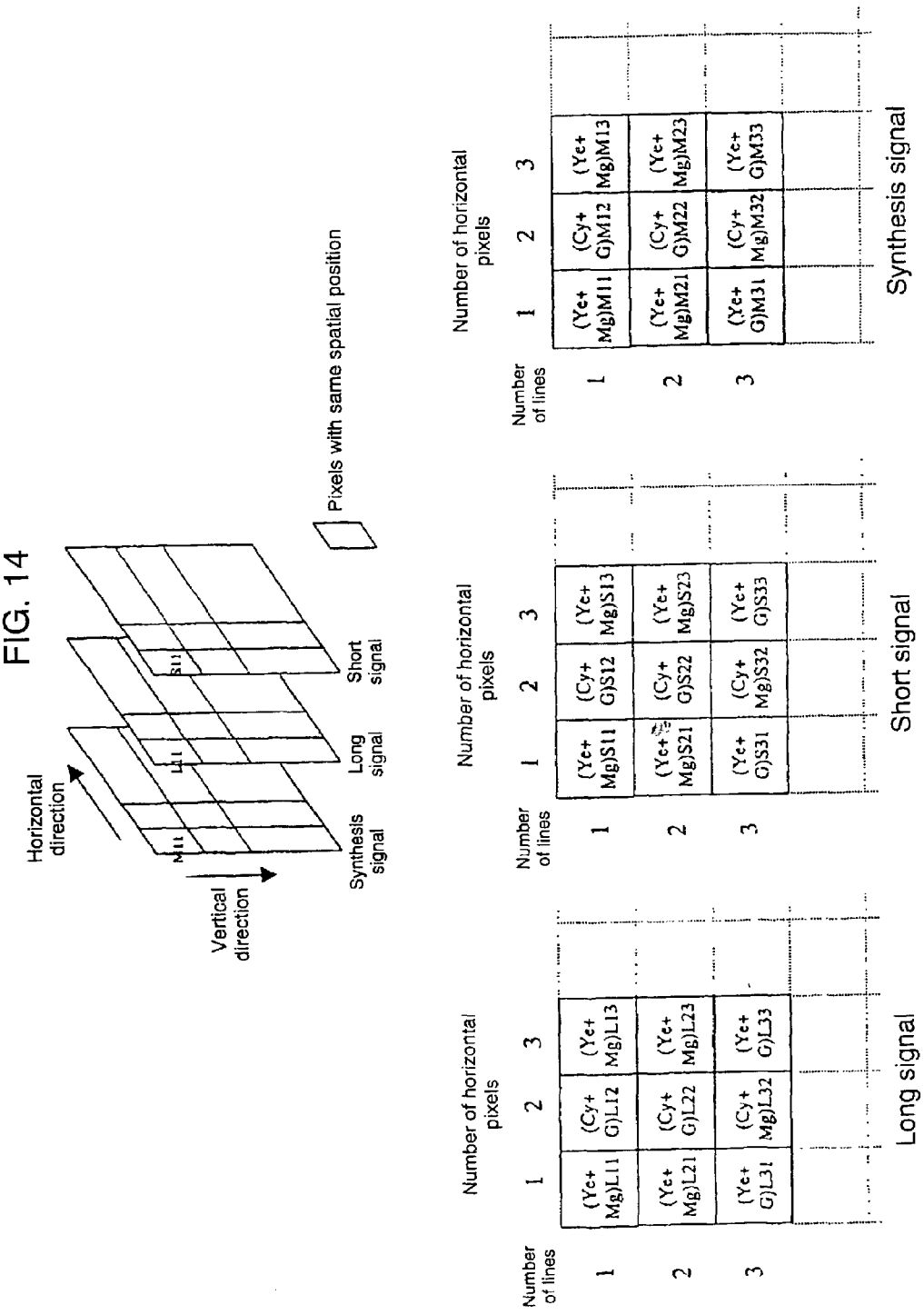
FIG. 14 is an illustrative view to explain a signal synthesis processing method in Embodiment 1 of the present invention.

For example, when determining a synthesis signal (Ye+Mg) M11 from a long signal (Ye+Mg)L11 shown in FIG. 14 and from a short signal (Ye+Mg)S11 having the same spatial position as the (Ye+Mg)L11, expressing the synthesis coefficient decided from the long signal as kill, synthesization is performed by the equation (6).

$$(Ye+Mg)M11 = (1-k11) \times (Ye+Mg)L11 + k11 \times (Ye+Mg)S11 \times D \quad (6)$$

Other pixels of the synthesis signal, as with equation (6), are determined by the long signal and the short signal both of which exist on the same spatial position.

The constant D by which the short signal is multiplied in the equations (5) and (6) is the ratio in the amount of exposed light of the long signal to the short signal (the ratio in the exposure time), and for example, expressing the amount of exposed light of the long signal (exposure time) as TL, and the amount of exposed light of the shot signal (exposure time) as TS, the constant D is determined by the equation (7).

$$D = TL/TS \quad (7)$$

Using the long signal and the short signal in this manner, synthesizing a synthesis signal consisting of the long signal for the portion in which the signal level of the long signal is threshold Th#min or less, of the short signal for the portion in which signal level thereof is threshold Th#max or more, that is, the output of the solid-state imaging element 3 is near saturation (the portion in which the brightness of the picked up image is high, so that the signal would be broken if in normal condition), and of a signal for the intermediate brightness portion in which the long signal and the short signal are weighted and added allows the dynamic range of the picked up image signal to be expanded.

However, of the synthesis signals whose dynamic range is expanded, the portion consisting of the long signal is originally one frame image signal, so that the image resolution is high. On the other hand, the portion consisting of the short signal is synthesized from one field image signal, so that the image resolution is lower than the portion consisting of the long signal. However, generally, it is unusual to develop a condition in which the signal level of the whole image becomes close to saturation, and even in such a condition, the amount of incident light is limited by stopping down the optical aperture, so that the signal level of the whole image becomes hardly a level close to saturation, and thus a condition in which the most of the picked up image is occupied by the portion consisting of the short signal can hardly occur practically. When an image is expressed by limited gradations, a high brightness portion, that is, a high signal level portion is often allocated with fewer gradations than a low/ intermediate brightness portions. Hence, the degradation in the resolution of the portion consisting of the short signal is not so prominent, so that it is considered that synthesizing the long signal and the short signal even by the above-mentioned method causes a synthesis image with a resolution equivalent to the number of pixels of CCD to be obtained.

As described above, a signal synthesized by the signal synthesizer means 7 is subject to processings such as separating of brightness signal from color signal, noise removing, edge enhancing, gamma correcting, matrix operating, and encoding to a specific format in the digital signal processing means 8. The signal processing in the digital signal processing means 8 is not directly related to the object of the present invention, so that a detailed explanation will be omitted.

As described above, the above-mentioned solid-state imaging device controls the exposure of the solid-state imaging element 3 and the signal read mode, picks up the short-time exposure signal for one field and the long-time exposure signal for one frame, and synthesizes these signals, thereby allowing an image whose dynamic range is expanded while having a resolution equivalent to the number of pixels of CCD to be picked up. Further, the solid-state imaging element used with the present solid-state imaging device can use IT-CCD generally used in consumer solid-state imaging devices, so that the device can be configured at a low cost without using a plurality of solid-state imaging elements or a special solid-state imaging element.

In addition to a procedure in that the exposure of the short signal is taken as the first exposure and the exposure of the long signal is taken as the second exposure, and with these exposures, the read sequence of the charge accumulated on the photodiode is set as described above, there may be a procedure in that the exposure of the long signal is taken as the first exposure and the exposure of the short signal is taken as the second exposure, and the read sequence is made reverse.

ANOTHER MODE FOR CARRYING OUT THE INVENTION

In contrast to Embodiment 1, other embodiments 2 through 8 will be explained hereinafter.

Embodiment 2

The solid-state imaging device in Embodiment 2 of the present invention is different from Embodiment 1 of the present invention shown in FIG. 1 in the configuration of the weighting adder means (in Embodiment 2, distinguished from it by numbering 704) and in the processing performed in the means. Hereinafter, the explanation of the processing contents similar to Embodiment 1 of the present invention will be omitted, and only the portion different from Embodiment 1 of the present invention will be explained.

Figure 15:
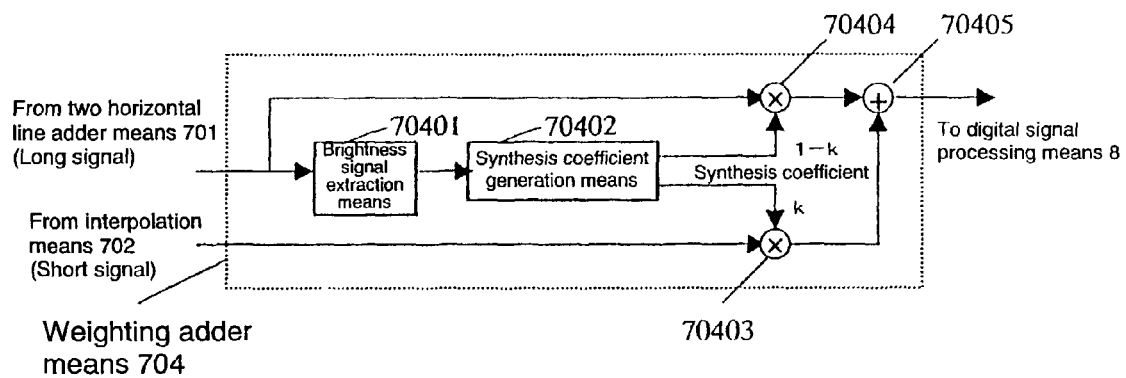
FIG. 15 is a block diagram showing a configuration of the weighting adder means in Embodiment 2 of the present invention.

FIG. 15 is a block diagram of weighting adder means 704 in Embodiment 2 of the present invention. In the diagram, the numeral 70401 designates brightness signal extraction means for extracting a brightness signal component from the long signal passing through the two horizontal line adder means 701. The numeral 70402 designates synthesis coefficient generation means for generating a coefficient k ($1 \geq k \geq 0$) according to the brightness signal level of the brightness component of the long signal through the brightness signal extraction means 70401 and giving k value and 1−k value to multipliers 70403 and 70404. The multipliers 70403 and 70404 multiply the short signal through the interpolation means 702 and the long signal through the two horizontal line adder means 701 by k value and 1−k value, the results being added to the adder 70405 to output.

Figure 16:
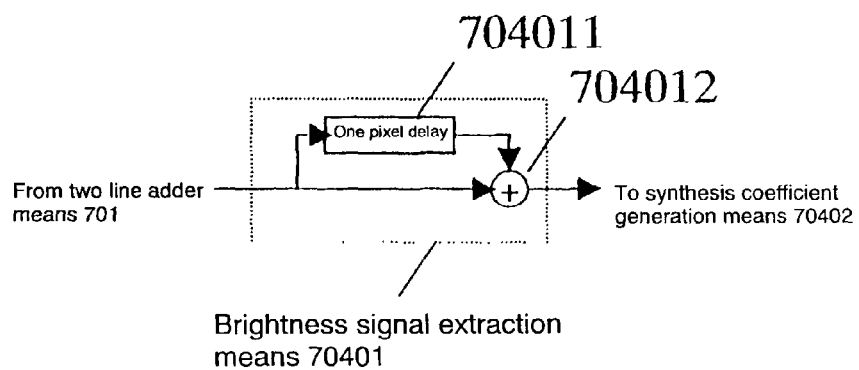
FIG. 16 is a block diagram showing a configuration of brightness signal extraction means in Embodiment 2 of the present invention.

FIG. 16 is a block diagram showing a configuration example of the brightness signal extraction means 70401. In the diagram, the numeral 704011 designates means for delaying by one pixel period the input signal. The numeral 704012 designates an adder for adding said image signal delayed in the one pixel delay means 704011 and said image signal inputted into the brightness signal extraction means 70401 to add two pixels adjacent in the horizontal direction to each other, thereby extracting only the low-pass component of the signal. The low-pass component of the signal extracted by the brightness signal extraction means 70401 is equivalent to the brightness signal of said image signal.

With respect to the solid-state imaging device of Embodiment 2 of the present invention configured as described above, the operation thereof will be explained hereinafter.

Unlike Embodiment 1 of the present invention, in Embodiment 2 of the present invention, the synthesis coefficient used in synthesizing the long signal and the short signal is decided according to the signal level of the brightness signal extracted from the long signal.

Hence, the brightness signal extraction means 70401 as means for extracting the brightness signal from the long signal is provided in the weighting adder means 704.

In the brightness signal extraction means 70401, of the outputs of the two horizontal line adder means 701, two pixel signals adjacent in the horizontal direction to each other are sequentially added, whereby the brightness component of the long signal (hereinafter called the long brightness signal) is extracted on the basis of the following equation (8).

$$\text{Brightness component (brightness signal)} = Ye + Mg + Cy + G \quad (8)$$

For example, when determining the long brightness signal YL11 from the long signal (Ye+Mg) L11 and the long signal (Cy+G) L12, (Ye+Mg) L11 and (Cy+G) L12 are added. Similarly, when determining the long brightness signal YL12, (Cy+G) L12 and (Ye+Mg) L13 are added.

A method of deciding a synthesis coefficient on the basis of the brightness signal extracted from the long signal (long brightness signal) will be explained hereinafter.

Figures 17, 18:
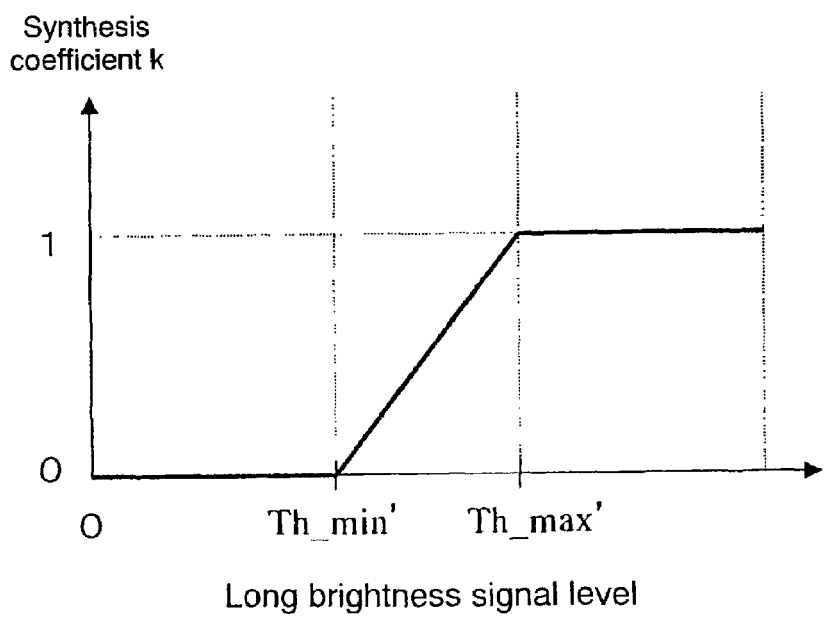
FIG. 17 is an illustrative view to explain a long brightness signal producing method in Embodiment 2 of the present invention.
FIG. 18 is a graph to explain a synthesis coefficient deciding method in Embodiment 2 of the present invention.

FIG. 18 is an example of a method of determining the synthesis coefficient k for each pixel from the signal level of the long brightness signal in the synthesis coefficient generation means 70402. As shown in FIG. 18, two thresholds Th_min' and Th_max' are set for the long brightness signal level; when the long brightness signal level is of the expression (9), that is, when the brightness level of a subject is as low as Th_min' or less, the synthesis coefficient k is taken as 0, while when the long brightness signal level is of the expression (10), that is, when the brightness level of a subject is as high as Th_max' or more, the synthesis coefficient k is taken as 1. The thresholds Th_min' and Th_max' are appropriately determined according to the saturation characteristics of the solid-state imaging element to be used and to the S/N.

$$0 \leq \text{long brightness signal level} \leq \text{Th\_min}' \quad (9)$$

$$\text{Th\_max}' \leq \text{long brightness signal level} \quad (10)$$

When the long brightness signal level is of the expression (11), that is, when the brightness is intermediate between low brightness and high brightness, as shown in FIG. 18, the synthesis coefficient k is decided by the linear equation of the equation (12).

$$\text{Th\_min'} \leq \text{long brightness signal level} \leq \text{Th\_max'} \quad (11)$$

$$K = \{1/(Th\_max' - Th\_min')\} \times (\text{long brightness signal level}) - \{Th\_min'/(Th\_max' - Th\_min')\} \quad (12)$$

Using the synthesis coefficient k thus determined, the long signal and the short signal are synthesized by the equation (5) for each pixel. A signal obtained by synthesizing the long signal and the short signal is taken as a synthesis signal.

Figure 19:
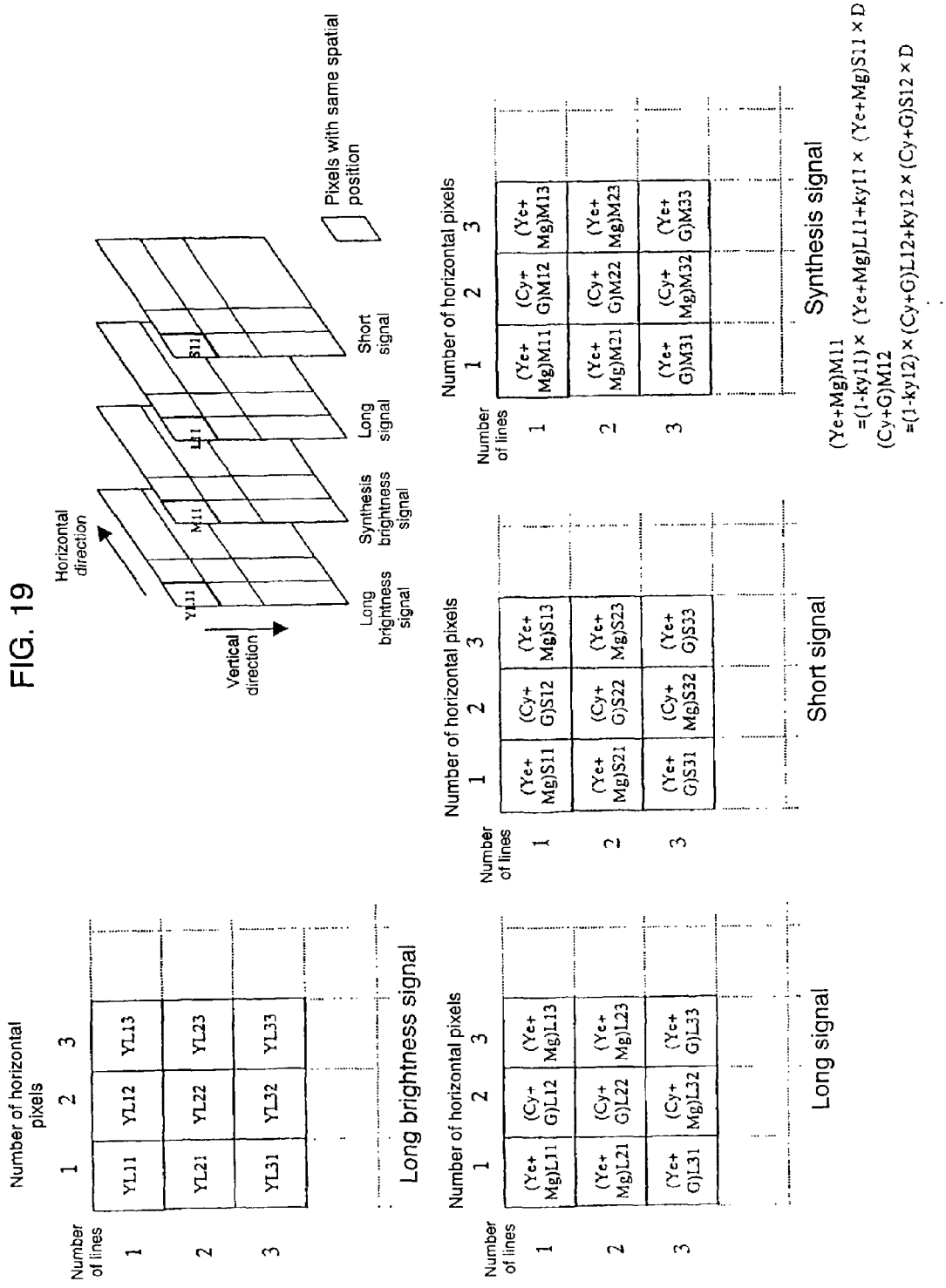
FIG. 19 is an illustrative view to explain a signal synthesis processing method in Embodiment 2 of the present invention.

For example, when determining a synthesis signal (Ye+Mg) M11 from a long signal (Ye+Mg)L11 shown in FIG. 19 and from a short signal (Ye+Mg)S11 having the same spatial position as the (Ye+Mg)L11, on the basis of a synthesis coefficient (taken as ky11) decided from the long brightness signal YL11 having the same spatial position as these two signals, synthesization is performed by the equation (13).

$$(Ye+Mg)M11 = (1-ky11) \times (Ye+Mg)L11 + ky11 \times (Ye+Mg)S11 \times D \quad (13)$$

Other pixels of the synthesis signal, as with equation (13), are determined from the long signal and the short signal both of which exist on the same spatial position.

The constant D by which the short signal is multiplied in the equation (13) is the ratio in the amount of exposed light of the long signal to the short signal (the ratio in the exposure time), as with Embodiment 1 of the present invention, is determined by the equation (7).

Using the long signal and the short signal in this manner, synthesizing a synthesis signal consisting of the long signal for the low brightness portion, of the short signal for the high brightness portion, and of a signal for the intermediate brightness portion between the low brightness portion and the high brightness portion in which the long signal and the short signal are weighted and added allows the dynamic range of the picked up image signal to be expanded.

The brightness signal can be said as a low frequency component extracted from the long signal, so that when determining a synthesis coefficient on the basis of the brightness signal, an effect of the noise component in the long signal on the synthesis coefficient decision can be reduced.

As described above, the solid-state imaging device of Embodiment 2 of the present invention also controls the exposure of the solid-state imaging element 3 and the signal read mode, picks up the short-time exposure signal for one field and the long-time exposure signal for one frame, and synthesizes these signals, thereby allowing an image whose dynamic range is expanded while having a resolution equivalent to the number of pixels of CCD to be picked up. Further, the solid-state imaging element used with the present solid-state imaging device can use IT-CCD generally used in consumer solid-state imaging devices, so that the device can be configured at a low cost without using a plurality of solid-state imaging elements or a special solid-state imaging element.

Embodiment 3

Figure 20:
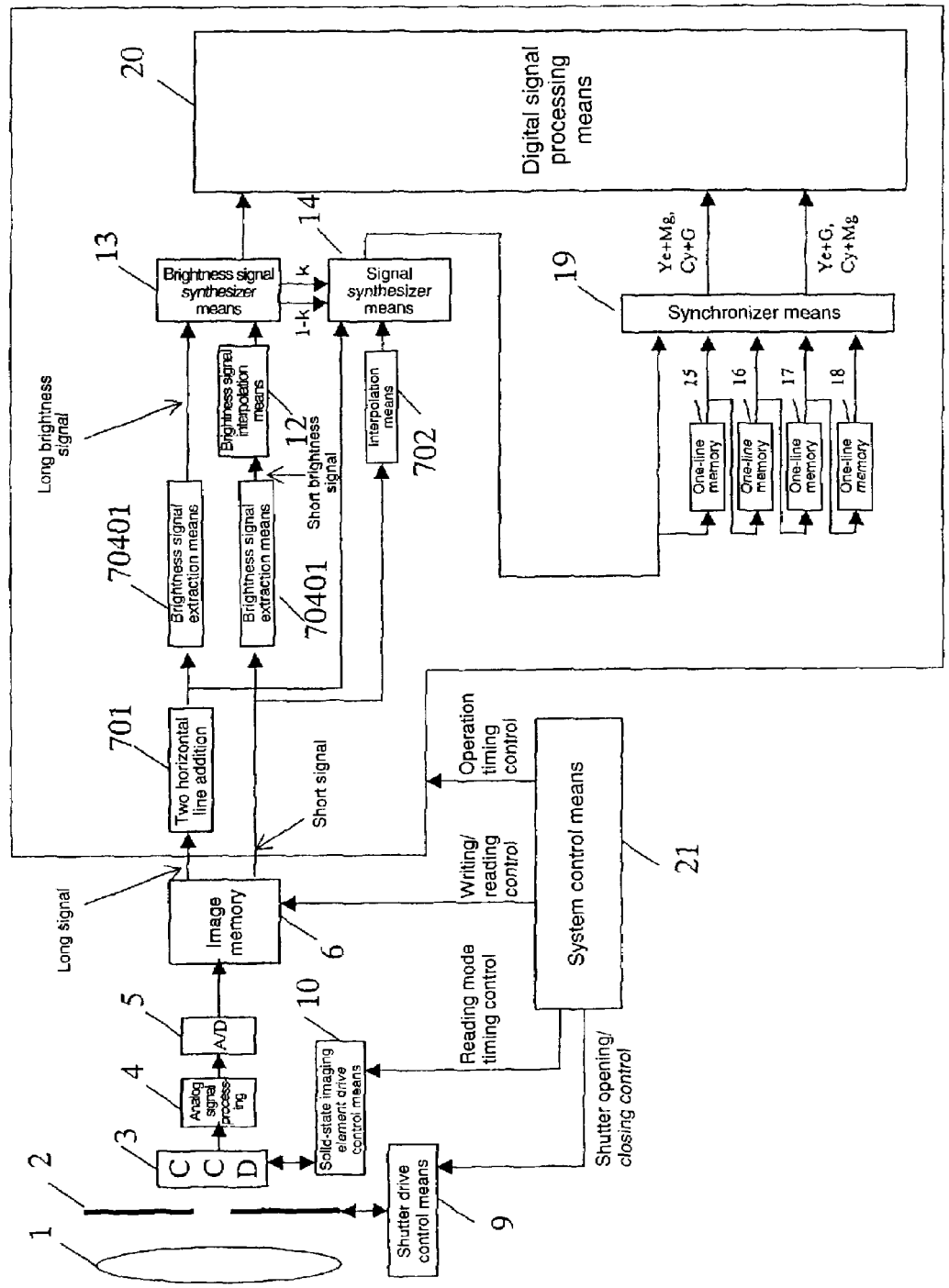
FIG. 20 is a block diagram showing a solid-state imaging device in Embodiment 3 of the present invention.

FIG. 20 is a block diagram of the solid-state imaging device in Embodiment 3 of the present invention. In the diagram, the function/operation of the optical lens 1, the mechanical shutter 2 also used for the optical aperture, the solid-state imaging element 3, the analog signal processing means 4, the A/D converter means 5, the image memory 6, the shutter drive means 9, the solid-state imaging element drive means 10, the two horizontal line adder means 701, the brightness signal extraction means 70401, and the interpolation means 702 is similar to Embodiments 1 and 2 of the present invention, so that the same numerals as in FIGS. 1 through 19 are assigned to them, and thus the explanation will be omitted.

Explaining the components other than described above in the block diagram shown in FIG. 20, the numeral 12 designates a brightness signal interpolation means for applying the interpolation processing to the output of the brightness signal extraction means 70401, and the brightness signal synthesizer means 13 synthesizes the outputs of brightness signal extraction means 70401 and the brightness signal interpolation means 12. The brightness signal inputted into the brightness signal interpolation means 12 is extracted from the short signal, so that the brightness signal is called the short brightness signal, while the brightness signal extracted from the long signal is called the long brightness signal. Thus, the signal inputted from the brightness signal extraction means 70401 into directly the brightness signal synthesizer means 13 becomes the long brightness signal, while the signal inputted from the brightness signal interpolation means 12 into the brightness signal synthesizer means 13 becomes the signal of the short brightness signal after being interpolated.

A signal synthesizer means 14 synthesizes the outputs of the two line adder means 701 and the interpolation means 702. One-line memories 15, 16, 17 and 18 are delay means for one horizontal synchronous period required in synchronizing the output of the signal synthesizer means 14, and from the horizontal line signal having the total five lines consisting of the four line output of the one-line memories 15, 16, 17 and 18 and of one-line output of the signal synthesizer means 14, a signal having a red (R) component and a blue (B) component both on the same spatial position is obtained by synchronization means 19.

A signal having the brightness signal obtained by the brightness signal synthesizer means 13, and the signal with the red (R) component and the signal with the blue (B) component obtained by the synchronization means 19 is subject to processings such as noise removing, edge enhancing, matrix operating, and encoding to a specific format in a digital signal processing means 20. The operation mode and operation timing of all of the above-mentioned components including these meanss should be controlled integrally by a system control means 21.

Figure 21:
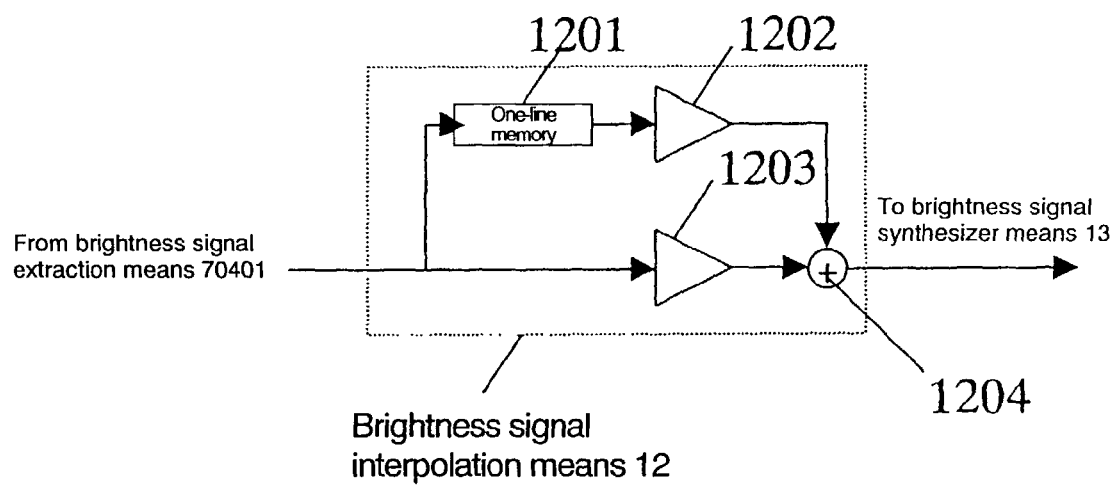
FIG. 21 is a block diagram showing a configuration of a brightness signal interpolation means in Embodiment 3 of the present invention.

FIG. 21 is a block diagram showing a configuration of the brightness signal interpolation means 12. In the diagram, the numeral 1201 is a one-line memory which is means of delaying by one horizontal synchronous period the one line portion of said image signal outputted from the brightness signal extraction means 70401. The numerals 1201 and 1203 designate amplifier means for multiplying the input through the one-line memory 1201 and the signal inputted through the brightness signal extraction means 70401 into the brightness signal interpolation means 12 by a certain gain. The numeral 1204 designates an adder for adding the signals multiplied by the gain at the amplifier means 1202 and 1203.

Figure 22:
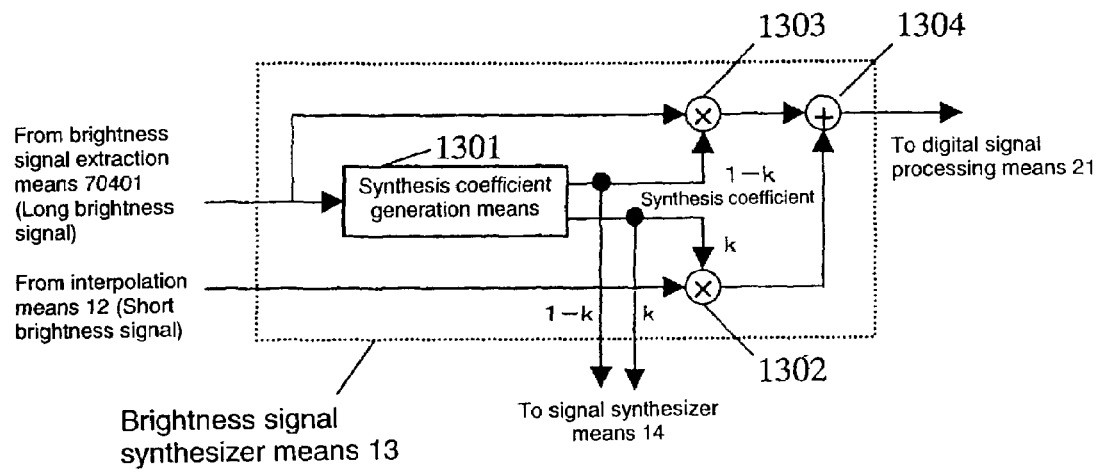
FIG. 22 is a block diagram showing a configuration of brightness signal synthesizer means in Embodiment 3 of the present invention.

FIG. 22 is a block diagram showing a configuration of the brightness signal synthesizer means 13. In the diagram, the numeral 1301 designates synthesis coefficient generation means for generating a coefficient k ($1 \geq k \geq 0$) according to the signal level for each pixel of the long brightness signals through the brightness signal extraction means 70401 and giving k value and 1-k value to multipliers 1302 and 1303. The multipliers 1302 and 1303 multiply the short brightness signal and the long brightness signal through the two horizontal line adder means 701 by k value and 1-k value, the results being added to the adder 70304 to output.

Figure 23:
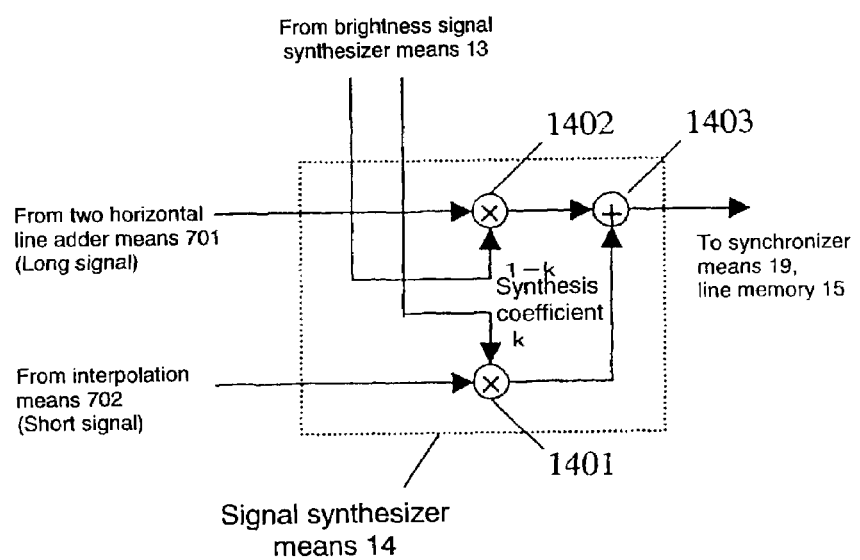
FIG. 23 is a block diagram showing a configuration of signal synthesizer means in Embodiment 3 of the present invention.

FIG. 23 is a block diagram showing a configuration of the signal synthesizer means 14. In the diagram, the numerals 1401 and 1402 designate multipliers for multiplying the short signal and the long signal after the two horizontal line addition by coefficients k and 1−k supplied from the brightness signal synthesizer means 13. The results are added to the adder 1403 to output.

Figure 24:
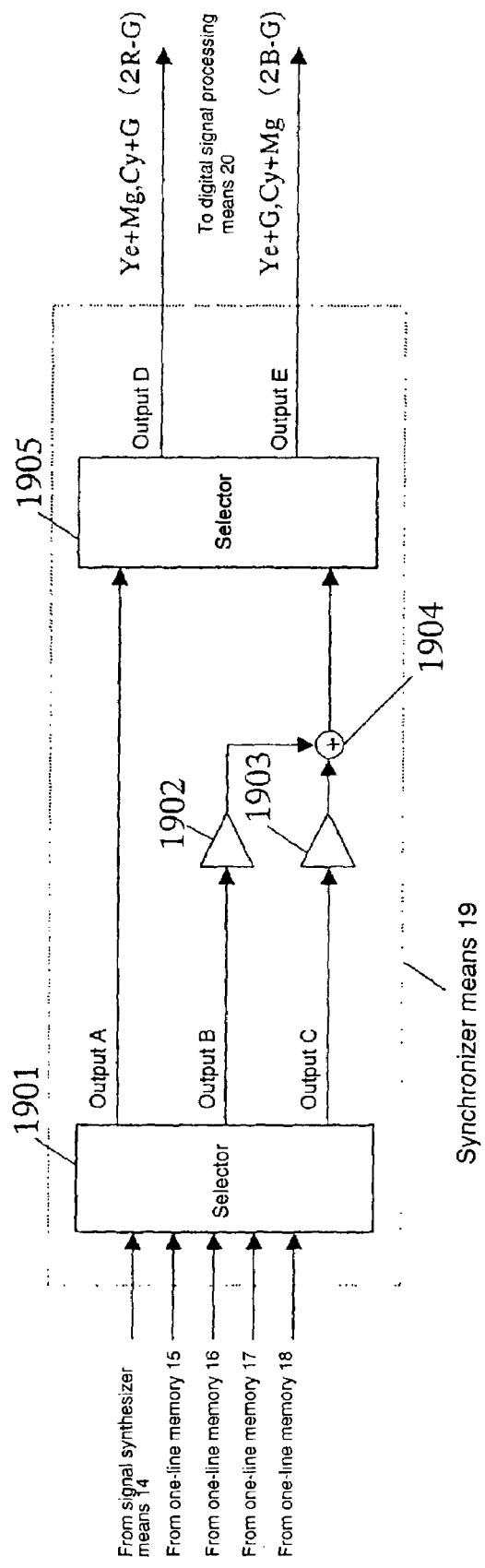
FIG. 24 is a block diagram showing a configuration of synchronization means in Embodiment 3 of the present invention.

FIG. 24 is a block diagram showing a configuration of the synchronizer means 19. In the diagram, the numeral 1901 designates a selector for selecting three signals among inputted signals and outputting them to outputs A, B and C; and the numerals 1902 and 1903 designate amplifiers for multiplying the signals outputted from the outputs B and C by a constant, the signals after amplified being added by an adder 1904. The numeral 1905 designates a selector for dividing the output A of the selector 1901 and the output of the adder 1904 among the outputs D and E. The selection of the output destination of the signals by the selectors 1901 and 1905 is divided by the color component of the signal as described later.

With respect to the solid-state imaging device of Embodiment 3 of the present invention configured as described above, the operation thereof will be explained hereinafter.

The third embodiment of the present invention is the same as Embodiments 1 and 2 of the present invention in that two images of the short-time exposure signal (the short signal) and the long-time exposure signal (the long signal) are picked up to be synthesized, thereby picking up an image with an expanded dynamic range. However, Embodiment 3 of the present invention is wherein individually for the brightness signal and for the signal later processed as a color signal, the short-time exposure signal (the short signal) and the long-time exposure signal (the long signal) are synthesized.

Hence, in Embodiment 3 of the present invention, as with Embodiment 1 of the present invention, for the long signal read from the image memory 6 when assumed as frame signal, in the two horizontal line adder means 701, the long signals of the two upper/lower lines adjacent to each other are added and mixed. This is a step to match the long signal with the fact that the short signals are image mixed on the vertical transfer CCD of the solid-state imaging device of Embodiment 3.

In the brightness signal extraction means 70401, as with Embodiment 2 of the present invention, of the outputs of the two horizontal line adder means 701, two pixel signals adjacent in the horizontal direction to each other are sequentially added, whereby the brightness component of the long signal (hereinafter, called the long brightness signal) is extracted on the basis of the equation (8).

For example, when determining the long brightness signal YL11 from the long signal (Ye+Mg) L11 and the long signal (Cy+G) L12, (Ye+Mg) L11 and (Cy+G) L12 are added. Similarly, when determining the long brightness signal (Cy+G) YL12, L12 and (Ye+Mg) L13 are added.

Then, for the short signal read from the image memory 6, first the brightness signal is determined at the brightness signal extraction means 70401, as with the long signal.

Figure 25:
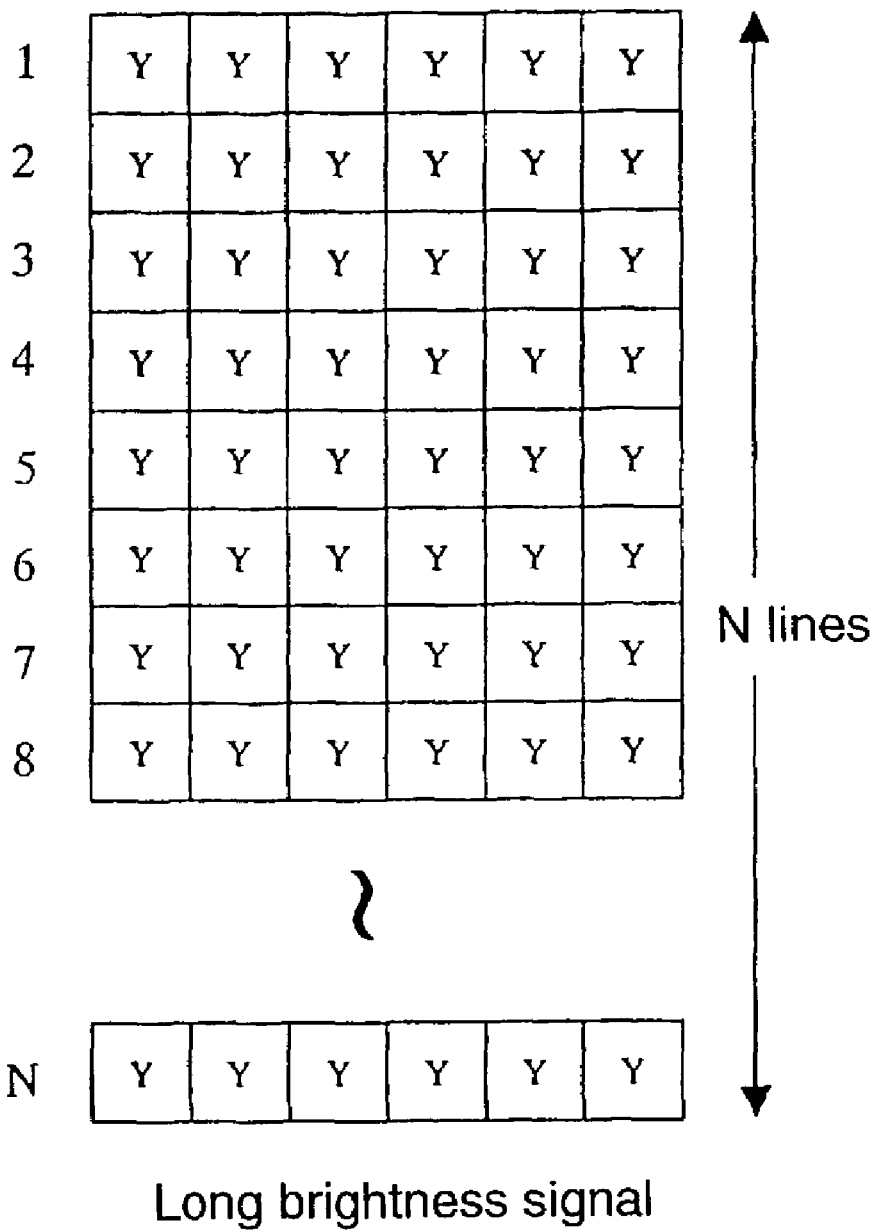
FIG. 25 is an illustrative view to explain a long brightness signal in Embodiment 3 of the present invention.
Figure 26:
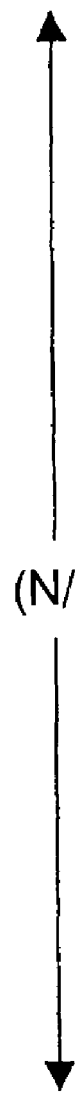
FIG. 26 is an illustrative view to explain a short brightness signal in Embodiment 3 of the present invention.

FIG. 25 shows the long brightness signal; and FIG. 26 shows the short brightness signal.

As shown in FIG. 26, the short signal was one-field signal, so that the short brightness signal also naturally is one-field brightness signal. Thus, a means for converting the one-field short brightness signal to one-frame signal to make the short brightness signal identical in the signal type to the long brightness signal is the brightness signal interpolation means 12.

Figure 27:
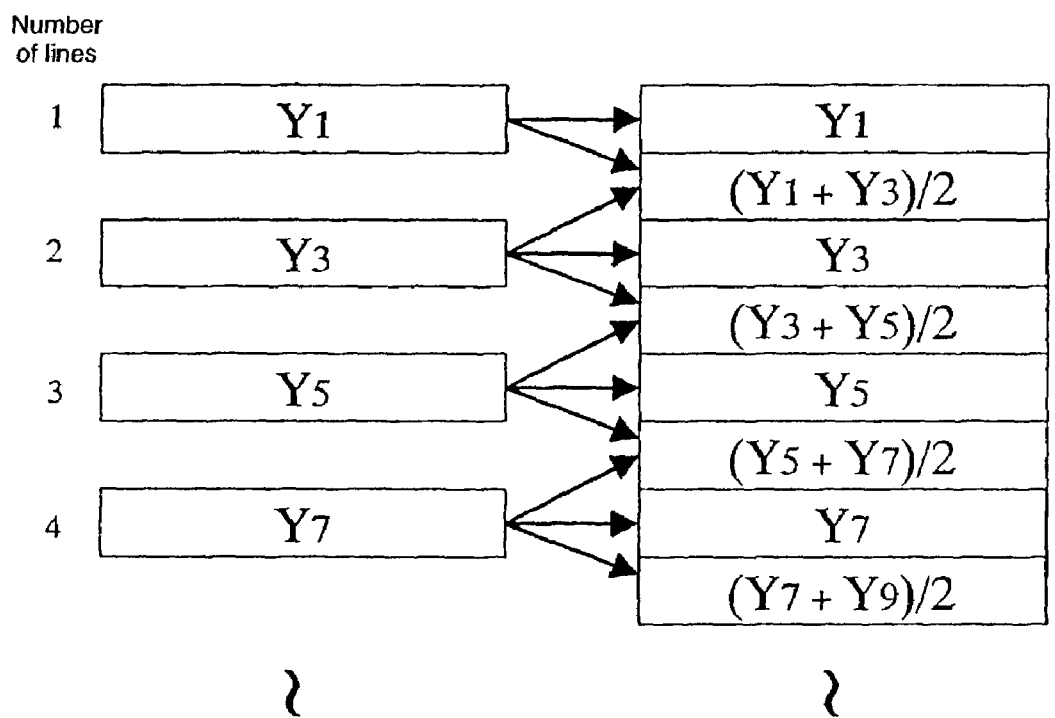
FIG. 27 is an illustrative view to explain a brightness signal interpolation processing in Embodiment 3 of the present invention.

More specifically, the brightness signal interpolation means 12 determines an addition mean value of the two continuous lines by setting the gain multiplied in the amplifier means 1202 and 1203 at 0.5 and takes it an interpolation signal. FIG. 27 shows the short brightness signal after the interpolation processing.

With the above-mentioned processing, the brightness signal obtained from one-frame long signal (the long brightness signal) and the brightness signal equivalent to one frame obtained through the interpolation processing from one-field short signal (the short brightness signal) are obtained. The reason that one-frame short brightness signal is synthesized from one-field short brightness signal in this manner is that in synthesizing the short signal and the long signal to expand the dynamic range, when the short signal is still one-field signal, the horizontal line is short, so that the short signal cannot be synthesized with the long signal as the one-frame signal.

A means for synthesizing the long brightness signal and the short brightness signal to synthesize the brightness signal with an expanded dynamic rage is the brightness signal synthesizer means 13. In brightness signal synthesizer means 13, the synthesis coefficient k according to the signal level for each pixel of the long signal by the synthesis coefficient generation means 1301 shown in FIG. 22 is determined, and the long brightness signal and the short brightness signal which exists on the same spatial position on the screen are synthesized in one pixel units according to the synthesis coefficient k.

As one example of a method of determining the synthesis coefficient k for each pixel from the signal level of the long brightness signal, the same method as Embodiment 2 of the present invention is considered, so that the explanation thereof will be omitted.

Using the synthesis coefficient k thus determined, the long brightness signal and the short brightness signal are synthesized for each pixel by the equation (14). A signal obtained by synthesizing the long brightness signal and the short brightness signal is taken as the synthesis brightness signal.

$$\text{Synthesis brightness signal}=(1-k)\times\text{long brightness signal}+k\times\text{short brightness signal}\times D \qquad (14)$$

Figure 28:
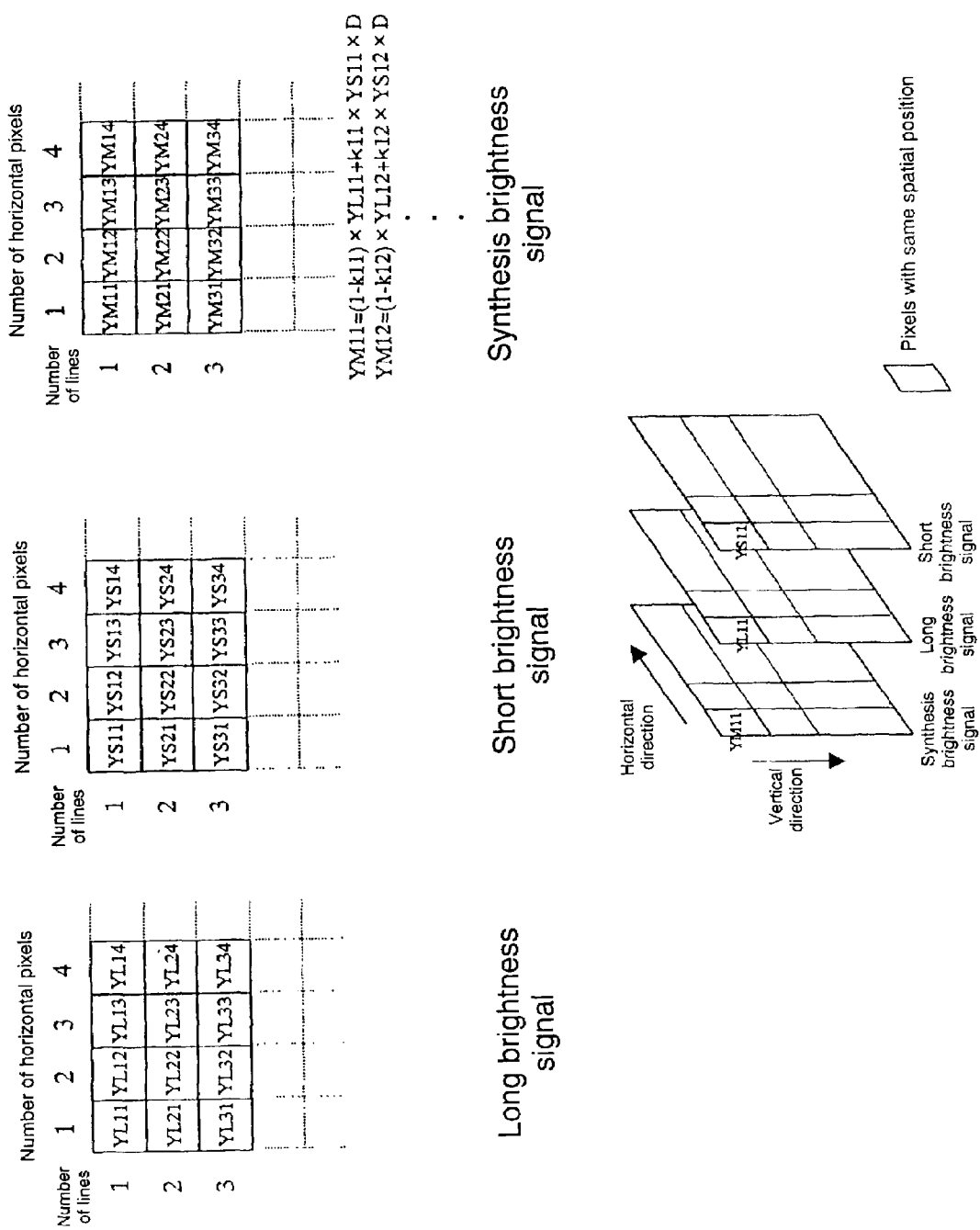
FIG. 28 is an illustrative view to explain a brightness signal synthesizing method in Embodiment 3 of the present invention.

For example, when determining a synthesis brightness signal YM11 from a long brightness signal YL11 shown in FIG. 28 and from a short brightness signal YS11 having the same spatial position as the YL11, a synthesis coefficient decided from the long brightness signal YL11 is taken as k11, whereby synthesization is performed by the equation (15).

$$YM11=(1-k11)\times YL11+k11\,YS11\times D \qquad (15)$$

Other pixels of the synthesis brightness signal, as with the equation (15), are determined from the long brightness signal and the short brightness signal both of which exist on the same spatial position.

The constant D by which the short brightness signal is multiplied in the equations (14) and (15) is the ratio in the amount of exposed light of the long signal to the short signal (the ratio in the exposure time), as with Embodiment 1 of the present invention, and is determined by the equation (7).

Using the long brightness signal and the short brightness signal in this manner, synthesizing a synthesis brightness signal consisting of the long signal for the low brightness portion, of the short brightness signal for the high brightness portion, and of a signal for the intermediate brightness portion between the low brightness portion and the high brightness portion in which the long brightness signal and the short brightness signal are weighted and added allows the dynamic range of the picked up image brightness signal to be expanded.

However, of the synthesis signals whose dynamic range is expanded, the portion consisting of the long brightness signal is originally one frame image signal, so that the image resolution is high. On the other hand, the portion consisting of the short brightness signal is synthesized from one field image signal, so that the image resolution is lower than the portion consisting of the long brightness signal. However, generally, it is unusual to develop a condition in which the whole image becomes high in brightness, and even in such a condition, the amount of incident light is limited by stopping down the optical aperture, so that the signal level of the whole image becomes hardly high in brightness, and thus a condition in which the most of the picked up image is occupied by the portion consisting of the short brightness signal can hardly occur practically. When an image is expressed by limited gradations, a high brightness portion is allocated with fewer gradations than a low/intermediate brightness portions. Hence, the degradation in the resolution of the portion consisting of the short brightness signal is not so prominent, so that it is considered that synthesizing the long brightness signal and the short brightness signal even by the above-mentioned method causes a synthesis image with a resolution equivalent to the number of pixels of CCD to be obtained.

The above-mentioned description is for the contents of the processing related to the dynamic range expansion by the brightness signal synthesization. The processing related to the color signal will be explained hereinafter.

The short signal read from the image memory 6, and the long signal to which the upper/lower lines adjacent to each other are added in the two horizontal line adder means 70 are subject to a synthesis processing in the signal synthesizer means 14 to expand the dynamic range of the color signal.

The short signal, which is one field signal, is different in the signal type from the long signal. Thus, as with Embodiment 1 of the present invention, the one field image is converted by the interpolation means 702 to the one frame image.

The long signal after being subject to the addition and mixing of the upper/lower lines adjacent to each other in the two horizontal line adder means 701, and the short signal having been subject to the interpolation processing in the interpolation means 702 are as shown in FIGS. 12(a) and 12(b), and as with Embodiment 1 of the present invention, the two horizontal line addition processing for the long signal and the interpolation processing for the short signal causes the long signal and the short signal to be matched in the signal type with each other.

The synthesis of the long signal and short signal inputted into the signal synthesizer means 14, as with Embodiment 2 of the present invention, is performed for each pixel by the synthesis coefficient k used when the long brightness signal and the short brightness signal are synthesized both of which are matched spatially in the position with the long signal and short signal inputted into the signal synthesizer means 14, and by D determined by the equation (7). A signal synthesized in the signal synthesizer means 14 is called the synthesis signal.

The above-mentioned description is for the synthesis processing to expand the dynamic range of the color signal.

The synthesis signal determined by the signal synthesizer means 14 has a configuration in which a line on which the pixels of Ye+Mg and Cy+G are arranged in the horizontal direction and a line on which Ye+G and Cy+Mg are arranged in the horizontal direction are repeated in vertical direction at two line cycles, so that expressing red, green and blue of three primary colors as R, G and B, respectively, there are obtained a color signal as 2R−G having R component by the equation (16) from the line on which the pixels of Ye+Mg and Cy+G are arranged, and a color signal as 2B−G having B component by the equation (17) from the line on which Ye+G and Cy+Mg are arranged.

$$(Ye+Mg)-(Cy+G) \approx 2R-G \quad (16)$$

$$(Cy+Mg)-(Ye+G) \approx 2B-G \quad (17)$$

This is the so-called color difference line sequence, so that there is obtained only the color signal of one of either 2R−G having R component or 2B−G having B component for one horizontal line signal. Thus, to obtain a signal having both R component and B component for one horizontal line signal, a synchronization processing is performed by the line memories 15, 16, 17, 18 and the synchronization means 19.

Hereinafter, there will be explained concrete contents of the synchronization processing by the line memories 15, 16, 17, 18 and the synchronization means 19. Inputted into the synchronization means 19 is the horizontal line signal of five lines continuing from the signal synthesizer means 14 and the line memories 15, 16, 17, 18. With a signal synthesized in the signal synthesizer means 14 taken as the synthesis signal in FIG. 29(a), suppose that the signal of five lines inputted into the synchronization means 19 is a signal of the third line through the seventh line shown in FIG. 29(b). At this time, assuming that a subject of the synchronization processing is a horizontal line signal located on the center of inputted five lines, when the horizontal line signal of the fifth line of FIG. 29(b) is attempted to be subject to the synchronization processing, the fifth line is a signal corresponding to 2R−G having R component, so that it is sufficient to produce 2B−G having B component by the interpolation processing from peripheral horizontal line signals. Thus, in the synchronization means 19 shown in FIG. 24, the selector 1901 outputs the signal of the fifth line to the output A, and the signals corresponding to 2B−G of the third line and the seventh line to the output B and the output C. Taking a gain multiplied in the adder means 1902, 1903 as 0.5, adding the multiplied results in the adder 1904 causes mean addition results of the third line and the seventh line to be obtained. The mean addition results and the signal of the fifth line as the output of the output A of the selector 1901 are inputted into the selector 1905, where an output destination is selected, and the horizontal line signal of the fifth line corresponding to 2R−G is outputted to the output D, while the mean addition results of the third line and the seventh line corresponding to 2R−G are outputted to the output E. Such an operation allows the signal corresponding to 2R−G having R component, and the signal corresponding to 2B−G having B component to be obtained at a spatial position at which the fifth line exists. Similarly, for example, when with the signal of the fifth line through the ninth line inputted into the synchronization means 19, the horizontal line signal of the seventh line is attempted to be subject to the synchronization processing, the seventh line is a signal corresponding to 2B−G having B component, so that it is sufficient to produce 2R−G having R component by the interpolation processing from peripheral horizontal line signals. Thus, in the synchronization means 19 shown in FIG. 24, the selector 1901 outputs the signal of the seventh line to the output A, and the signals corresponding to 2R−G of the fifth line and the ninth line to the output B and the output C. Taking a gain multiplied in the adder means 1902, 1903 as 0.5, adding the multiplied results in the adder 1904 causes mean addition results of the fifth line and the ninth line to be determined. The mean addition results and the signal of the seventh line as the output of the output A of the selector 1901 are inputted into the selector 1905, where an output destination is selected, and the horizontal line signal of the seventh line corresponding to 2B–G is outputted to the output E, while the mean addition results of the fifth line and the ninth line corresponding to 2R–G are outputted to the output D. Such an operation allows the signal corresponding to 2R–G having R component, and the signal corresponding to 2B–G having B component to be obtained at a spatial position at which the seventh line exists. The selection of the input/output signal and the like should be performed automatically or by the control of the system control means 21, so that the above-mentioned processing is performed according to the input signal in the synchronization means 19.

As described above, a synthesis brightness signal synthesized by the signal synthesizer means 13, and the signal corresponding to 2R–G having R component and the signal corresponding to 2B–G having B component obtained in the synchronization means 19 are subject to processings such as noise removing, edge enhancing, gamma correcting, matrix operating, and encoding to a specific format in the digital signal processing means 20. The signal processing in the digital signal processing means 20 is not directly related to the object of the present invention, so that a detailed explanation will be omitted.

As described above, the solid-state imaging device of Embodiment 3 of the present invention controls the exposure of the solid-state imaging element 3 and the signal read mode, picks up the short-time exposure signal for one field and the long-time exposure signal for one frame, and synthesizes these signals, thereby allowing an image whose dynamic range is expanded while having a resolution equivalent to the number of pixels of CCD to be picked up. Further, the solid-state imaging element used with the present solid-state imaging device can use IT-CCD generally used in consumer solid-state imaging devices, so that the device can be configured at a low cost without using a plurality of solid-state imaging elements or a special solid-state imaging element.

(3) Embodiment 4

Figure 30:
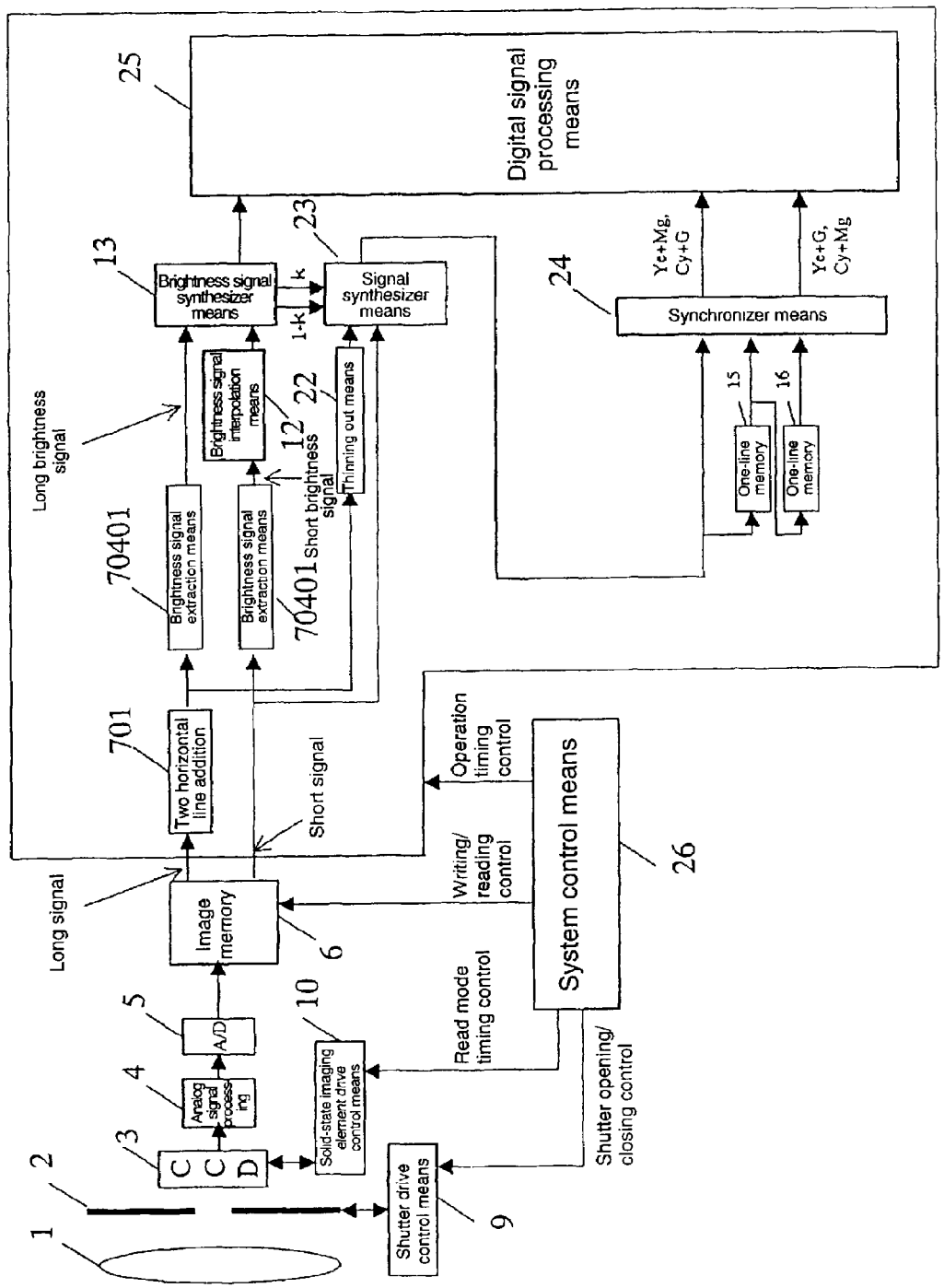
FIG. 30 is a block diagram showing a solid-state imaging device in Embodiment 4 of the present invention.

Major different points of the solid-state imaging device in Embodiment 4 of the present invention from Embodiment 3 of the present invention as shown in FIG. 20 exist in that, added to the solid-state imaging device in Embodiment 4 of the present invention is means 22 of thinning out the output of the two horizontal line adder means 70401, in connection with which the interpolation means 702 and one-line memories 17, 18 are eliminated, and the configuration/function of the signal synthesizer means, the synchronizer means, the digital signal processing means, and the system control meanss are different from those in Embodiment 3 (in the embodiment of the present invention, they are numbered as the signal synthesizer means 23, the synchronizer means 24, the digital signal processing means 25, and the system control means 26 to distinguish). The explanation of the processing contents as with Embodiment 3 of the present invention will be omitted, and only the parts different from Embodiment 3 of the present invention will be explained hereinafter. FIG. 30 is a block diagram of the solid-state imaging device in Embodiment 4 of the present invention. In the diagram, the thinning out means 22 thins the horizontal line signal out of the output of the two horizontal line adder means 701, and converts one-frame signal to one-field signal. The signal synthesizer means 23 synthesizes the outputs of the thinning out means 22 and the image memory 6 on the basis of the synthesis coefficient k determined at the brightness signal synthesizer means 13. The synchronizer means 24 processes synchronously the output of the signal synthesizer means 23.

The brightness signal obtained by the brightness signal synthesizer means 13, the signal having red (R) component obtained by the synchronizer means 24, and the signal having blue (B) component are subject to processings such as noise removing, edge enhancing, matrix operating, and encoding to a specific format in the digital signal processing means 25. The operation mode and operation timing of all of the above-mentioned components including these means should be controlled integrally by the system control means 26.

Figure 31:
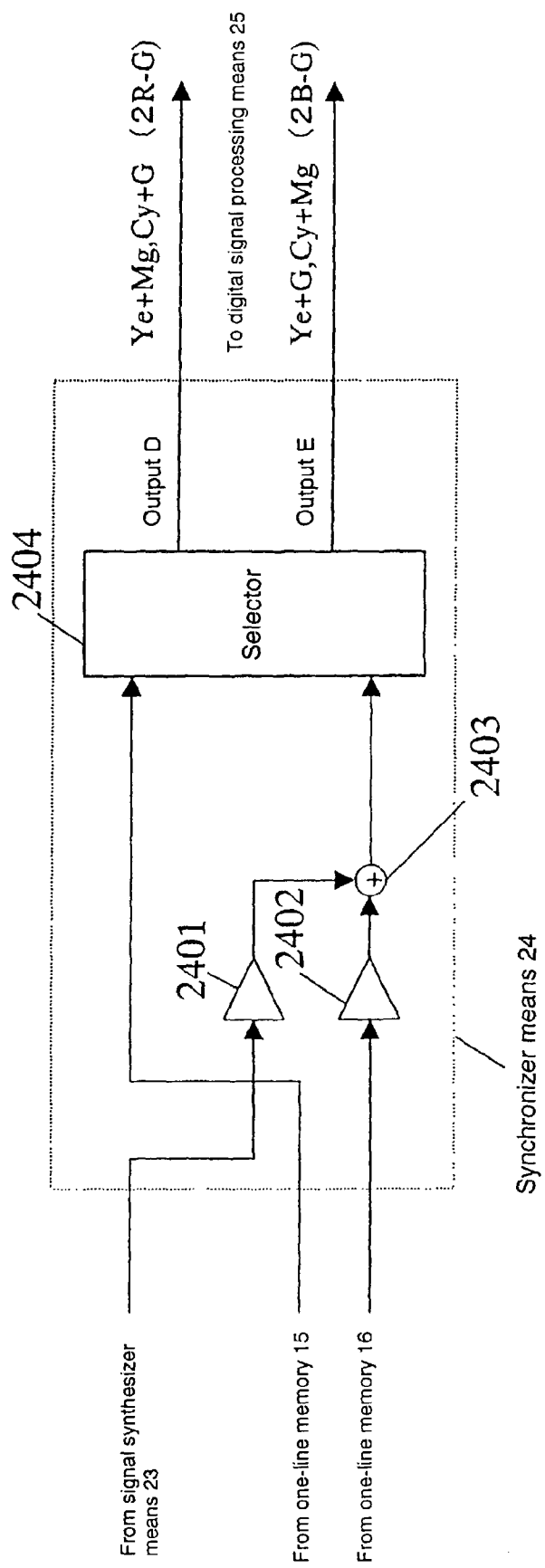
FIG. 31 is a block diagram showing a configuration of synchronization means in Embodiment 4 of the present invention.

FIG. 31 is a block diagram showing a configuration of the synchronizer means 24. The numerals 2401, 2402 designate amplifier means for multiplying the signals passing through the signal synthesizer means 23 and the one-line memory 16 by a constant, the signals after amplified being added by an adder 2403. The numeral 2404 designates a selector for dividing the output of the one-line memory 15 and the output of the adder 2403 among the outputs D and E. The selection of the output destination of the signals by the selector 2404 should be divided by the color component of the signal as described later. With respect to the solid-state imaging device of Embodiment 4 of the present invention configured as described above, the operation thereof will be explained hereinafter.

As described in Embodiment 3 of the present invention, the output of the two horizontal line adder means 701 is the long signal as one-frame signal. However, the short signal stored in the image memory 6 is one-field image, so that when the signal is still in this condition, the long signal and the short signal cannot be synthesized in the signal synthesizer means 23. Thus, in Embodiment 4 of the present invention, the short signal was converted by the interpolation processing to one-frame signal.

Figure 12:
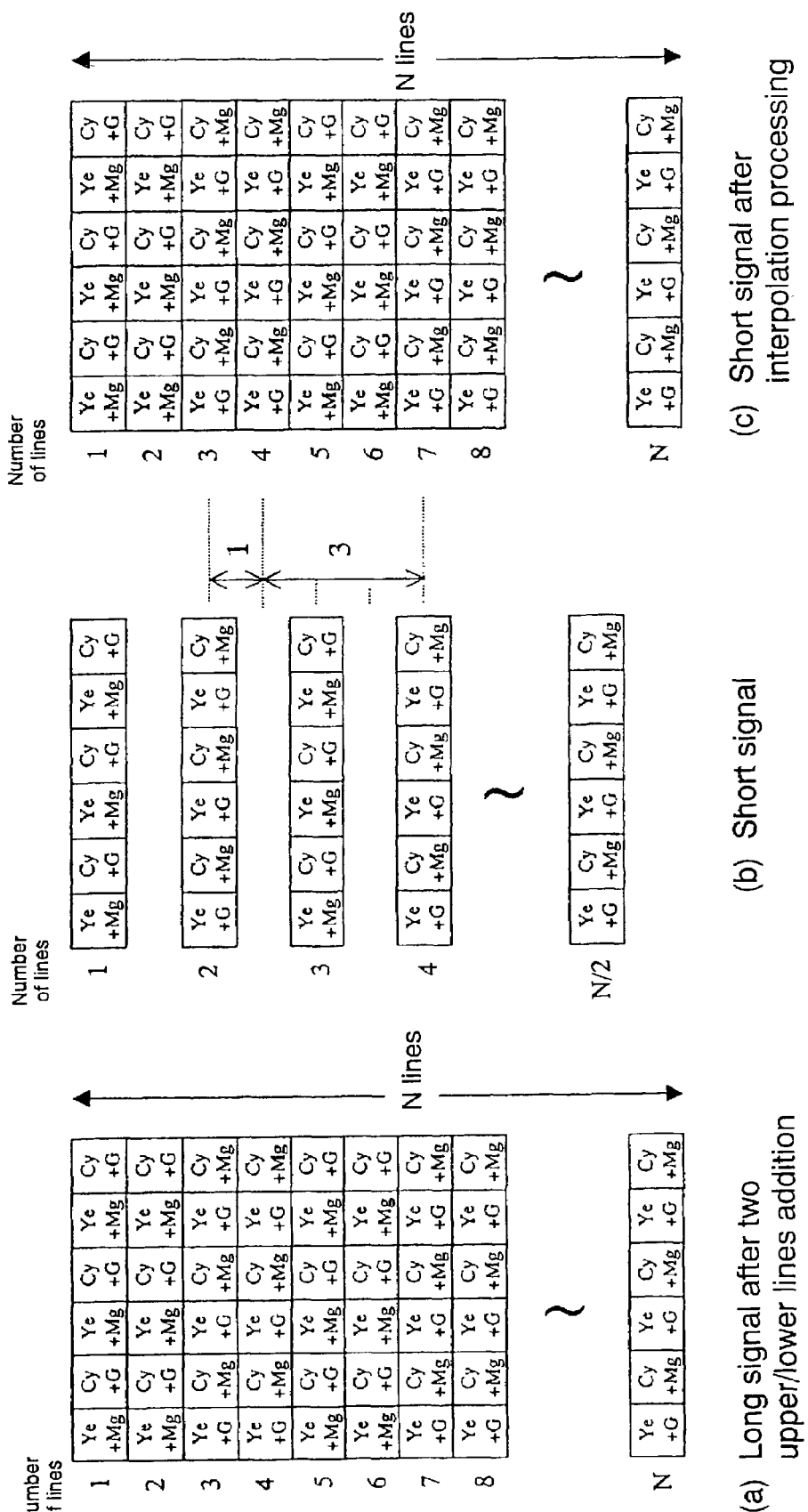
FIG. 12 is an illustrative view to explain the two horizontal line addition processing and the interpolation processing in Embodiment 1 of the present invention.

In Embodiment 4 of the present invention, utilizing the fact that even when the color signal does not have the amount of information to the same extent as the brightness signal, there is no problem in the image quality, on the contrary to Embodiment 3 of the present invention, the long signal as one-frame signal is subject to the thinning out processing in the vertical direction, whereby the long signal is converted to one-field image, which is synthesized with the short signal in synchronizer means 24. More specifically, the even number lines of the long signal after two lines addition as shown in FIG. 12(*a*) are thinned out by the thinning out means 22, whereby the long signal inputted into the signal synthesizer means 23 is converted to the one-field image. The long signal after thinning out exhibits the same type as the short signal as shown in FIG. 12(*b*).

The synthesis of the long signal as one-field signal and short signal inputted into the signal synthesizer means 23, as with Embodiment 3 of the present invention, is performed for each pixel by the synthesis coefficient k used when the long brightness signal and the short brightness signal are synthesized both of which are matched spatially in the position with the long signal and short signal, and by D determined by the equation (7). A signal synthesized in the signal synthesizer means 23 is called the synthesis signal.

Figure 32:
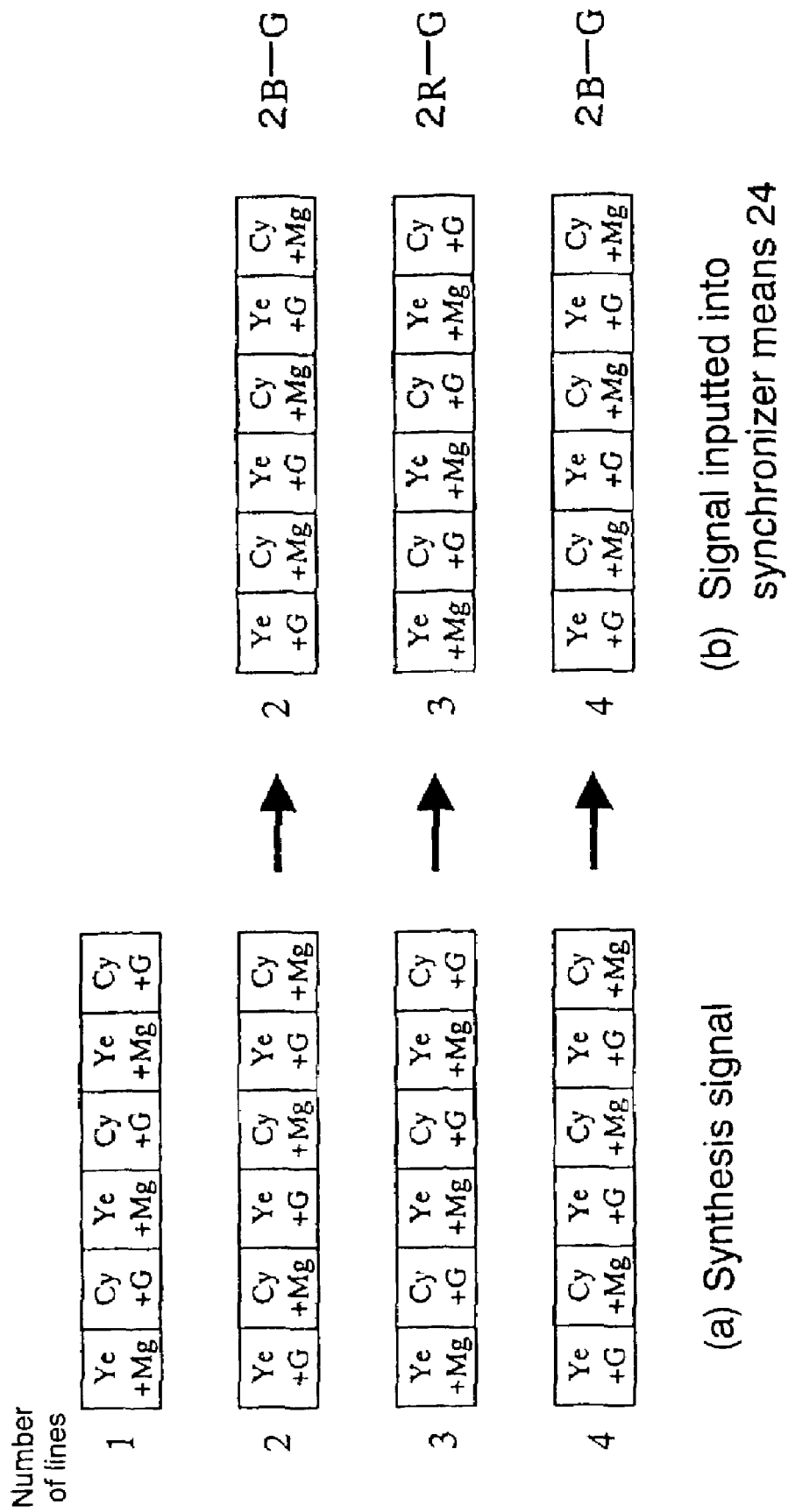
FIG. 32 is an illustrative view to explain a synthesization processing by the synthesizer means in Embodiment 4 of the present invention.

Then, although the synchronization processing is performed in the synchronizer means 24, unlike Embodiment 3 of the present invention, the synthesis signal is one-field signal, so that the signal inputted into the synchronizer means 24 may be, for example, of three lines from the second line to the fourth line as shown in FIG. 32. From the signal of three lines, as with Embodiment 3 of the present invention, there can be obtained the signal corresponding to 2R–G having R component, and the signal corresponding to 2B–G having B component. For example, to obtain the signal corresponding to 2R–G having R component, and the signal corresponding to 2B−G having B component, it is sufficient the signals of the second line and the fourth line are added and averaged to synthesize a signal corresponding to 2B−G.

The two signals obtained by the synchronizer means 24 are processed in the digital signal processing means 25 in the same manner as Embodiment 3 of the present invention, while in Embodiment 4 of the present invention, the synthesis signal synthesized in the signal synthesizer means 23 is one-field signal, so that it is needless to say that the synthesis signal is converted to a frame image in the digital signal processing means 25 if required.

As described above, the solid-state imaging device of Embodiment 4 of the present invention, as with Embodiment 3 of the present invention, also controls the exposure of the solid-state imaging element 3 and the signal read mode, picks up the short-time exposure signal for one field and the long-time exposure signal for one frame, and synthesizes these signals, thereby allowing an image whose dynamic range is expanded while having a resolution equivalent to the number of pixels of the solid-state imaging element to be picked up. Further, Embodiment 4 of the present invention processes the color signal as a field signal, thereby allowing the number of required one-line memories to be reduced and the device to be configured at a lower cost.

Figure 33:
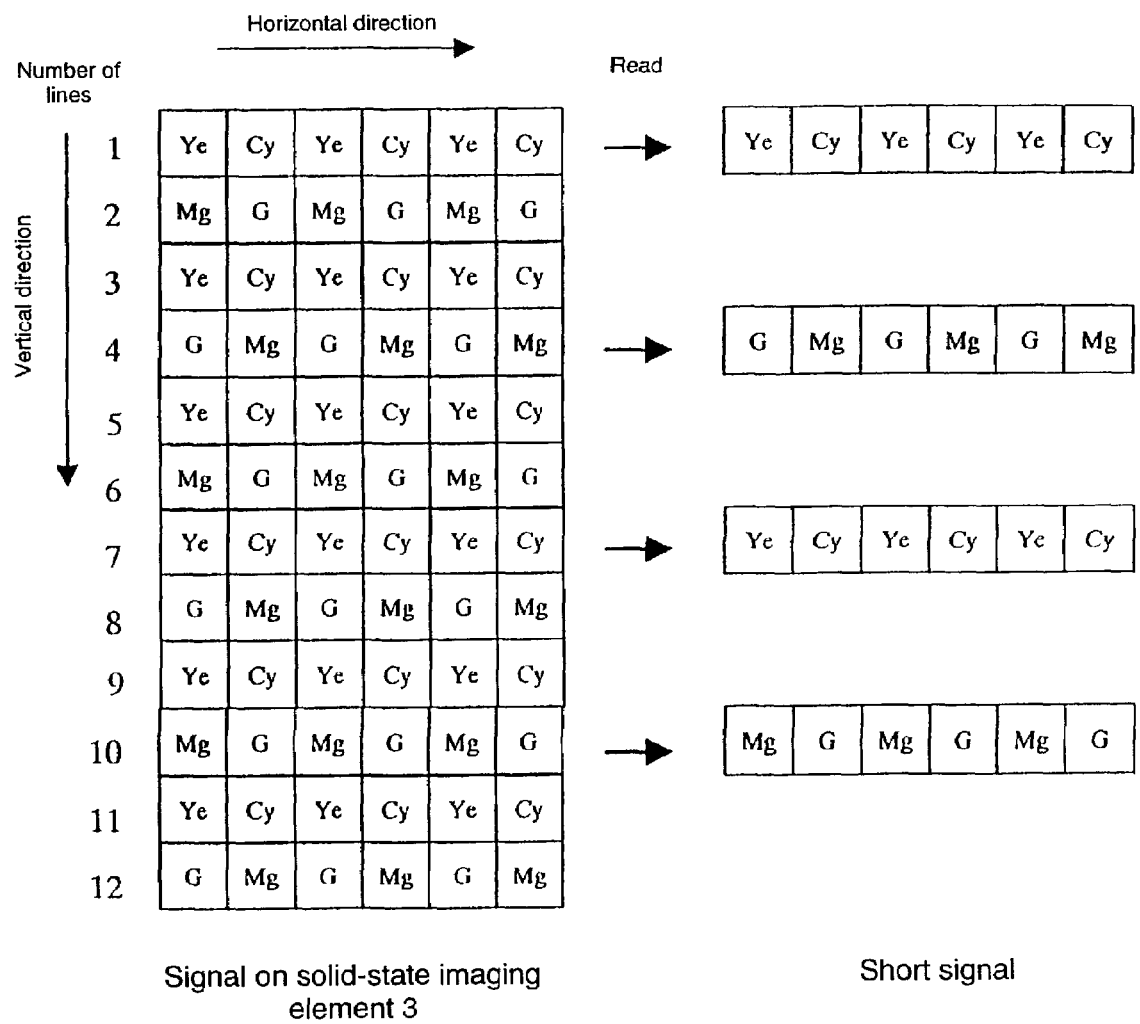
FIG. 33 is an illustrative view showing another example of a method of reading an image signal from a solid-state imaging element.

In Embodiment 1 of the present invention, the short signal is taken as a one-field image read in the field read mode, but is not limited to such a configuration, and for example, a configuration is considered in which the signal is read by thinning out the horizontal line signal in the vertical direction. By way of example, a configuration is considered in which when the short signal is read from the solid-state imaging element 3 as shown in FIG. 33, one-line signal is read for each three lines in the vertical direction. In this case, the short signal is read without mixing of charges accumulated on the two upper/lower photodiodes in the solid-state imaging element, thereby making the two horizontal line addition processing unnecessary. In the interpolation processing by the interpolation means 702 shown in FIG. 4, it is necessary to perform the interpolation processing in a manner to match the number of horizontal lines of the short signal with the long signal. That is, in the interpolation means 702, a horizontal line signal for two lines is produced by the interpolation processing between horizontal line signals of the short signal. This causes the short signal and the long signal to have the same signal type, thereby allowing both the signals to be synthesized by the weighting addition means 703 shown in FIG. 4. In this case, the synthesis coefficient k may be determined from the signal level of each pixel of the long signal to which the two upper/lower lines are not added, by a method, for example, that shown in FIG. 13. When the short signal is read by thinning out the horizontal line signal in this manner, the two horizontal line addition processing for the long signal is described to be unnecessary, but the processing is not limited to such a configuration, and a configuration is also considered in which the long signal and the short signal are subject to the two horizontal line addition processing and then to the synthesis processing.

Figure 34:
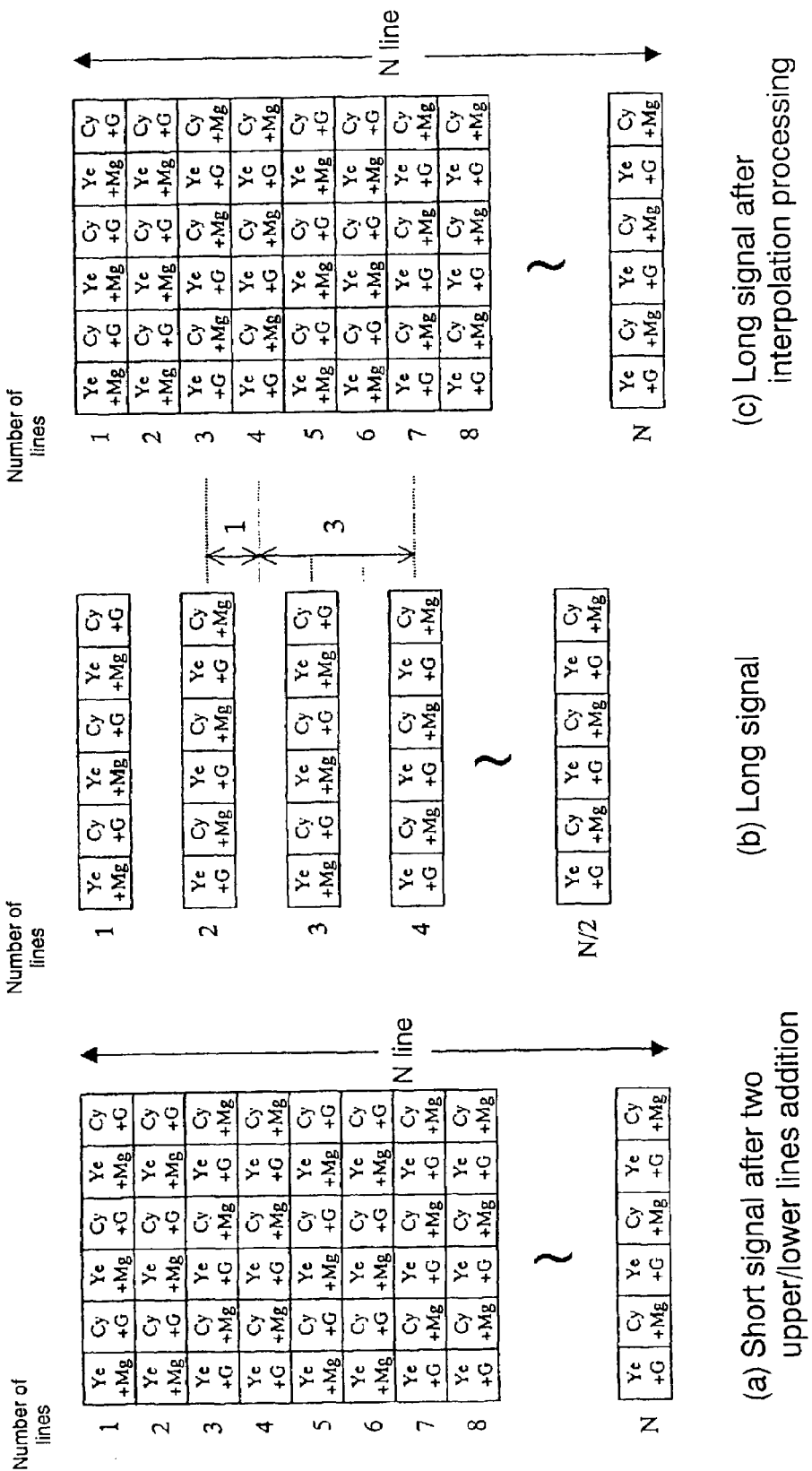
FIG. 34 is an illustrative view to explain the two horizontal line addition processing and the interpolation processing when taking the long signal as a field image and the short signal as a frame image in Embodiment 1 of the present invention.

In Embodiment 1 of the present invention, the two signals having a different amount of exposure are taken as the short signal as one-field signal and as the long signal as one-frame image, but are not limited to such a configuration, and may be taken as the long signal as one-field signal and as the short signal as one-frame image depending on the application of the solid-state imaging element. In this case, it is sufficient to provide a configuration in which as shown in FIG. 34, the long signal is subject to the interpolation processing in the vertical direction by the interpolation means 702, while the short signal is subject to the addition of the two upper/lower lines adjacent to each other by the two horizontal line addition means 701, and in which the synthesis coefficient used in the weighting addition means 703 is determined from the long signal after the interpolation processing. A configuration is also considered in which the synthesis coefficient is determined from the long signal before the interpolation processing, in which case, it is sufficient that the corresponding long signal does not exist on the even-number lines of the short signal as shown in FIG. 34(a), and thus the synthesis coefficient k cannot be determined, so that the synthesis coefficient on the position of the even-number lines of the short signal is determined from the synthesis coefficient determined from the horizontal line of the long signal existing on the same position as the upper/lower lines of the even-number lines of the short signal. In this manner, the synthesis coefficient is determined from the long signal as one-field image and the short signal as one-frame image, thereby allowing an expanded dynamic range image with a high resolution at a high-brightness part to be picked up.

Figure 35:
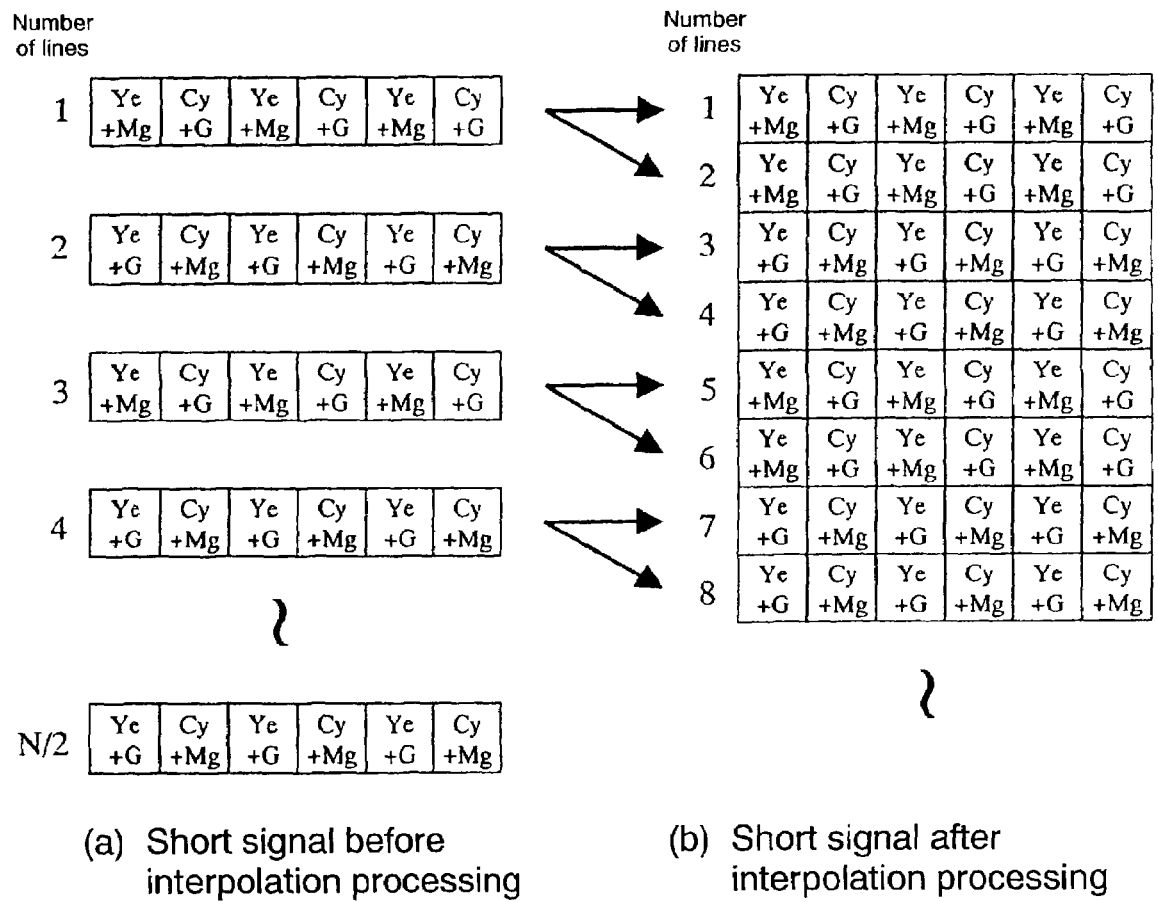
FIG. 35 is an illustrative view to explain previous-value interpolation processing.

In Embodiments 1 and 2 of the present invention, the interpolation means 702 uses two one-line memories and performs the interpolation processing from the signal for two horizontal lines, but is not limited to such configuration, and for example, a configuration is also considered in which the means uses a large number of one-line memories and performs the interpolation processing by a high-rank interpolation processing from a large number of horizontal line signals. A configuration is also considered in which outputting repeatedly twice the one-horizontal lines inputted as shown in FIG. 35 causes the number of horizontal lines to become double, that is, the so-called previous-value interpolation to be performed.

In Embodiment 1 of the present invention, in the signal synthesizer means 7, the synthesis coefficient k for synthesizing the long signal and the short signal is determined for each pixel of the long signal, but the means is not limited to such a configuration, and for example, a configuration is also considered in which the synthesis coefficient k is determined for each pixel from the mean value, minimum value, maximum value or intermediate value of the signal level of a plurality of pixels, or in which of the values of k determined for each pixel, the mean value, minimum value, maximum value or intermediate value of k determined from a plurality of pixels is taken as the synthesis coefficient for each pixel.

Figure 36:
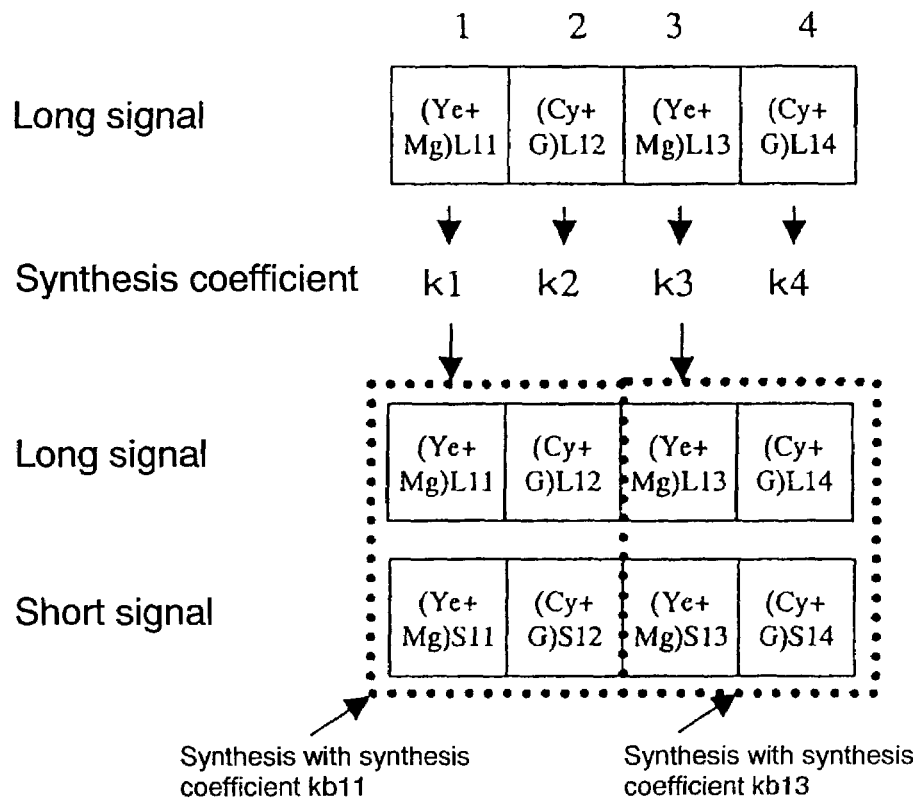
FIG. 36 is an illustrative view showing another example of a method of synthesizing the long signal and the short signal in Embodiment 1 of the present invention.

In Embodiment 1 of the present invention, in the signal synthesizer means 7, a configuration is also considered in which a synthesis coefficient for a block consisting of a plurality of pixels is determined to perform synthesization. For example, in FIG. 36, when the long signal (Ye+Mg)L11 and (Cy+G)L12, and the long signal (Ye+Mg)L13 and (Cy+G)L14 are taken as one block, respectively, while the short signal (Ye+Mg)S11 and (Cy+G)S12, and the short signal (Ye+Mg)S13 and (Cy+G)S14 existing on the same position as the long signals are taken as one block, respectively, it is possible to determine a synthesis coefficient for each block in two pixel units and perform synthesization. At this time, for example, the synthesis of the block consisting of the long signal (Ye+Mg)L11 and (Cy+G)L12 and the block consisting of the short signal (Ye+Mg)S11 and (Cy+G)S12 is performed, when the synthesis coefficient of these blocks is taken as kb11, as in the equation (18), respectively. ((Ye+Mg)M11, (Cy+G)M12 are signals after the synthesis)

$$(Ye+Mg)M11 = (1-kb11) \times (Ye+Mg)L11 + kb11 \times (Ye+Mg)S11 \times D$$

$$(Cy+G)M12 = \frac{(1-kb11) \times (Cy+G)L12 + kb11 \times (Cy+G)S12 \times D}{} \quad (18)$$

In this case, it is sufficient that k determined by the method shown in FIG. 13 from either the signal level of the long signal (for example, (Ye+Mg)L11 and (Cy+G)L12) included in the block, or at least one of the mean value, minimum value, maximum value and intermediate value of the long signal (for example, (Ye+Mg)L11 and (Cy+G)L12) included in the block is taken as the synthesis coefficient kb11 of the block. A configuration is also considered in which one of the mean value, minimum value, maximum value and intermediate value of the k values (for example, k1, k2 in FIG. 36) for each pixel determined by the method shown in FIG. 13 from each signal level of the long signal included in the block is taken as the synthesis coefficient kb11 of the block. It is needless to say that the number of pixels in the block is not limited to two pixels.

In Embodiment 1 of the present invention, in the signal synthesizer means 7, a configuration is also considered in which a block consisting of a plurality of pixels is provided, and a synthesis coefficient determined by the method shown in FIG. 13 from the signal level of the long signal existing on a specific position within the block, for example the central position of the block is used for the synthesis processing of each pixel in the block. In this case, it is unnecessary to determine the synthesis coefficient for each pixel, thereby allowing the processing to be simplified. The position of the pixel used to determine the synthesis coefficient is not required to be limited to the central position of the block.

In Embodiment 1 of the present invention, in the signal synthesizer means 7, a configuration is also considered in which the synthesis coefficient k is determined not from the long signal but from the short signal converted to a frame image.

A configuration is also considered in which the synthesis coefficient k is determined not from the short signal converted to a frame image but from the short signal as a field image. In this case, as can be seen from FIG. 12, the short signal corresponding to the even number line of the long signal does not exist, so that the synthesis coefficient cannot be determined when the short signal is still in that condition. In this case, it is sufficient that the synthesis coefficient on the position corresponding to the even number line of the long signal is determined from the peripheral short signal or the peripheral synthesis coefficient.

Figure 37:
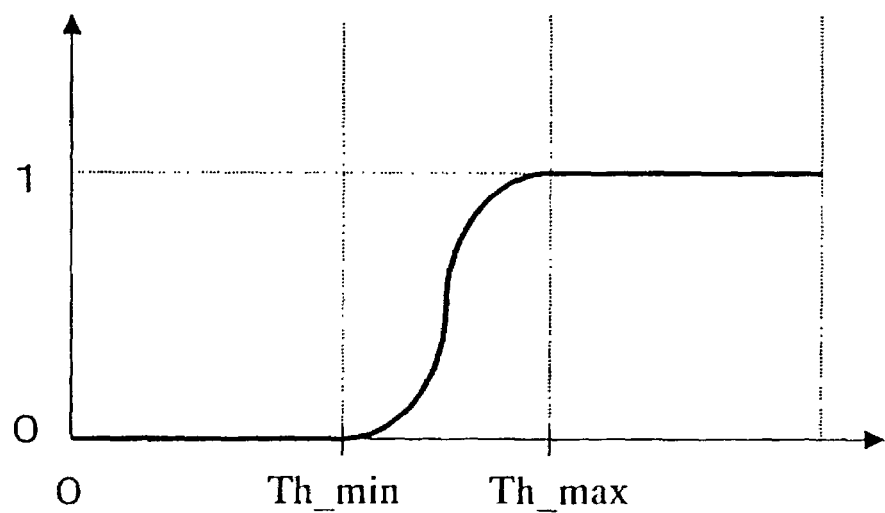
FIG. 37 is a graph showing another example of a method of deciding a synthesis coefficient from the long signal in Embodiment 1 of the present invention.

In Embodiment 1 of the present invention, an example of a method of determining the synthesis coefficient k from the signal level is shown in FIG. 13, but the method of determining the synthesis coefficient k is not limited to such a method, and for example, a method is considered in which k is non-linearly determined depending on the brightness level as shown, for example, in FIG. 37.

In Embodiment 2 of the present invention, the short signal is taken as a one-field image read in the field read mode, but is not limited to such a configuration, and for example, a configuration is considered in which the signal is read by thinning out the horizontal line signal in the vertical direction, as shown in FIG. 33 by way of example. In this case, the short signal is read without mixing of charges accumulated on the two upper/lower photodiodes in the solid-state imaging element, thereby making the two horizontal line addition processing unnecessary. In the interpolation processing by the interpolation means 702 shown in FIG. 4, it is necessary to perform the interpolation processing in a manner to match the number of horizontal lines of the short signal with the long signal. That is, in the interpolation means 702, a horizontal line signal for two lines is produced by the interpolation processing between horizontal line signals of the short signal. This causes the short signal and the long signal to have the same signal type, thereby allowing both the signals to be synthesized by the weighting addition means 703 shown in FIG. 4. However, the long signal to which the two upper/lower lines are not added is supplied to the brightness signal extraction means 70401, so that it is necessary to add newly the two horizontal line addition processing for extracting the brightness signal to the means. Or, it is necessary to provide the same means as the two line addition means 701 on the pre-step of the brightness signal extraction means 70401 so that the long signal to which the two upper/lower lines are added is supplied to the brightness signal extraction means 70401. When the short signal is read by thinning out the horizontal line signal in this manner, the two horizontal line addition processing for the long signal is described to be unnecessary, but the processing is not limited to such a configuration, and a configuration is also considered in which the long signal and the short signal are subject to the two horizontal line addition processing and then to the synthesis processing.

In Embodiment 2 of the present invention, the two signals having a different amount of exposure are taken as the short signal as one-field signal and as the long signal as one-frame image, but are not limited to such a configuration, and may be taken as the long signal as one-field signal and as the short signal as one-frame image depending on the application of the solid-state imaging element. In this case, it is sufficient to provide a configuration in which as shown in FIG. 34, the long signal is subject to the interpolation processing in the vertical direction by the interpolation means 702, while the short signal is subject to the addition of the two upper/lower lines adjacent to each other by the two horizontal line addition means 701, and in which the synthesis coefficient used in the weighting addition means 703 is determined from the long signal after the interpolation processing. A configuration is also considered in which the synthesis coefficient is determined from the long signal before the interpolation processing, in which case, it is sufficient that the corresponding long signal does not exist on the even-number lines of the short signal as shown in FIG. 34(*a*), and thus the synthesis coefficient k cannot be determined, so that the synthesis coefficient on the position of the even-number lines of the short signal is determined from the synthesis coefficient determined from the horizontal line of the long signal existing on the same position as the upper/lower lines of the even-number lines of the short signal. In this manner, the synthesis coefficient is determined the long signal as one-field image and the short signal as one-frame image, thereby allowing an expanded dynamic range image with a high resolution at a high-brightness portion to be picked up.

In Embodiment 2 of the present invention, in the signal synthesizer means 7, the synthesis coefficient k for synthesizing the long signal and the short signal is determined for each pixel of the long brightness signal, but the means is not limited to such a configuration, and for example, a configuration is also considered in which the synthesis coefficient k is determined for each pixel from the mean value, minimum value, maximum value or intermediate value of the brightness signal level of a plurality of pixels, or in which of the values of k determined for each pixel, the mean value, minimum value, maximum value or intermediate value of k determined from a plurality of pixels is taken as the synthesis coefficient for each pixel.

Figure 38:
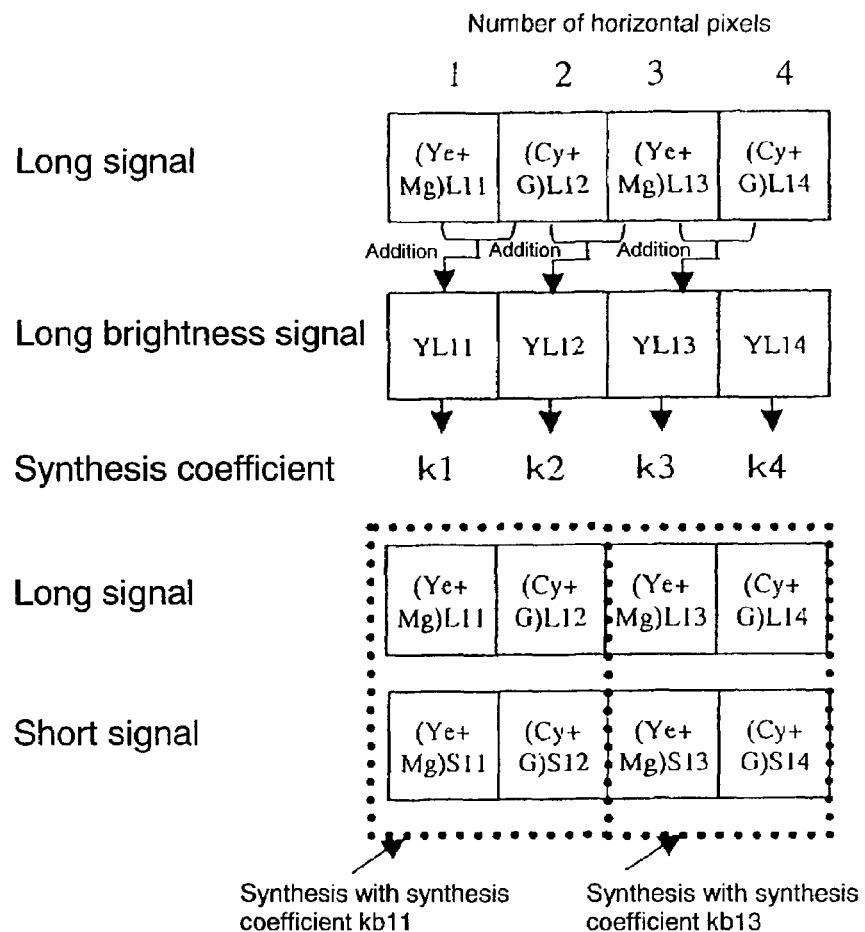
FIG. 38 is an illustrative view showing another example of a method of synthesizing the long signal and the short signal in Embodiment 2 of the present invention.

In Embodiment 2 of the present invention, in the signal synthesizer means 7, a configuration is also considered in which a synthesis coefficient for a block consisting of a plurality of pixels is determined to perform synthesization. For example, in FIG. 38, when the long signal (Ye+Mg) L11 and (Cy+G) L12, and the long signal (Ye+Mg) L13 and (Cy+G) L14 are taken as one block, respectively, while the short signal (Ye+Mg) S11 and (Cy+G) S12, and the short signal (Ye+Mg) S13 and (Cy+G)S14 existing on the same position as the long signals are taken as one block, respectively, it is possible to determine a synthesis coefficient for each block in two pixel units and perform synthesization. At this time, for example, the synthesis of the block consisting of the long signal (Ye+Mg)L11 and (Cy+G)L12 and the block consisting of the short signal (Ye+Mg)S11 and (Cy+G)S12 is performed, when the synthesis coefficient of these blocks is taken as kb11, as in the equation (18), respectively. In this case, it is sufficient that k determined by the method shown in FIG. 18 from either the signal level of the long brightness signal (for example, (Ye+Mg)L11 and (Cy+G)L12) corresponding to the block, or at least one of the mean value, minimum value, maximum value and intermediate value of the long brightness signal (for example, YL11 and YL12 in FIG. 38) corresponding to the block is taken as the synthesis coefficient kb11 of the block. A configuration is also considered in which one of the mean value, minimum value, maximum value and intermediate value of the k values (for example, k1, k2 in FIG. 38) for each pixel determined by the method shown in FIG. 18 from each signal level of the long brightness signal corresponding to the block is taken as the synthesis coefficient kb11 of the block. It is needless to say that the number of pixels in the block is not limited to two pixels.

In Embodiment 2 of the present invention, in the signal synthesizer means 7, a configuration is also considered in which a block consisting of a plurality of pixels is provided, and a synthesis coefficient determined by the method shown in FIG. 18 from the signal level of the long signal existing on a specific position within the block, for example the central position of the block is used for the synthesis processing of each pixel in the block. In this case, it is unnecessary to determine the synthesis coefficient for each pixel, thereby allowing the processing to be simplified. The position of the pixel used to determine the synthesis coefficient is not required to be limited to the central position of the block.

In Embodiment 2 of the present invention, in the signal synthesizer means 7, a configuration is also considered in which the synthesis coefficient is determined not from the long brightness signal but from the brightness signal (short brightness signal) extracted from the short signal converted to the frame image. Also, a configuration is also considered in which the synthesis coefficient k is determined not from the brightness signal extracted from the short signal converted to the frame image, but from the brightness signal extracted from the short signal as the field image. In this case, as can be seen from FIG. 12, the short signal corresponding to the even-number line of the long signal does not exist, so that when it is still in this condition, the synthesis coefficient cannot be determined. In this case, it is sufficient that the synthesis coefficient on the position corresponding to the even-number line of the long signal is determined from the peripheral short brightness signal or the peripheral synthesis coefficient.

Figure 39:
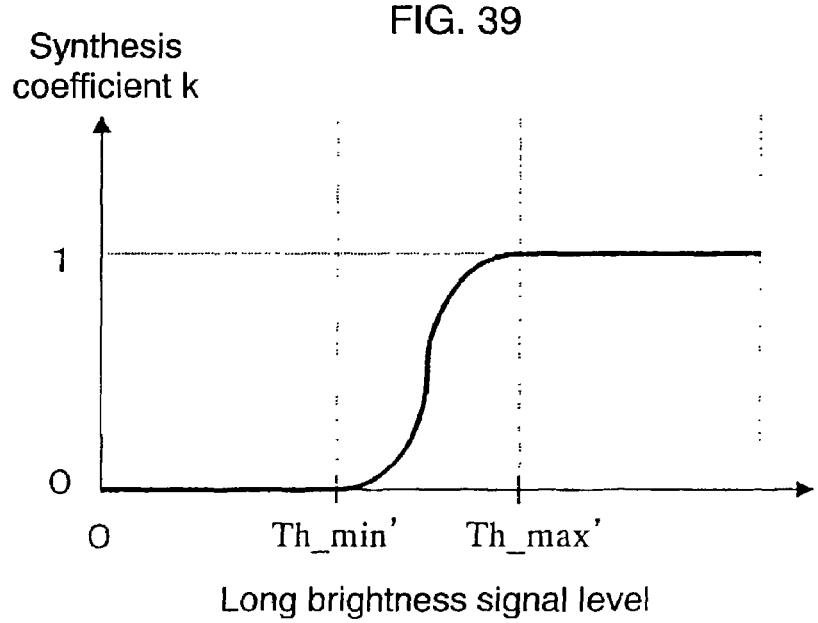
FIG. 39 is a graph showing another example of a method of deciding a synthesis coefficient from the long brightness signal in Embodiment 2 of the present invention.

In Embodiment 2 of the present invention, an example of a method of determining the synthesis coefficient k from the signal level is shown in FIG. 18, but the method of determining the synthesis coefficient k is not limited to such a method, and for example, a method is considered in which k is non-linearly determined depending on the brightness level as shown, for example, in FIG. 39.

Figure 40:
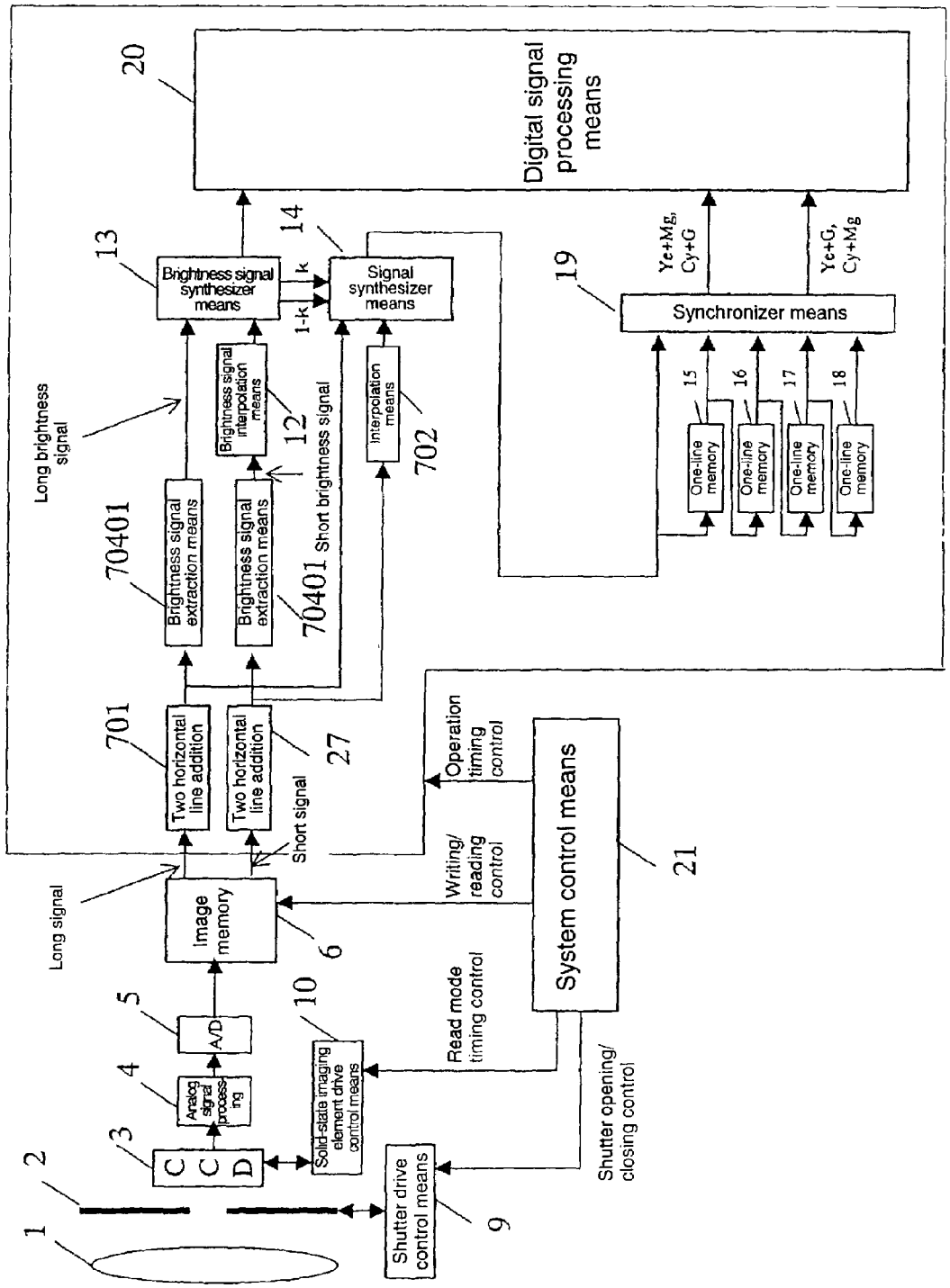
FIG. 40 is a block diagram of the solid-state imaging device when changing a short signal reading method in Embodiment 3 of the present invention.
Figure 41:
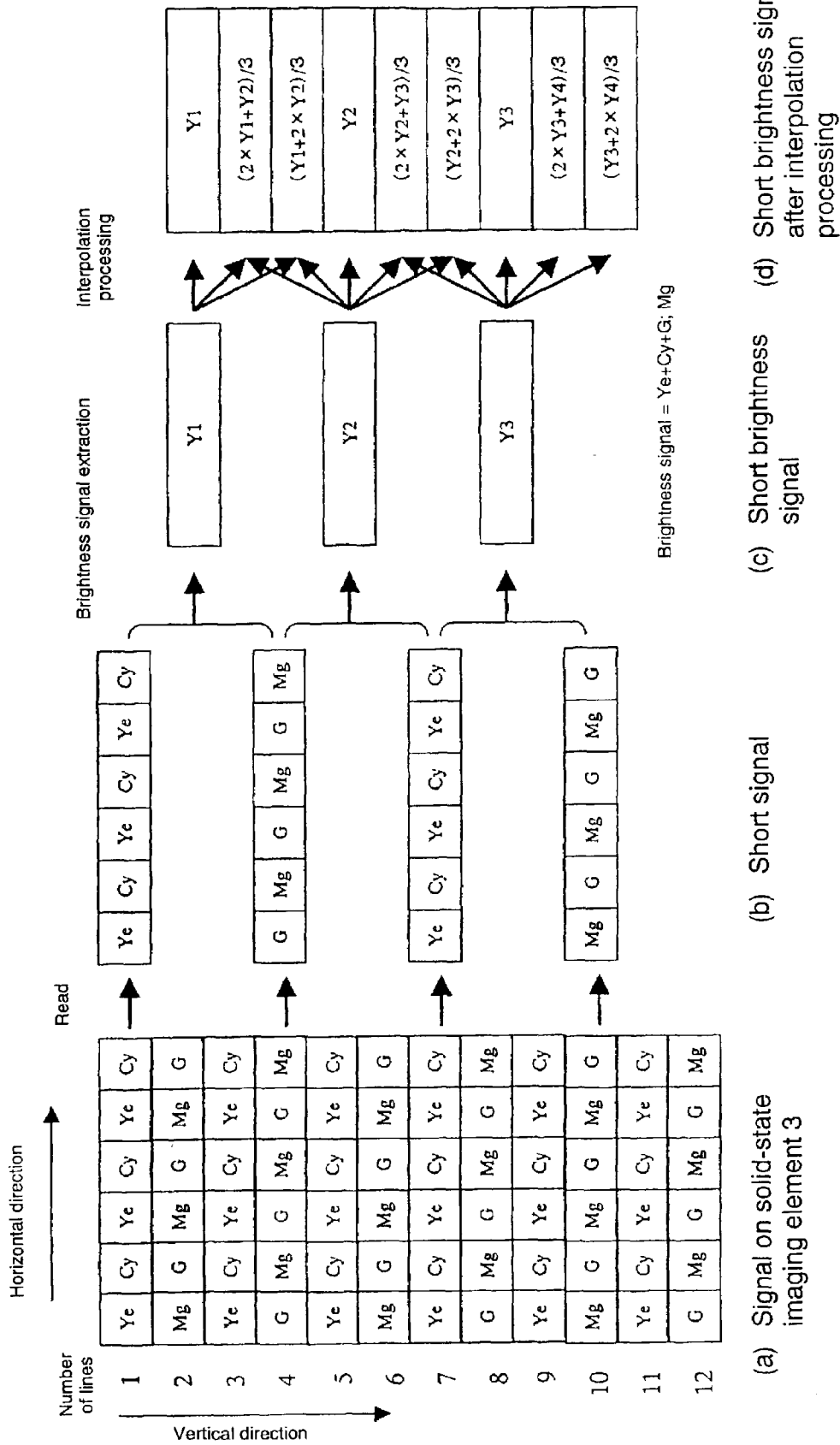
FIG. 41 is an illustrative view to explain the contents of the brightness signal interpolation processing when changing a short signal reading method in Embodiment 3 of the present invention.

In Embodiment 3 of the present invention, the short signal is taken as a one-field image read in the field read mode, but is not limited to such a configuration, and a configuration is considered in which the signal is read by thinning out the horizontal line signal in the vertical direction, as shown in FIG. 33 by way of example. In this case, the short signal is read without mixing of charges accumulated on the two upper/lower photodiodes in the solid-state imaging element, so that it is sufficient to provide a configuration as shown in, for example, FIG. 40. In the configuration shown in FIG. 40, the mixing of the two upper/lower pixels of the short signal is performed in the two horizontal line adder means 27 (which is the same means as the two horizontal line adder means 701, but is numbered as 27 to distinguish), and as a result, the same function/effect as the configuration shown in FIG. 20 can be realized. However, it is needless to say that in the brightness signal interpolation means 12, the contents of the interpolation processing varies with the thinning out the short signal. For example, when the short signal is a signal thinned out as shown in FIG. 30, as shown in, for example, FIG. 41, it is sufficient to produce interpolated horizontal line signals for two lined between horizontal lines of the short brightness signal (FIG. 41($c$)). It is needless to say that it is sufficient that similarly in the interpolation means 702, a required horizontal line signal is produced depending on the thinning out of the short signal. For the configuration in which the horizontal line signal is thinned out in the vertical direction to read as shown in FIG. 33, a configuration is shown in FIG. 40 which has two two-horizontal line adder means, that is, the two-horizontal line adder means 701 and 27, but is not limited to such a configuration, and a configuration is also considered which has no two-horizontal line adder means 701 and 27. In this case, including of means having the same effect as the two-horizontal line adder means 701 and 27 allows the brightness extraction from the long signal and the short signal. Such a configuration having no two-horizontal line adder means 701 and 27 is also valid in a pick up system in which the color filter formed on the solid-state imaging element 3 consists of, for example, primary colors of red(R), green(G) and blue(B), and the brightness signal and the color signal are obtained generally without mixing the charges on the photodiode of the solid-state imaging element 3.

In Embodiments 3 and 4 of the present invention, the two signals having a different amount of exposure are taken as the short signal as one-field image and as the long signal as one-frame image, but are not limited to such a configuration, and may be taken as the long signal as one-field signal and as the short signal as one-frame image depending on the application of the solid-state imaging device. In this case, it is sufficient that the long brightness signal obtained from the long signal is subject to the interpolation processing in the vertical direction by the brightness signal interpolation means 12, and the long signal after the interpolation processing and the short signal are synthesized in the brightness signal synthesizer means 13, and that the synthesis coefficient used at that time is determined from the long signal after the interpolation processing. As with Embodiments 1 and 2 of the present invention, a configuration is also considered in which the synthesis coefficient is determined from the long signal before the interpolation processing. In this manner, the synthesis coefficient is determined from the long signal as one-field image and the short signal as one-frame image, thereby allowing an expanded dynamic range image with a high resolution at a high-brightness part to be picked up.

In Embodiment 3 of the present invention, the interpolation means 720 uses two one-line memories and performs the interpolation processing from the signal for two horizontal lines, but is not limited to such configuration, and for example, a configuration is also considered in which the means uses a large number of one-line memories and performs the interpolation processing by a high-rank interpolation processing from a large number of horizontal line signals. A configuration is also considered in which outputting repeatedly twice the one-horizontal lines inputted causes the number of horizontal lines to become double, that is, the so-called previous-value interpolation to be performed.

In Embodiments 3 and 4 of the present invention, the brightness signal interpolation means 12 takes the addition mean value of the two horizontal line signal as the interpolation signal, but is not limited to such a configuration, and a configuration is also considered in which the interpolation processing is performed by a high-rank interpolation processing from a large number of horizontal line signals, or in which the interpolation signal is obtained by a previous-value interpolation.

In Embodiments 3 and 4 of the present invention, in the brightness signal synthesizer means 13, the synthesis coefficient k for synthesizing the long brightness signal and the short brightness signal is determined for each pixel of the long brightness signal, but the means is not limited to such a configuration, and for example, a configuration is also considered in which the synthesis coefficient k is determined for each pixel from the mean value, minimum value, maximum value or intermediate value of the long brightness signal level of a plurality of pixels, or in which of the values of k determined for each pixel, the mean value, minimum value, maximum value or intermediate value of k determined from a plurality of pixels is taken as the synthesis coefficient for each pixel.

Figure 43:
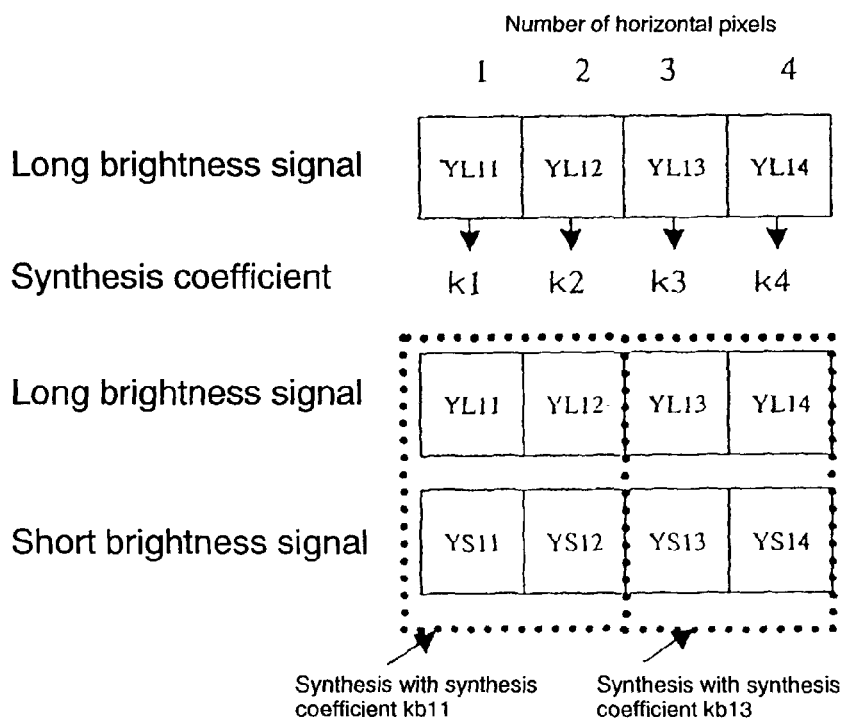
FIG. 43 is an illustrative view showing another example of a method of synthesizing the long brightness signal and the short brightness signal in Embodiments 3 and 4 of the present invention.

In Embodiments 3 and 4 of the present invention, in the brightness signal synthesizer means 13, a configuration is also considered in which a synthesis coefficient for a block consisting of a plurality of pixels is determined to perform synthesization. For example, in FIG. 43, when the long brightness signal YL11 and YL12, and YL13 and YL14 are taken as one block, respectively, while the short brightness signal YS11 and YS12, and YS13 and YS14 existing on the same position as the long brightness signals are taken as one block, respectively, it is possible to determine a synthesis coefficient for each block in two pixel units and perform synthesization. At this time, for example, the synthesis of the block consisting of the long brightness signal YL11 and YL12 and the block consisting of the short brightness signal YS11 and YS12 is performed, when the synthesis coefficient of these blocks is taken as kb11, as in the equation (19). (YM is a brightness signal after synthesis)

$$YM11=(1-kb11)\times YL11+kb11\times YS11\times D$$

$$YM12=(1-kb11)\times YL12+kb11\times YS12\times D \quad (19)$$

In this case, it is sufficient that k determined by the method shown in FIG. 18 from either the signal level of the long brightness signal (for example, Y11 and Y12 in FIG. 43) corresponding to the block, or at least one of the mean value, minimum value, maximum value and intermediate value of the long brightness signal corresponding to the block is taken as the synthesis coefficient kb11 of the block. A configuration is also considered in which one of the mean value, minimum value, maximum value and intermediate value of the k values (for example, k1, k2 in FIG. 43) for each pixel determined by the method shown in FIG. 18 from each signal level of the long brightness signal corresponding to the block is taken as the synthesis coefficient kb11 of the block. It is needless to say that the number of pixels in the block is not limited to two pixels.

In Embodiments 3 and 4 of the present invention, in the brightness signal synthesizer means 13, a configuration is also considered in which a block consisting of a plurality of pixels is provided, and a synthesis coefficient determined by the method shown in FIG. 18 from the signal level of the long brightness signal corresponding to a specific position within the block, for example the central position of the block is used for the synthesis processing of each pixel in the block. In this case, it is unnecessary to determine the synthesis coefficient for each pixel, thereby allowing the processing to be simplified. The position of the pixel used to determine the synthesis coefficient is not required to be limited to the central position of the block.

Figure 42:
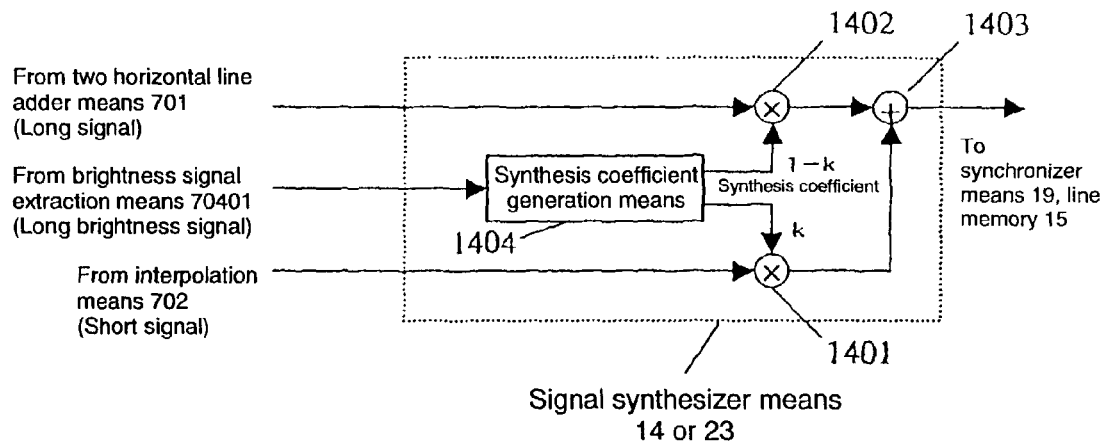
FIG. 42 is a block diagram showing another configuration of the signal synthesizer means in Embodiment 3 of the present invention.

In Embodiments 3 and 4 of the present invention, in the signal synthesizer means 14 and 23, the synthesis coefficient k for synthesizing the long signal and the short signal uses a value determined for each pixel by the synthesis coefficient generation means 1301 from the long brightness signal, but the determination is not limited to such a configuration, and for example, a configuration is also considered in which the synthesis coefficient generation means 1404 is independently provided within the signal synthesizer means 14 and 23 as shown in FIG. 42, and the synthesis coefficient k is determined for each pixel from the mean value, minimum value, maximum value or intermediate value of the brightness signal level of a plurality of pixels, or in which of the values of k determined for each pixel, the mean value, minimum value, maximum value or intermediate value of k determined from a plurality of pixels is taken as the synthesis coefficient for each pixel. Here, the function of the synthesis coefficient generation means 1404 is the same as the synthesis coefficient generation means 1301.

In Embodiments 3 and 4 of the present invention, in the signal synthesizer meanss 14 and 23, a configuration is also considered in which a synthesis coefficient for a block consisting of a plurality of pixels is determined to perform synthesization. For example, in FIG. 38, when the long signal (Ye+Mg)L11 and (Cy+G)L12, and the long signal (Ye+Mg)L13 and (Cy+G)L14 are taken as one block, respectively, while the short signal (Ye+Mg)S11 and (Cy+G)S12, and the short signal (Ye+Mg)S13 and (Cy+G)S14 existing on the same position as the long signals are taken as one block, respectively, it is possible to determine a synthesis coefficient for each block in two pixel units and perform synthesization. At this time, for example, the synthesis of the block consisting of the long signal (Ye+Mg)L11 and (Cy+G)L12 and the block consisting of the short signal (Ye+Mg)S11 and (Cy+G)S12 is performed, when the synthesis coefficient of these blocks is taken as kb11, as in the equation (18). In this case, it is sufficient that k determined by the method shown in FIG. 18 from either the signal level of the long brightness signal (for example, YL11 and YL12 in FIG. 38) existing spatially on the same position as respective blocks, or at least one of the mean value, minimum value, maximum value and intermediate value of the long brightness signal existing spatially on the same position as respective blocks is taken as the synthesis coefficient kb11 of the block. A configuration is also considered in which one of the mean value, minimum value, maximum value and intermediate value of the k values (for example, k1, k2 in FIG. 36) for each pixel determined by the method shown in FIG. 18 from each signal level of the long brightness signal existing spatially on the same position as respective blocks is taken as the synthesis coefficient kb11 of the block. It is needless to say that the number of pixels in the block is not limited to two pixels.

In Embodiments 3 and 4 of the present invention, in the signal synthesizer meanss 14 and 23, a configuration is also considered in which a block consisting of a plurality of pixels is provided, and a synthesis coefficient determined by the method shown in FIG. 18 from the signal level of the long brightness signal existing on a specific position within the block, for example, the central position of the block is used for the synthesis processing of each pixel in the block. In this case, it is unnecessary to determine the synthesis coefficient for each pixel, thereby allowing the processing to be simplified. The position of the pixel used to determine the synthesis coefficient is not required to be limited to the central position of the block.

In Embodiments 3 and 4 of the present invention, a configuration is also considered in which the synthesis coefficient k used in the signal synthesizer meanss 14 and 23 is taken as a value obtained by multiplication of the value obtained by the above-mentioned method from the long brightness signal by a certain coefficient, or a value obtained by addition/subtraction of a certain coefficient.

In Embodiments 3 and 4 of the present invention, in the brightness signal synthesizer means 13, and signal synthesizer meanss 14 and 23, a configuration is also considered in which the synthesis coefficient k is determined not from the long brightness signal but from the brightness signal (short brightness signal) extracted from the short signal converted to the frame image. Also, a configuration is also considered in which the synthesis coefficient k is determined not from the brightness signal extracted from the short signal converted to the frame image, but from the brightness signal extracted from the short signal as the field image. In this case, as can be seen from FIG. 12, the short signal corresponding to the even-number line of the long signal does not exist, so that when it is still in this condition, the synthesis coefficient cannot be determined. In this case, a method is considered in which the synthesis coefficient on the position corresponding to the even-number line of the long signal uses the peripheral short brightness signal or the peripheral synthesis coefficient as they are, or in which the synthesis coefficient is determined from the mean value, maximum value, minimum value of intermediate value of the peripheral synthesis coefficient.

In Embodiments 3 and 4 of the present invention, an example of a method of determining the synthesis coefficient k from the brightness signal level is shown in FIG. 18, but the method of determining the synthesis coefficient k is not limited to such a method, and for example, a method is considered in which k is nonlinearly determined depending on the brightness level as shown, for example, in FIG. 39.

In Embodiment 4 of the present invention, the short signal is taken as a one-field image read in the field read mode, but is not limited to such a configuration, and a configuration is considered in which the signal is read by thinning out the horizontal line signal in the vertical direction, as shown in FIG. 33 by way of example. In this case, the short signal is read without mixing of charges accumulated on the two upper/lower photodiodes in the solid-state imaging element, so that, for example, when the two upper/lower pixels is to be mixed by the two horizontal line addition means as with FIG. 40, with the result that the same function/effect as the configuration shown in FIG. 30 is realized. However, it is needless to say that in the brightness signal interpolation means 12 as with Embodiment 3 of the present invention, the contents of the interpolation processing varies with the thinning out of the short signal. It is needless to say that similarly also in the thinning out means 22, it is sufficient that thinning out is performed depending on the thinning out of the short signal in a manner that the long signal exhibits the same signal type as the short signal.

Figure 44:
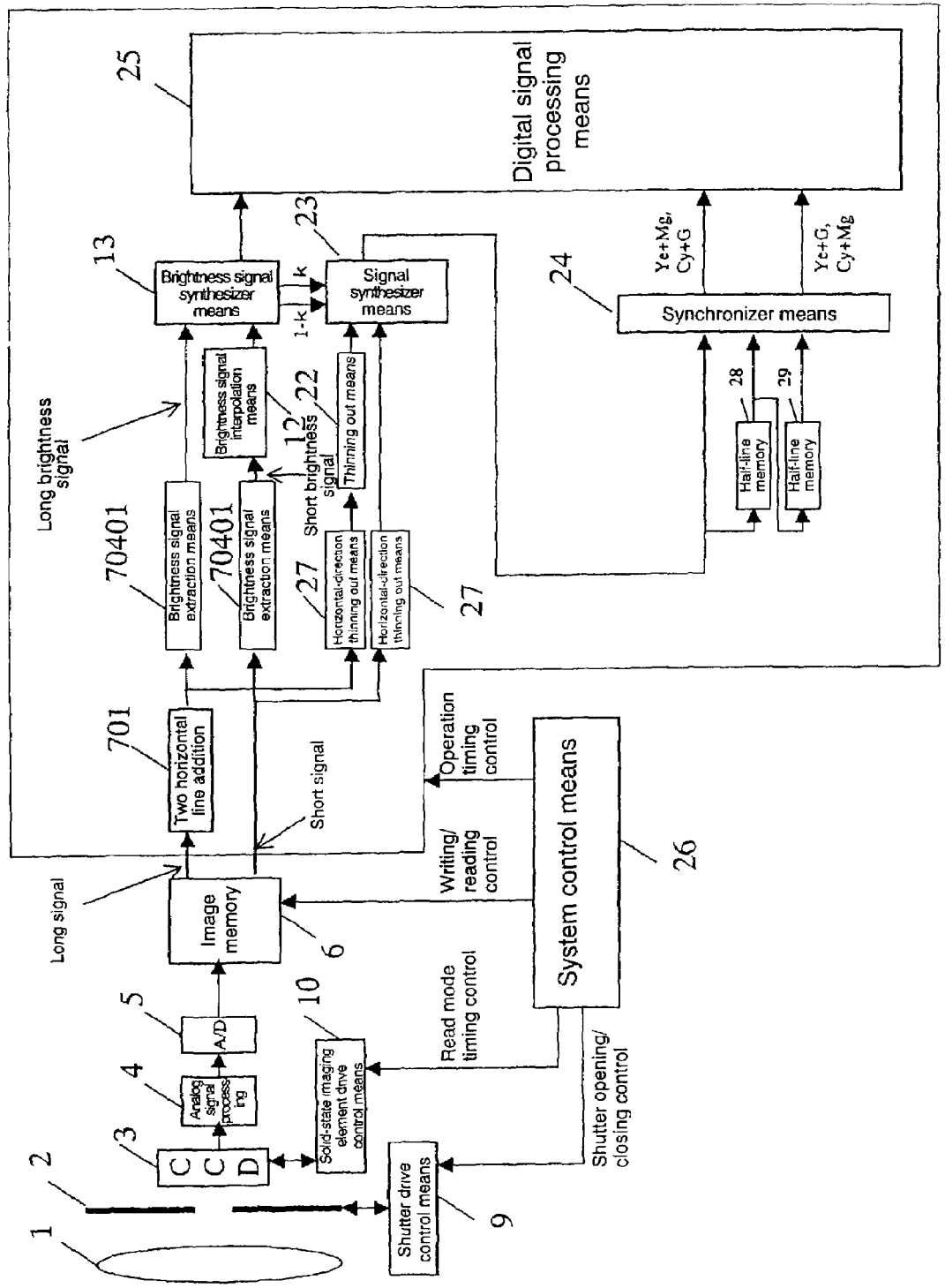
FIG. 44 is a block diagram showing another example of the solid-state imaging device in an fourth embodiment of the present invention.

In Embodiment 4 of the present invention, there has been explained a configuration in which the thinning out processing of the long signal in the vertical direction is performed by the thinning out means 22, but a configuration is also considered in which there is provided a horizontal-direction thinning out means 27 having a function of thinning the pixel in the horizontal direction out of said image signal as shown in FIG. 44, whereby the pixels in the horizontal direction of both the long signal and the short signal passing through the two horizontal line adder means 701 is thinned out to, for example, a half. In this case, thinning out the pixels in the horizontal direction to a half as mentioned above allows the one-line memories 15, 16 for synchronization to be substituted by half-line memories with a capacity a half thereof. Thinning out the pixels in the horizontal direction in this manner allows the solid-state imaging device to be further simplified in configuration and to be made cheaper. In this case, when the long signal and the short signal are previously subject to the band restriction in the horizontal direction before the thinning out processing in the horizontal direction is performed, an unwanted reflection does not occur by the thinning out processing. It is needless to say that when the signals are also subject to the band restriction in the vertical direction in the same manner, an unwanted reflection can be avoided even in performing the thinning out processing in the vertical direction.

In all of the above-mentioned embodiments of the present invention, the long signal and the short signal are stored in the image memory 6 for a time, but the procedure is not limited to such a method, and a method is also considered in which, for example, only one of either the long signal or the short signal is stored in the image memory 6, and the read of the remaining signal from the solid-state imaging element 3 and the read of the signal from the image memory 6 are synchronized to perform the synthesis processing. In this case, the capacity of the image memory 6 can be reduced, and the solid-state imaging device can be configured at a cheaper cost.

Figure 45:
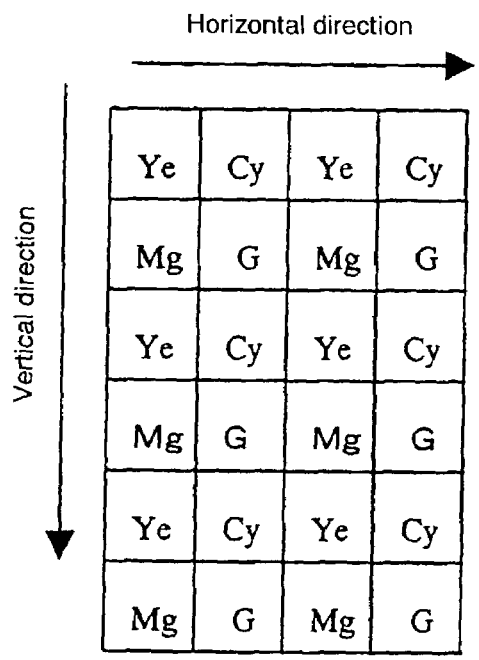
FIG. 45 is a view showing another example of the arrangement of color filters formed on the solid-state imaging element.
Figure 46:
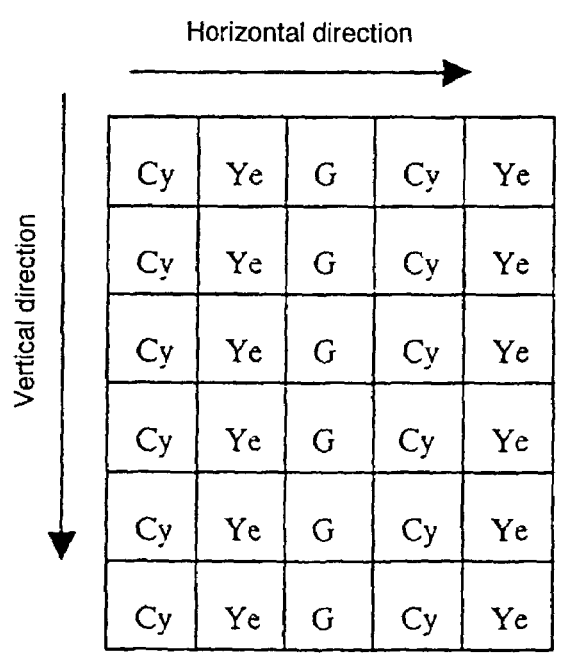
FIG. 46 is a view showing another example of the arrangement of color filters formed on the solid-state imaging element (of CyYeG stripe method).

In all of the above-mentioned embodiments of the present invention, the arrangement of the color filters formed on the solid-state imaging element 3 is explained using complementary-color checkered type consisting of four colors of magenta, green, yellow and cyan as shown in FIG. 3, but is not limited to such a configuration, and by way of example, an arrangement is also considered in which magenta (Mg) and green (G) are not reversed in position for each line as shown in FIG. 45, and a configuration is also considered in which two complementary-color filters for green (G) and cyan (Cy), yellow (Ye) are arranged in stripe shape as shown in FIG. 46.

Figure 49:
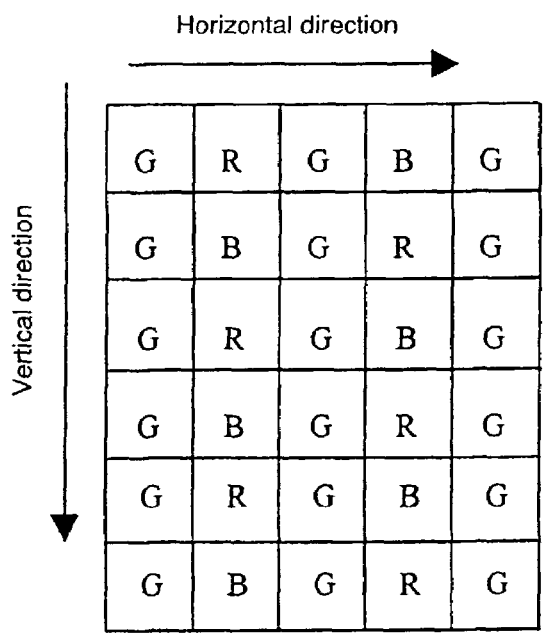
FIG. 49 is a view showing another example of the arrangement of color filters formed on the solid-state imaging element (of G stripe RB completely checkered method).
Figure 50:
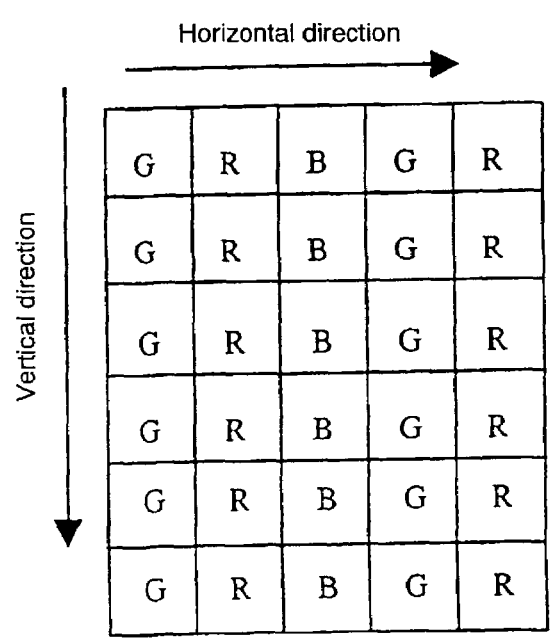
FIG. 50 is a view showing another example of the arrangement of color filters formed on the solid-state imaging element (of stripe method).
Figure 53:
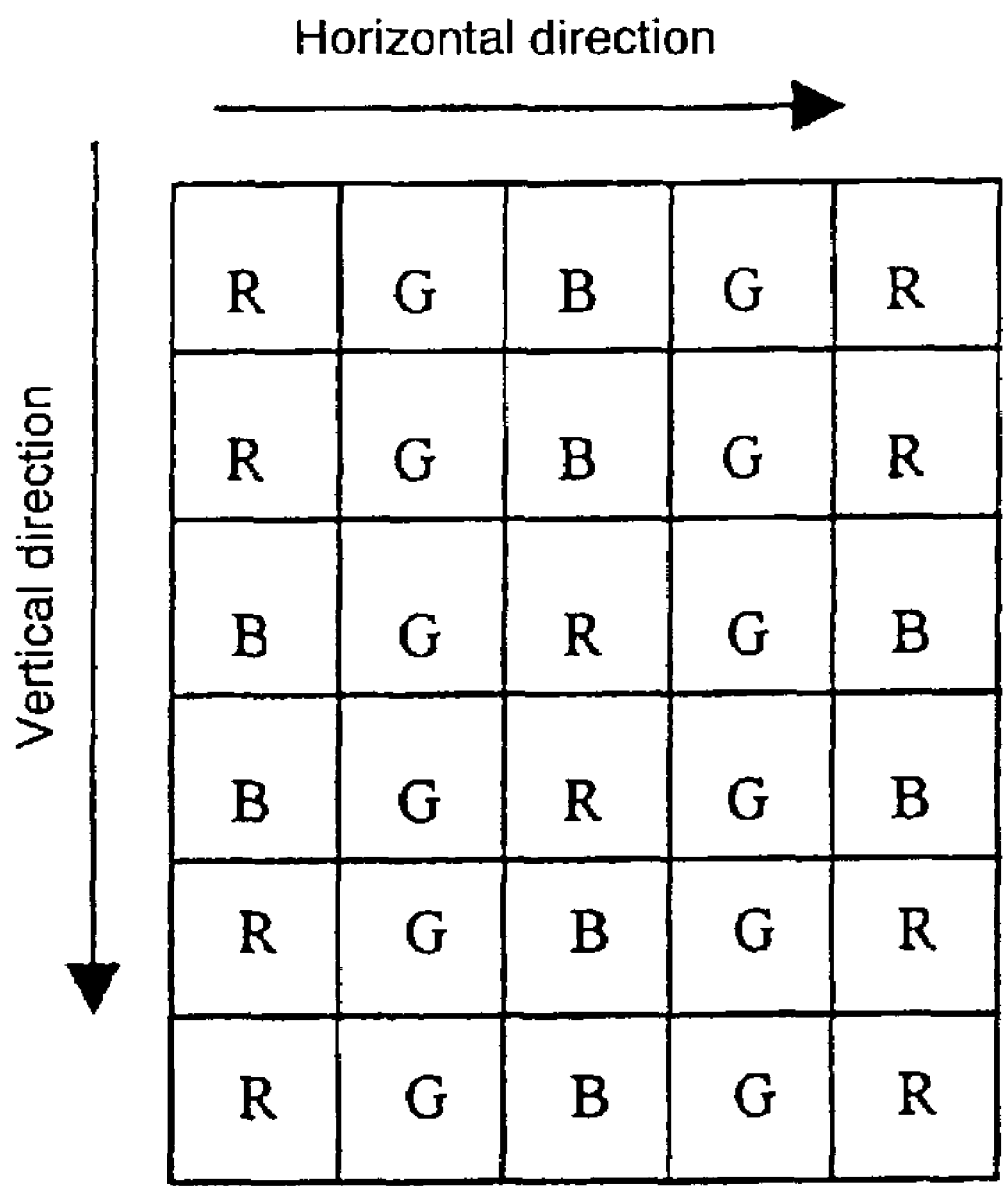
FIG. 53 is a view showing another example of the arrangement of color filters formed on the solid-state imaging element (of G stripe RB point sequential method).

In all of the above-mentioned embodiments of the present invention, the arrangement of the color filters formed on the solid-state imaging element 3 is explained using configuration consisting of four colors of magenta, green, yellow and cyan as shown in FIG. 3, but is not limited to such a configuration, and a configuration is also considered which uses filters for primary colors consisting of green (G), blue (B) and red (R). By way of example as the filter arrangement, there are considered the bayer method shown in FIG. 47, the inter-line method shown in FIG. 48, the G stripe RB completely checkered method shown in FIG. 49, the stripe method shown in FIG. 50, the diagonal stripe method shown in FIG. 51, the G stripe RB line sequential method shown in FIG. 52, the G stripe RB point sequential method shown in FIG. 53, and the like. It is needless to say that when the primary color filter is used, the brightness signal is determined according to the equation (20).

$$\text{Brightness signal}=0.3\times R+0.59\times G+0.11\times B \quad (20)$$

In all of the above-mentioned embodiments of the present invention, the arrangement of the color filters formed on the solid-state imaging element 3 is explained using complementary-color checkered type consisting of four colors of magenta, green, yellow and cyan as shown in FIG. 3, and further, the read of the short signal is explained as the field read, so that the two horizontal upper/lower line addition processing of the long signal by the two horizontal line adder means 701 is included to match in signal type the long signal with the short signal, but are not limited to such a configuration, and it is needless to say that when another filter arrangement is employed as shown in FIGS. 45 to 53, or when rather than the field read, the thinning out read as shown in FIG. 33 is performed, the two horizontal upper/lower line addition processing is not necessarily required.

In all of the above-mentioned embodiments of the present invention, a configuration is also considered in which thresholds Th_max, Th_min, Th_max', and Th_min' in determining the synthesis coefficient are set as in the equation (21), respectively, and the long-time exposure signal and the short-time exposure signal are switched by a signal level rather than the weighting addition.

$$\text{Th\_max}=\text{Th\_min}$$

$$\text{Th\_max'}=X\ \text{Th\_min'} \quad (21)$$

(4) Embodiment 5

The fifth embodiment is wherein the image synthesizer means 38 has the same means as the signal synthesizer means included in Embodiments 1 to 4, and in addition, an exposure amount ratio detector means 36 is included.

That is, when in a method of using a plurality of image signals having a different exposure amount and synthesizing the signals to pick up an image with an expanded dynamic range, Embodiment 5 of the present invention has a configuration in which the exposure time is controlled using a mechanical shutter serving also as an optical aperture, or when a subject is picked up in a such condition of light source illumination that the brightness level of an illumination for the subject, for example, a fluorescent lamp varies periodically, even when the ratio in the exposure amount of a plurality of image signals having a different exposure amount is not determined simply as the ratio in the exposure amount, an synthesis image after the image synthesis processing has stably continuous gradation characteristics by actually determining of the exposure amount ratio in the full screen field in each pixel of the long-time exposure signal and the short-time exposure signal.

Figure 54:
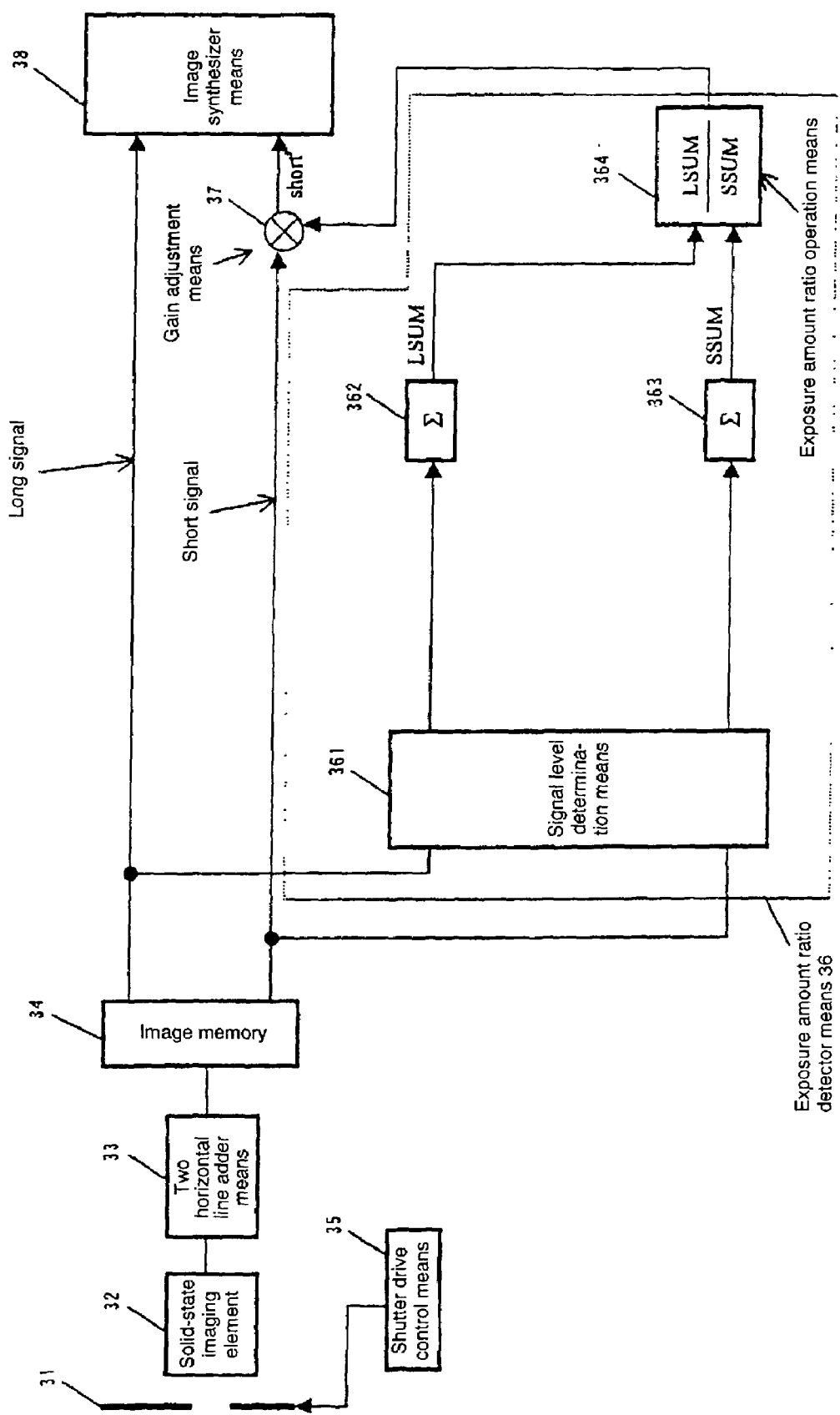
FIG. 54 is a block diagram showing a configuration of the solid-state imaging device in Embodiment 5 of the present invention.

FIG. 54 is a block diagram showing a configuration of the solid-state imaging device in Embodiment 5 of the present invention. In FIG. 54, the numeral 31 designates a mechanical shutter serving also as an optical aperture; and the numeral 32 designates a solid-state imaging element, and is taken as a whole pixel read-type CCD (Charge Coupled Device) in Embodiment 5. The numeral 33 designates two horizontal line adder means for adding two horizontal lines to the output from the solid-state imaging element 32; the numeral 34, an image memory for storing the signal for two frames after addition of the horizontal lines from the solid-state imaging element 32; the numeral 35, a shutter drive control means for performing the open/close control of the mechanical shutter 31; the numeral 36, an exposure amount ratio detector means for determining the exposure amount ratio of a plurality of image signals having a different exposure amount; the numeral 37, a gain adjustment means for performing the gain adjustment to a plurality of image signals having a different exposure amount; and the numeral 38, image synthesizer means for performing the image synthesization to expand the dynamic range.

In the block of the exposure amount ratio detector means 36, the numeral 361 designates signal level determination means; the numeral 362, integrator means for the long signal; the numeral 363, integrator means for the short signal; and the numeral 364, exposure amount ratio operation means for determining the ratio (LSUM/SSUM) of an integrated value LSUM in the whole screen field by the long signal integrator means 362 to an integrated value SSUM in the whole screen field by the short signal integrator means 363.

Figure 55:
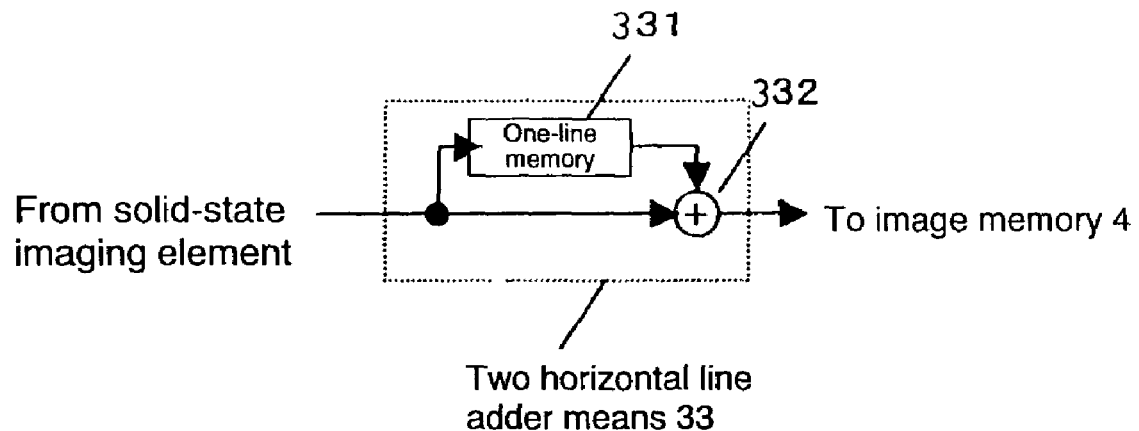
FIG. 55 is a block diagram showing a configuration example of two horizontal line adder means in the solid-state imaging device in Embodiment 5 of the present invention.

FIG. 55 is a block diagram showing a configuration example of the two horizontal line adder means 33 in block diagram of FIG. 54. In the diagram, the numeral 331 designates a one-line memory which is means for delaying by one horizontal synchronous period said image signal for one-line memory outputted from the solid-state imaging element 32. The numeral 332 designates an adder in which the horizontal line signal delayed in the one-line memory 331 and the horizontal line signal inputted into the two horizontal line adder means 33 are added to each other, whereby the addition of two upper/lower lines adjacent to each other is performed.

Figure 56:
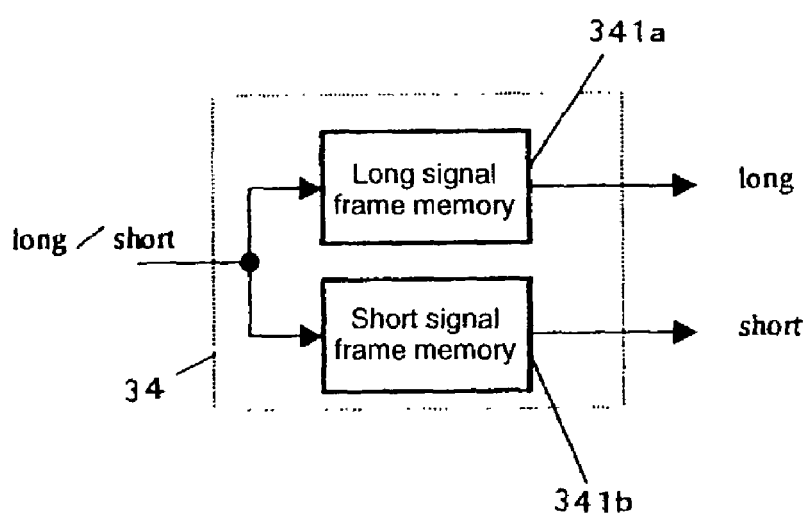
FIG. 56 is a block diagram showing a configuration example of an image memory in the solid-state imaging device in Embodiment 5 of the present invention.

FIG. 56 shows a configuration example of the image memory 34 in the block diagram of FIG. 54. The image memory 34 has a configuration in which the image memory 34 requires a memory capacity capable of storing two frames, and for example, as shown in FIG. 56, has two frame memories of a long signal frame memory 341a and a short signal frame memory 341b, so that the long signal and the short signal can be controlled in a manner that they are stored independently of respective frame memories.

With respect to the solid-state imaging device of the present fifth embodiment configured as described above, the operation thereof will be explained hereinafter.

A concrete example will be explained of a case where Embodiment 5 picks up two images of the short-time exposure signal (short signal) and the long-time exposure signal (long signal) to synthesize these signals.

Figure 57:
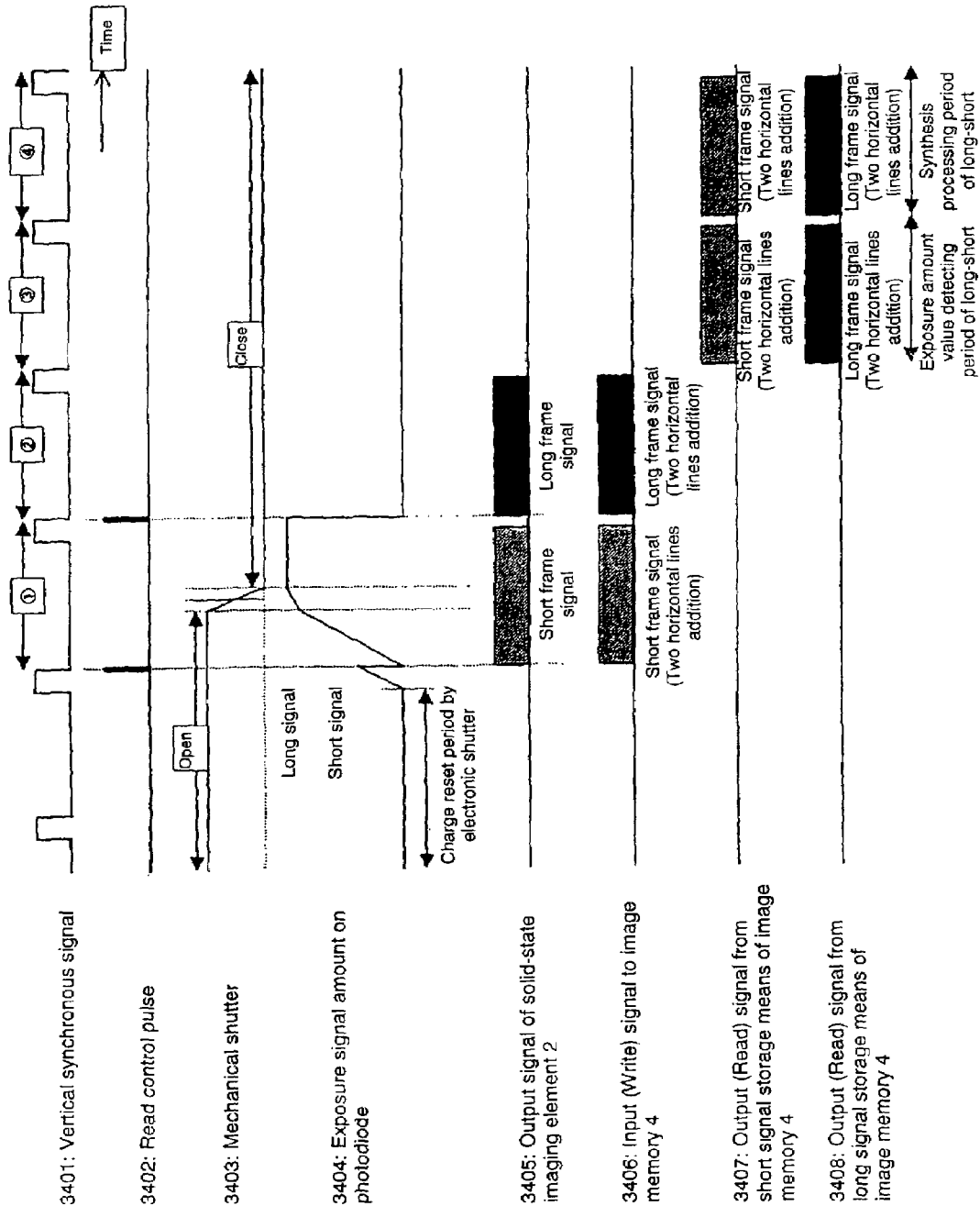
FIG. 57 is a timing chart with respect to the exposure of a subject image, to the read of an exposed signal, and to the read/write operation of the image memory in the solid-state imaging device in Embodiment 5 of the present invention.

First, the method of picking up the short signal and the long signal will be explained using FIG. 57. FIG. 57 is a timing chart with respect to the exposure of a subject image, to the read of an exposed signal, and to the read/write operation of the image memory 34 in the solid-state imaging device 32. In FIG. 57, the numeral 3401 designates a timing of the synchronous signal in the vertical direction; the numeral 3402, a timing of a read control pulse for controlling the signal charge read from the photodiode of the solid-state imaging element 32; the numeral 3403, a timing showing the opening/closing state of the mechanical shutter 31; the numeral 3404, a timing showing the exposure signal amount on the photodiode of the solid-state imaging element 32; the numeral 3405, a timing of the signal outputted from the solid-state imaging element 32; the numeral 3406, a timing of the input (write) signal of the image memory 34; the numeral 3407, a timing of the output (read) signal from the short signal storage means (the short signal frame memory 341b) of the image memory 34; and the numeral 3408, a timing of the output (read) signal from the long signal storage means (the long signal frame memory 341a) of the image memory 34.

At the short signal exposure, with the mechanical shutter 31 being opened, using an electrical shutter function, the exposure is performed for a required exposure time, for example, one thousandth of a second. After the exposure for one thousandth of a second is finished, the charge accumulated on the photodiode is moved to the vertical transfer CCD by the read control pulse. At this time, the read mode of the solid-state imaging element 32 should drive in the whole pixel read mode.

Then, after short signal is moved to the vertical transfer CCD, the long signal should be exposed. The exposure time of the long signal is taken as, for example, one hundredth of a second. The exposure time of the long signal should be controlled by the opening/closing of the mechanical shutter 2. Although concurrently with the above-mentioned exposure, the short signal for one frame is outputted from the solid-state imaging element 32, the charge accumulated on the photodiode for the long signal is moved to the vertical transfer CCD by the read control pulse. At this time, the read mode of the solid-state imaging element 32 should drive in the read mode. The cycle of the vertical synchronous signal is taken as, for example, three tenths of a second, and the signal read for one field should be completed within one cycle of the vertical synchronous signal.

After the two signals of the short signal and the long signal with a different exposure time obtained by the solid-state imaging element 32 are respectively and individually subject to the two horizontal line addition processing for adding/mixing the two upper/lower line signals adjacent to each other on the solid-state imaging element 32 by the two horizontal line adder means 33, as shown in the timing of the numeral 3406, the short signal is for a time stored in the short signal frame memory 341b of the image memory 34 during period ①, while the long signal is for a time stored in the long signal frame memory 341a of the image memory 34 during period ②.

Then, the short signal and the long signal are read from the image memory 34 during periods ③, ④ as shown in the timing of the numerals 3407 and 3408.

During period ③, in the exposure amount ratio detector means 36, the exposure amounts of each pixel in the respective whole screen field of the short signal (short frame signal) and the long signal (long frame signal) are integrated, whereby the whole amount of exposure (SSUM, LSUM) is determined.

During period ③, the timing of reading the short signal and the long signal from the image memory 34 is such that the short signal and the long signal are read sequentially from the first line in a manner that the lines on the positions corresponding to each other on the solid-state imaging element 32 are outputted in that timing. Here, during period ③, the short signal and the long signal read from the image memory 34 are inputted into the exposure amount ratio detector means 36. The exposure amount ratio detector means 36 performs the exposure amount ratio detection in the whole screen of the short signal and the long signal, so that an integrated value of the exposure amount of each pixel in the respective whole screen field of the short signal and the long signal is determined, and then the ratio of the integrated value (LSUM/SSUM) is determined.

The short signal and the long signal inputted in synchronism with the line into the exposure amount ratio detector means 36 are determined, respectively, for the level in signal level determination means 361, and a signal determined to be at a level out of a predetermined range is neglected so as not to be integrated in a long signal integrator means 362 and a short signal integrator means 363. Here, the level out of a predetermined range means that it is a level at which the ratio in the exposure amount is difficult to determine, and more specifically, that with respect to signal, the long signal is a signal of a high brightness portion near the saturation level of the solid-state imaging element 32, while short signal is a signal of a low brightness portion on which the noise effect largely acts.

Figure 58:
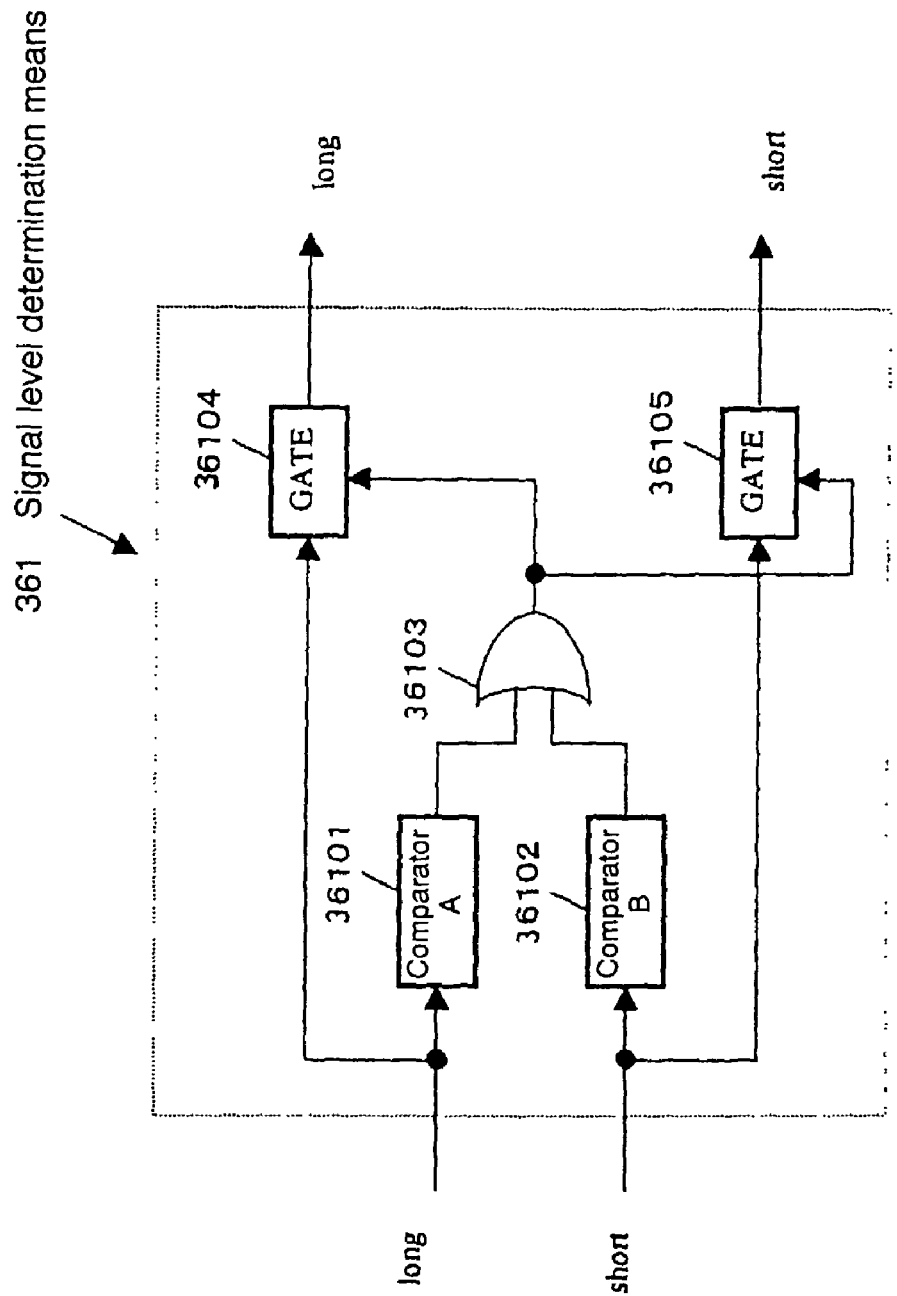
FIG. 58 is a block diagram showing a configuration example of signal level determination means in the solid-state imaging device in Embodiment 5 of the present invention.

FIG. 58 is a block diagram showing a configuration in the signal level determination means 361. Here, in FIG. 58, the numeral 36101 designates means (a comparator A) for determining the level of the long signal; the numeral 36102, means (a comparator B) for determining the level of the short signal; the numeral 36103, an OR gate; the numeral 36104, a gate means for gating the long signal; and the numeral 36105, a gate means for gating the short signal. In the means 36101 for determining the level of the long signal, the gate means 36104 gates the high-brightness signal near the saturation level of the solid-state imaging element 32 so as not to be integrated by the long signal integrator means 362, while the gate means 360105 gates also the short signal of the pixel corresponding thereto so as not to be integrated by the short signal integrator means 363.

In the means 36102 for determining the level of the short signal, the gate means 36105 gates the low-brightness signal on which the noise effect largely acts so as not to be integrated by the short signal integrator means 363, while the gate means 360104 gates also the long signal of the pixel corresponding thereto so as not to be integrated by the long signal integrator means 362.

The integrated value LSUM as a result of integration in the long signal integrator means 362 in the whole field of one screen, and the integrated value SSUM as a result of integration in the long signal integrator means 363 are inputted into exposure amount ratio operation means 364, and an operation shown in the following equation (22) is performed to determine an exposure amount ratio D in the whole screen field.

$$D = LSUM/SSUM \qquad (22)$$

The above-mentioned method allows the exposure amount ratio D in the average of the whole screen of the exposure amount of the short signal controlled in the exposure amount by an electronic shutter to the exposure amount of the long signal controlled in the exposure amount by the mechanical shutter to be extremely correctly obtained.

Also when the illumination of a subject is a fluorescent lamp, it is possible to obtain the exposure amount ratio of the short signal to the long signal by the completely same method and timing as the above-mentioned explanation, so that the explanation in this case will be omitted.

Then, during period ④ shown in FIG. 57, as with period ③, the long signal and the short signal are read from the image memory 34, and the short signal is multiplied in the gain adjustment means 37 by a D-fold gain equivalent to the exposure amount ratio operated during period ③.

A signal after the D-fold gain is given to the short signal is expressed as the short' signal hereinafter. Based on the long signal read from the image memory 34 and on the short' signal whose gain is adjusted, a synthesization is performed by the image synthesizer means 38 at a post-stage with a method as shown in the well-known principle of the dynamic range expansion.

In the above-mentioned manner, the ratio in the exposure amount of the long signal to the short signal can be determined at a high accuracy, so that the synthesis image by the image synthesizer means 38 using the long signal and the gain-adjusted short signal can obtain gradation characteristics which are continuously stable from a low-brightness portion to a high-brightness portion.

The signal synthesized in the image synthesizer means 38 is subject to processings such as separating of brightness signal from color signal, noise removing, edge enhancing, gamma correcting, matrix operating, and encoding to a specific format, in the later processing. The processing in the image synthesizer means 38 and a processing which is later performed are not directly related to the object of the present invention, so that a detailed explanation will be omitted.

Although in Embodiment 5 of the present invention, the solid-state imaging element 32 is explained using a whole pixel read-type CCD (Charge Coupled Device), the present invention is not limited to such a CCD, but can be applied to an imaging means capable of outputting a plurality of image signals having a variously different exposure amount, such as means for performing frame read, and means for performing two line addition/read on the solid-state imaging element.

Although in Embodiment 5 of the present invention, with respect to a signal by which two lines are added to the output from the solid-state imaging element 32 by the two horizontal line adder means 33, the exposure ratio of the long signal to the short signal is detected in the exposure amount ratio detector means 36, the present invention is not limited to such a method, and there is no particular problem even when with respect to a signal by which two lines are not added to the output from the solid-state imaging element 32, the exposure ratio is detected.

Although in Embodiment 5 of the present invention, the image memory 34 is capable of store two frames, the present invention is not limited to such a capacity, and the image memory 34 may be capable of storing a plurality of output signals having a different exposure amount from the imaging means.

Although in Embodiment 5 of the present invention, both the long signal and the short signal having a different exposure amount outputted from the solid-state imaging element 32 are frame signals, the present invention is not limited to such signals, but can be applied to a case where both are field signals, or where the number of lines is different for each signal having a different exposure amount such that one is field, and the other is frame. When the number of lines is different for each signal having a different exposure amount as described above, the exposure amount ratio can be detected by controlling the image memory 34 during exposure amount ratio detection, or by making the pixel at a corresponding position output to the exposure amount ratio detector means 36 in the same timing in a manner that a signal having a large number of lines is matched with the one having a small number of lines.

(5) Embodiment 6

In the case of Embodiment 5, when the long-time exposure signal and the short-time exposure signal which are different in exposure amount from each other are used and synthesized to pick up an image with an expanded dynamic range, in order to obtain stably continuous gradation characteristics as a synthesis image after the image synthesis processing, an exposure amount ratio is actually determined in the whole screen field of the long-time exposure signal and the short-time exposure signal, and using a signal to which a gain equivalent to the exposure amount ratio is given, and the long-time exposure signal, the image synthesis processing is performed.

At this time, it takes a time equivalent to one frame time to detect the exposure amount ratio of the long-time exposure signal and the short-time exposure signal, and further it takes a time equivalent to one frame time to synthesize the long-time exposure signal and the short-time exposure signal, so that the processing time in total tends to become longer.

The sixth embodiment, in the configuration in Embodiment 5, said image signal from the imaging means and said image signal from the image memory are switched to output to the exposure amount ratio detector means, whereby it is intended to reduce the time required from the picking up start at the imaging means described in Embodiment 5 to the image synthesis processing end.

Figure 59:
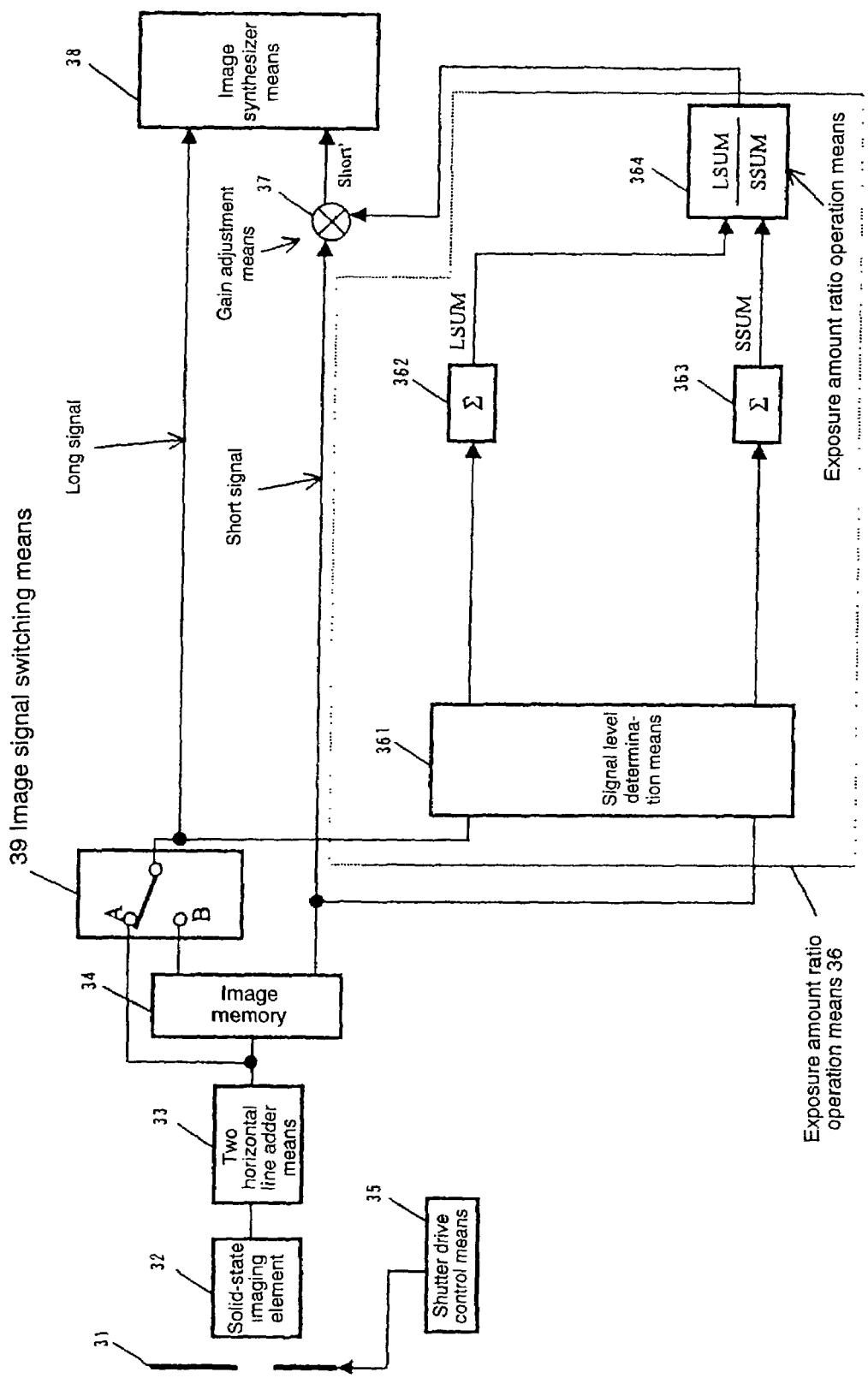
FIG. 59 is a block diagram showing a configuration of the solid-state imaging device in Embodiment 6 of the present invention.

FIG. 59 is a block diagram showing a configuration of the solid-state imaging device in Embodiment 6 of the present invention. In FIG. 59, the configuration is exactly the same as Embodiment 5 other than the component designated at the numeral 39, so that the explanation will be omitted here. The numeral 39 in FIG. 59 designates image signal switching means for switching between a signal after the output of the solid-state imaging element 32 is subject to the addition processing at the two horizontal line adder means 33 (taken as the side A), and an output signal from the long signal storing means of the image memory 34 (taken as the side B). That is, said image signal switching means 39 switches the long signal, when sent to the exposure amount ratio detector means 36, to the side A to directly output the long signal from the two horizontal line adder means 33 to the exposure amount ratio detector means 36, and switches the long signal, when sent to the image synthesizer means 38, to the side B to output the long signal from the image memory 34 to the image synthesizer means 38.

With respect to the solid-state imaging device of the present second embodiment configured as described above, the operation thereof will be explained hereinafter.

A concrete example will be explained of a case where Embodiment 6 picks up two images of the short-time exposure signal (short signal) and the long-time exposure signal (long signal) to synthesize these signals.

Figure 60:
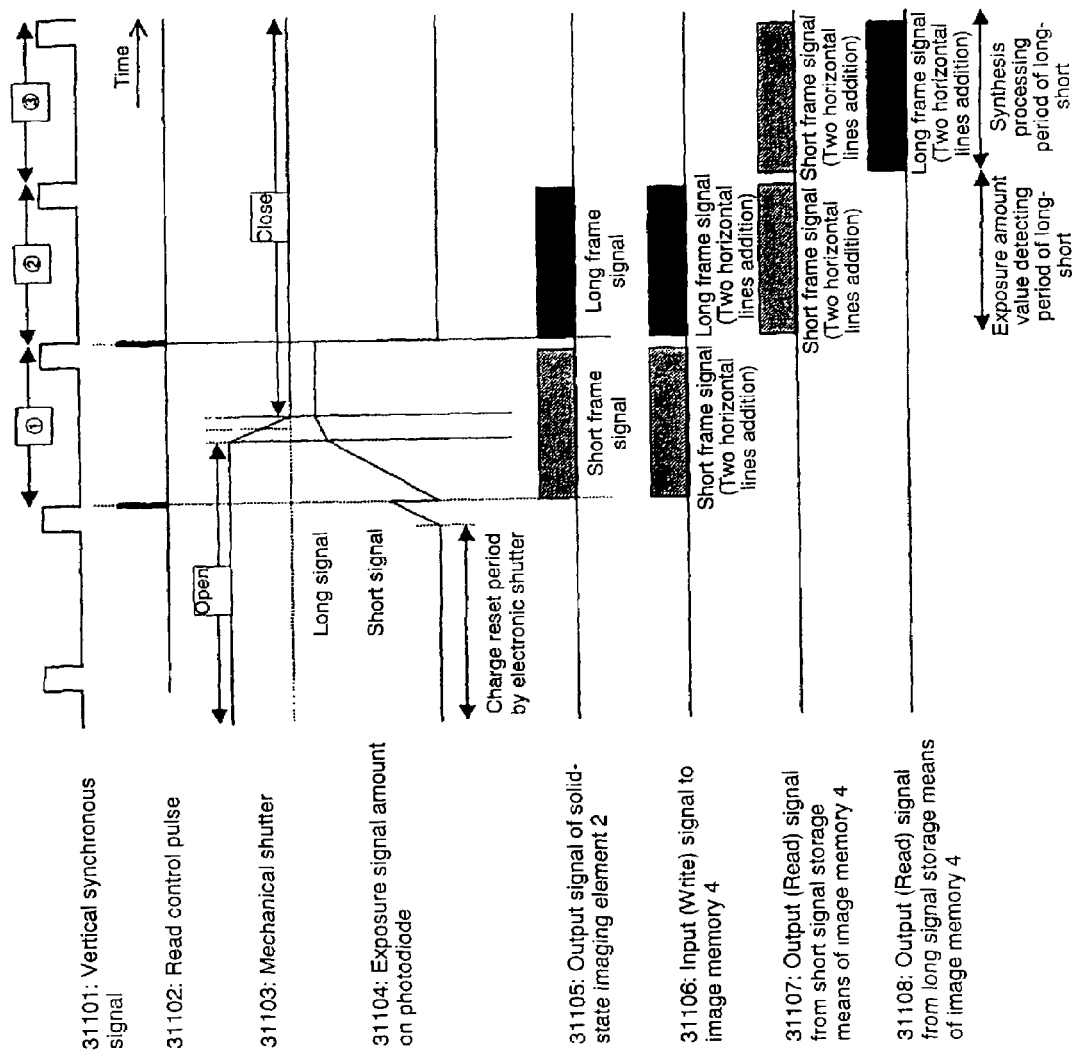
FIG. 60 is a timing chart with respect to the exposure of a subject image, to the read of an exposed signal, and to the read/write operation of the image memory in the solid-state imaging device in Embodiment 6 of the present invention.

First, the method of picking up the short signal and the long signal will be explained using FIG. 60. FIG. 60 is a timing chart with respect to the exposure of a subject image, to the read of an exposed signal, and to the read/write operation of the image memory 34 in the solid-state imaging device 32. In FIG. 60, the numeral 31101 designates a timing of the synchronous signal in the vertical direction; the numeral 31102, a timing of a read control pulse for controlling the signal charge read from the photodiode of the solid-state imaging element 32; the numeral 31103, a timing showing the opening/closing state of the mechanical shutter 31; the numeral 31104, a timing showing the exposure signal amount on the photodiode of the solid-state imaging element 32; the numeral 31105, a timing of the signal outputted from the solid-state imaging element 32; the numeral 31106, a timing of the input (write) signal of the image memory 34; the numeral 31107, a timing of the output (read) signal from the short signal storage means (the short signal frame memory 341*b*) of the image memory 34; and the numeral 31108, a timing of the output (read) signal from the long signal storage means (the long signal frame memory 341*a*) of the image memory 34.

At the short signal exposure, with the mechanical shutter 31 being opened, using an electrical shutter function, the exposure is performed for a required exposure time, for example, one thousandth of a second. After the exposure for one thousandth of a second is finished, the charge accumulated on the photodiode is moved to the vertical transfer CCD by the read control pulse. At this time, the read mode of the solid-state imaging element 32 should drive in the whole pixel read mode.

Then, after short signal is moved to the vertical transfer CCD, the long signal should be exposed. The exposure time of the long signal is taken as, for example, one hundredth of a second. The exposure time of the long signal should be controlled by the opening/closing of the mechanical shutter 31. Although concurrently with the above-mentioned exposure, the short signal for one frame is outputted from the solid-state imaging element 32, the charge accumulated on the photodiode for the long signal is moved to the vertical transfer CCD by the read control pulse. At this time, the read mode of the solid-state imaging element 32 should drive in the read mode. The cycle of the vertical synchronous signal is taken as, for example, one thirtieths of a second, and the signal read for one field should be completed within one cycle of the vertical synchronous signal.

After the two signals of the short signal and the long signal having a different exposure time obtained by the solid-state imaging element 32 are respectively and individually subject to the two horizontal line addition processing for adding/mixing the two upper/lower line signals adjacent to each other on the solid-state imaging element 32 by the two horizontal line adder means 33, as shown in the timing of the numeral 31106, the short signal is for a time stored in the short signal frame memory 341*b* of the image memory 34 during period ①, while the long signal is for a time stored in the long signal frame memory 341*a* of the image memory 34 during period ②.

During period ②, by switching said image signal switching means 39 to the side A, the long signal being forcedly inputted into the long signal storage means of the image memory 34 is inputted into the signal level determination means 361 in the exposure amount ratio detector means 36, and at the same time, as shown in the timing of the numeral 31107, the short signal stored in the short signal storage means of the image memory 34 is read and then inputted into the signal level determination means 361 in the exposure amount ratio detector means 36. In this case, with respect to the long signal inputted through said image signal switching means 39 and to the short signal outputted from the image memory 34, the long signal and the short signal of the lines on the respective positions on the solid-state imaging element 32 are controlled to be inputted into the signal level determination means 361 in the exposure amount ratio detector means 36 at the same timing, whereby during period ②, the processing of the exposure amount detection is performed. The processing of the exposure amount detection during period ② conforms to the processing of the exposure amount detection during period ③ in Embodiment 5, so that the explanation will be omitted here. It is wherein the processing during period ③ in Embodiment 6 precedes that in Embodiment 5 by one frame period.

Then, during period ③ shown in FIG. 60, the long signal and the short signal are read from the image memory 34. During period ③, by switching said image signal switching means 39 to the side B, the long signal from the long signal storage means of the image memory 34 is inputted into the image synthesizer means 38, and at the same time, the short signal from the short signal storage means of the image memory 34 is multiplied by a D-fold gain equivalent to the exposure amount ratio D operated during period ② in the gain adjustment means 37, and then inputted into the image synthesizer means 38.

A signal after the D-fold gain is given to the short signal is expressed as the short' signal hereinafter. As with Embodiment 5, based on the long signal read from the image memory 34 and on the short' signal whose gain is adjusted, a synthesization is performed by the image synthesizer means 38 at a post-stage with a method as shown in the well-known principle of the dynamic range expansion.

As shown above, the addition of said image signal switching means for switching between said image signal from the imaging means and said image signal from the image memory allows the time required from the picking up start at the imaging means described in Embodiment 5 to the image synthesis processing end to be reduced by one frame time.

(6) Embodiment 7

When a subject is picked up under different light source such as in the outdoors or indoors, by a method of using the short-time exposure signal and the long-time exposure signal having a different exposure amount and synthesizing these signals to pick up an image with an expanded dynamic range, there is a difference in the light aspect in that the brightness level of the subject varies periodically due to a fluorescent lamp in the indoors, while the brightness level of the subject does not vary periodically due to the sunlight in the outdoors. Hence, for the subject under a plurality of light sources, the exposure amount ratio of the long-time exposure signal to the short-time exposure signal is different for each portion of the image, so that it is impossible to give a gain equivalent to an uniform exposure amount ratio in the whole screen field as described in Embodiment 5 to the short-time exposure signal.

In Embodiment 7, even when a plurality of light sources exist, an synthesis image after the image synthesis processing to expand the dynamic range has stably continuous gradation characteristics by dividing of the screen into a plurality of blocks, and by determining of the exposure amount ratio in the full screen field for each pixel between the long-time exposure signal (long signal) and the short-time exposure signal (short signal).

Figure 61:
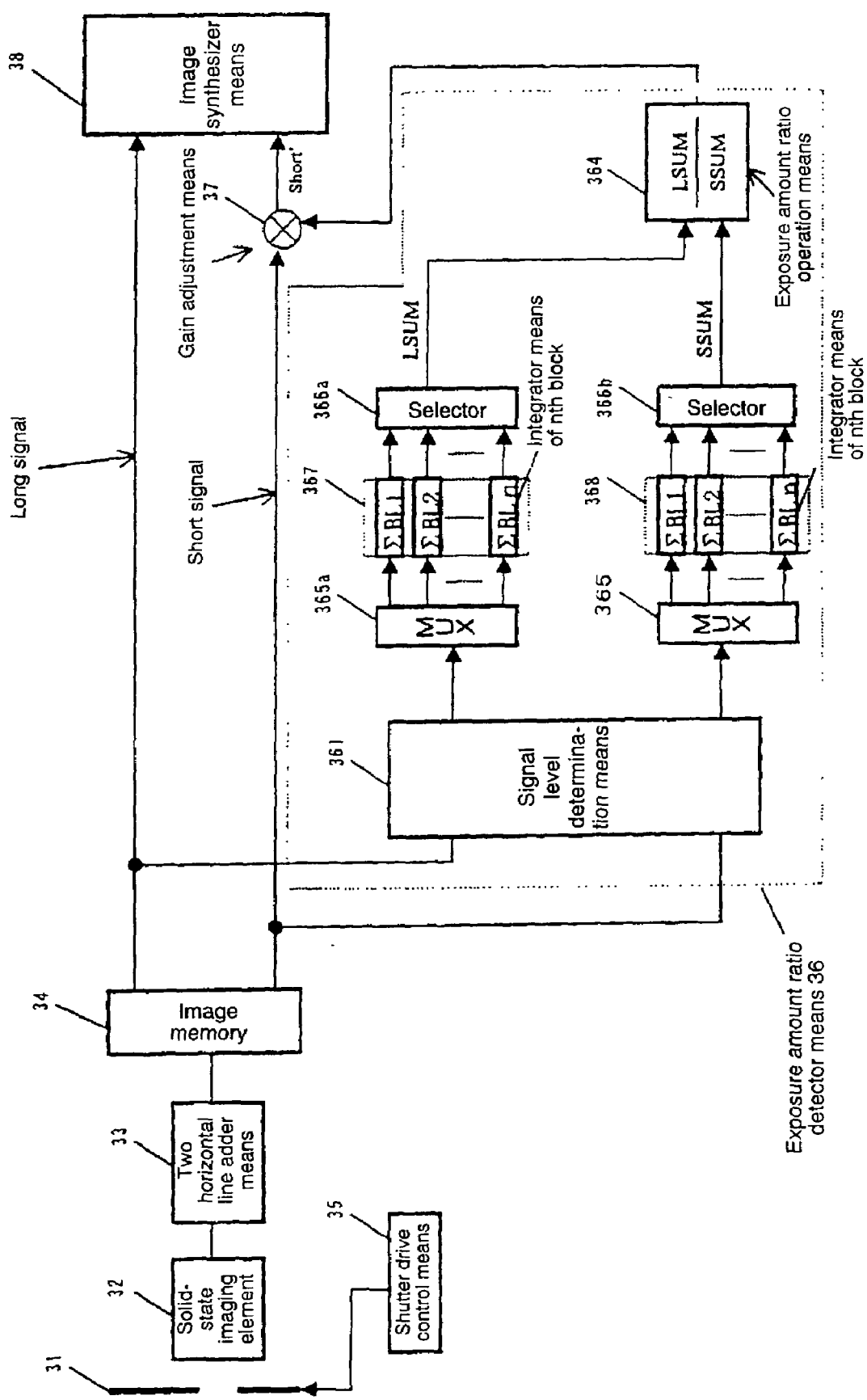
FIG. 61 is a block diagram showing a configuration of the solid-state imaging device in Embodiment 7 of the present invention.

FIG. 61 is a block diagram showing a configuration of the solid-state imaging device in Embodiment 7 of the present invention. In FIG. 61, the configuration is exactly the same as Embodiment 5 other than the internal configuration of the exposure amount ratio detector means 36, so that the explanation will be omitted here. In the exposure amount ratio detector means 36 of FIG. 61, the numeral 361 designates signal level determination means; the numerals 365*a*, 365*b*, multiplexers; the numerals 366*a*, 366*b*, selectors; the numeral 367, a long signal integrator means for dividing the screen into n blocks to determine an integrated value LSUM of the long signal for each block; and the numeral 368, a short signal integrator means for dividing the screen into n blocks to determine an integrated value SSUM of the short signal for each block. In the long signal integrator means 367 and the short signal integrator means 368 in block units, symbols Σ BL1, Σ BL2 through Σ BLn designate integrator means in n block units. The numeral 364 designates exposure amount ratio operation means for receiving the integrated value LSUM for each block by the long signal integrator means 367 or the integrated value SSUM for respective block by the short signal integrator means 368 obtained by switching between these integrated values by the selectors 366*a*, 366*b* to determine the ratio of the integrated value LSUM to the integrated value SSUM in block units.

With respect to the solid-state imaging device of the present seventh embodiment configured as described above, the operation thereof will be explained hereinafter.

First, with respect to the method of picking up the short signal and the long signal and to the method of controlling the exposure time and the solid-state imaging element 32 and the image memory 34, the concrete example in Embodiment 7 is exactly the same as that described in fifth embodiment, so that the explanation will be omitted here. The timing of the output signal from the solid-state imaging element 32 and the timing of the input/output signal into/from the image memory 34 at that time are exactly the same as the timing chart of FIG. 57 used to explain Embodiment 5, so that Embodiment 7 will be explained also using FIG. 57.

In the concrete example of Embodiment 7, there will be explained a case where the exposure amount ratio is determined for each block obtained by dividing the screen into 8×6=48 blocks as shown in FIG. 62. As an example of the difference in the light source aspect, the fields of the block numbers 6, 7, 8, 14, 15, 16, 22, 23, 24 are subject fields in which the outdoor sunlight exhibits the light source, and fields other than the above fields are subject fields in which the fluorescent lamp exhibits the light source.

In Embodiment 7, during periods ①, ② shown in FIG. 57, the signal outputted from the solid-state imaging element 32 is subject to the two horizontal lines addition processing by the two horizontal line adder means 33, and then is stored for a time in the image memory 34.

During period ③, the long signal integrator means 367 and the short signal integrator means 368 for each block integrate the exposure amount of each pixel for each block divided into blocks in the short signal (short frame signal) and the long signal (long frame signal) read from the image memory 34, respectively, to determine the total of exposure amount (SSUM, LSUM) in block units. During period ③, the timing of reading the short signal and the long signal from the image memory 34 is such that the lines on the respective positions on the solid-state imaging element 32 are read sequentially from the first line at the same timing.

The short signal and the long signal inputted in synchronism with the line into the exposure amount ratio detector means 36 are determined, respectively, for the level in the signal level determination means 361, and a signal determined to be at a level out of a predetermined range is neglected so as not to be integrated for each block in the long signal integrator means 367 and the short signal integrator means 368. Here, the level out of a predetermined range means that it is a level at which the ratio in the exposure amount is difficult to determine, and more specifically, that the long signal is a signal of a high brightness portion near the saturation level of the solid-state imaging element 32, while the short signal is a signal of a low brightness portion on which the noise effect largely acts.

A signal determined to be at a level within a predetermined range is switched in the route by the multiplexers 365*a*, 365*b* and integrated by the integrator meanss Σ BL1, Σ BL2 to Σ BLn in block units so as to be integrated in blocks to which each pixel signal corresponds.

During period ④, when the long signal and the short signal of the pixel in nth (first to 48th) block of those divided into blocks are outputted from the image memory 34, the selector 366 is controlled in a manner that a signal used to determine the integrated value of the exposure amount of nth block is inputted into the exposure amount ratio operation means 364, which in turn operates the ratio of the long signal to the short signal in nth block, and then a gain equivalent to the exposure amount ratio is given by the gain adjustment means 37 to the short signal from the image memory 34. A signal after the gain is given by the gain adjustment means 37 to the short signal is expressed as the short' signal hereinafter. During period ④, based on the long signal read from the image memory 34 and on the short' signal whose gain is adjusted, a synthesization is performed by the image synthesizer means 38 at a post-stage with a method as shown in the well-known principle of the dynamic range expansion.

With the above-mentioned method, even a subject on which a plurality of light sources exist, the ratio in the exposure amount of the long signal to the short signal in block units can be determined at a high accuracy, so that the synthesis image by the image synthesizer means 38 using the long signal and the gain-adjusted short signal can obtain gradation characteristics which are continuously stable from a low-brightness portion to a high-brightness portion.

The signal synthesized in the image synthesizer means 38 is subject to processings such as separating of brightness signal from color signal, noise removing, edge enhancing, gamma correcting, matrix operating, and encoding to a specific format, in the later processing, as with Embodiment 5.

Although in Embodiment 7, a case where the exposure amount ratio is determined for each block obtained by dividing the screen into 48 blocks, the present invention is not limited to such a case, and the screen may be divided into any number of blocks. It is sufficient that the number of the integrator means for each block in the long signal integrator means 367 and the short signal integrator means 368 is decided so as to be matched with the number of divided blocks. In Embodiment 7, the block may be divided in the horizontal/vertical direction at equal intervals, or the interval in the horizontal/vertical direction may be freely changed according to a subject.

(7) Embodiment 8

Figure 65:
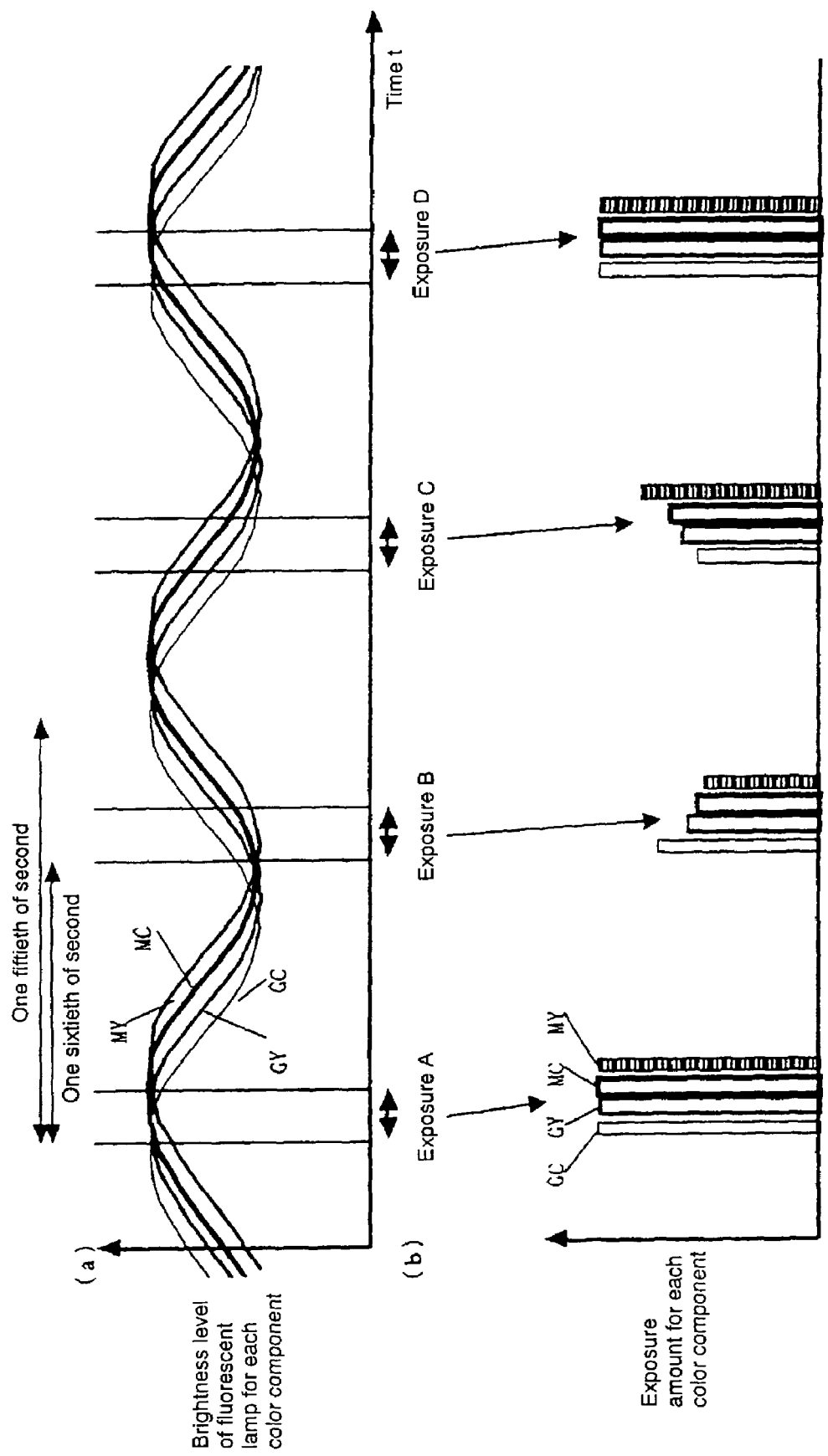
FIG. 65 is a graph of the fluctuation in brightness for each color component of a fluorescent lamp.

The brightness of a fluorescent lamp, as shown in a graph of the fluctuation in brightness for each color component of a fluorescent lamp of FIG. 65, varies in the phase for each color component, so that the exposure amount ratio varies for each color component with the timing of performing exposure. In a method of using a plurality of image signals having a different exposure amount and synthesizing the signals to pick up an image with an expanded dynamic range, a synthesis signal obtained by determining the exposure amount ratio in only brightness portion of the long-time exposure signal and the short-time exposure signal, and by performing the image synthesis to expand the dynamic range with both the long-time exposure signal and a signal giving a gain equivalent to the exposure amount ratio to the short-time exposure signal has color component characteristics which become discontinuous near a position at which the long-time exposure signal saturates.

The eighth embodiment intends to provide a synthesis image having stably continuous gradation characteristics and color characteristics after the image synthesis processing for expanding the dynamic range even when the phase is different for each color component, by determining the exposure amount ratio of the short-time exposure signal (short signal) to the long-time exposure signal (long signal) for each color component.

Figure 63:
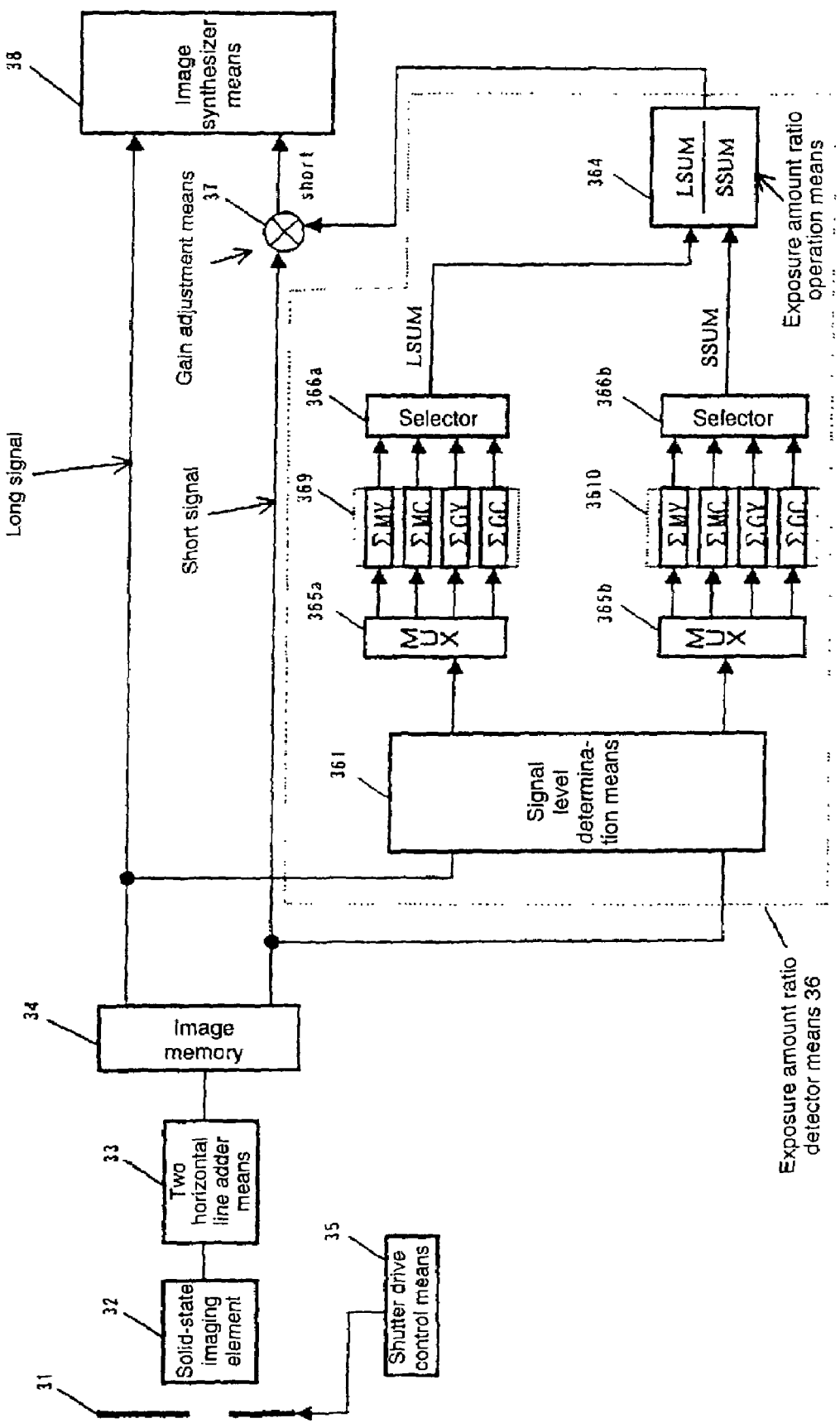
FIG. 63 is a block diagram showing a configuration of the solid-state imaging device in Embodiment 8 of the present invention.
Figure 64:
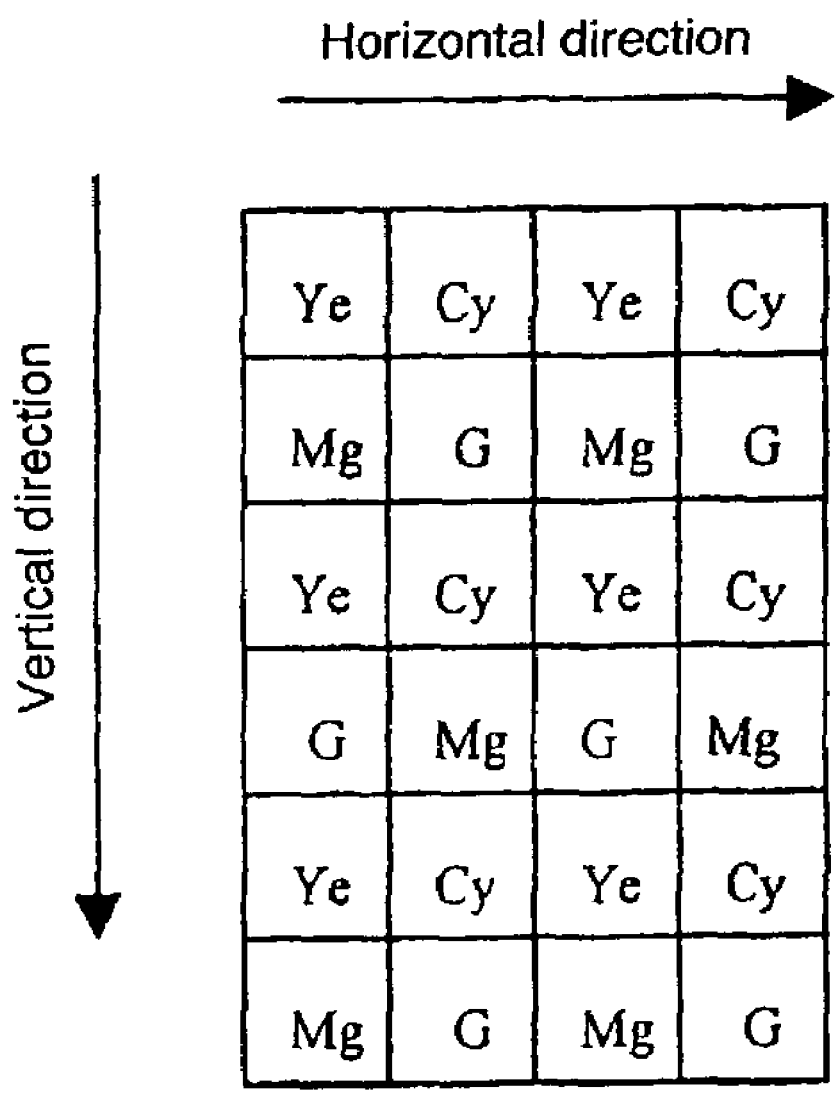
FIG. 64 is a configuration view showing a color filter arrangement of the solid-state imaging element in the solid-state imaging device in Embodiment 8 of the present invention.

FIG. 63 is a block diagram showing a configuration of the solid-state imaging device in Embodiment 8 of the present invention. In FIG. 63, the configuration is exactly the same as Embodiment 5 other than the internal configuration of the exposure amount ratio detector means 36, so that the explanation will be omitted here. In the exposure amount ratio detector means 36 of FIG. 61, the numeral 361 designates signal level determination meanss; the numerals 365*a*, 365*b*, multiplexers; the numerals 366*a*, 366*b*, selectors; the numeral 369, a long signal integrator means for determining an integrated value LSUM of the long signal for each color component; and the numeral 3610, a short signal integrator means for determining an integrated value SSUM of the short signal for each color component. In the long signal integrator means

369 and the short signal integrator means 3610 for each color component, the symbols Σ MY, Σ MC, Σ GY and Σ GC designate integrator means for each mixed color component of [magenta (Mg)+yellow (Ye)], [magenta (Mg)+cyan (Cy)], [green (G)+yellow (Ye)] and [green (G)+cyan (Cy)], respectively. The numeral 364 designates exposure amount ratio operation means for receiving the integrated value LSUM for each color component by the long signal integrator means 369 and the integrated value SSUM for each color component by the short signal integrator means 3610 obtained by switching between these integrated values by the selectors 366a, 366b to determine the ratio of the integrated value LSUM to the integrated value SSUM for each color component.

With respect to the solid-state imaging device of the present eighth embodiment configured as described above, the operation thereof will be explained hereinafter.

Here, the color filters on the photodiode of the solid-state imaging element 32 are assumed to be arranged in a manner that the color filters having four different spectral characteristics of magenta (Mg), green (G), yellow (Ye) and cyan (Cy) are arranged for each pixel.

First, with respect to the method of picking up the short signal and the long signal and to the method of controlling the exposure time and the solid-state imaging element 32 and the image memory 34, the concrete example in Embodiment 8 is exactly the same as that described in fifth embodiment, so that the explanation will be omitted here. The timing of the output signal from the solid-state imaging element 32 and the timing of the input/output signal into/from the image memory 34 at that time are exactly the same as the timing chart of FIG. 57 used to explain Embodiment 5, so that Embodiment 8 will be explained also using FIG. 57.

In Embodiment 8, during periods ①, ② shown in FIG. 57, the signal outputted from the solid-state imaging element 32 is subject to the two horizontal lines addition processing by the two horizontal line adder means 33, and then is stored for a time in the image memory 34.

During period ③, in the respective long signal and the respective short signal read from the image memory 34, the exposure amount of each pixel for each color component is integrated to determine the total of exposure amount (SSUM, LSUM) for each color component.

During period ③, the timing of reading the short signal and the long signal from the image memory 34 is such that the lines on the respective positions on the solid-state imaging element 32 are read sequentially from the first line at the same timing.

The short signal and the long signal inputted in synchronism with the line into the exposure amount ratio detector means 36 are determined, respectively, for the level in the signal level determination means 361, and a signal determined to be at a level out of a predetermined range is neglected so as not to be integrated for each color component in the long signal integrator means 369 and the short signal integrator means 3610. Here, the level out of a predetermined range means that it is a level at which the ratio in the exposure amount is difficult to determine, and more specifically, that the long signal is a signal of a high brightness portion near the saturation level of the solid-state imaging element 32, while the short signal is a signal of a low brightness portion on which the noise effect largely acts.

A signal determined to be at a level within a predetermined range is switched in the route by the multiplexers 365a, 365b and integrated by the integrator meanss Σ MY, Z MC, Σ GY and Σ GC for each color component so as to be integrated for each color component to which each pixel signal corresponds.

The signals outputted from the image memory 34 are mixed for two lines in the two horizontal line adder means 33, so that the signals of four kinds of [magenta (Mg)+yellow (Ye)], [magenta (Mg)+cyan (Cy)], [green (G)+yellow (Ye)] and [green (G)+cyan (Cy)] as color components are outputted, and thus integrated for each component of the colors of the four kinds.

During period ④, when the long signal and the short signal of the color component of [magenta (Mg)+yellow (Ye)] are outputted from the image memory 34, the selectors 366a, 366b are controlled in a manner that a signal used to determine the integrated value of the exposure amount of [magenta (Mg)+yellow (Ye)] is inputted into the exposure amount ratio operation means 364, which in turn operates the ratio of the long signal to the short signal in [magenta (Mg)+yellow (Ye)], and then a gain equivalent to the exposure amount ratio is given by the gain adjustment means 37 to the short signal of the color component of [magenta (Mg)+yellow (Ye)] from the image memory 34, Similarly, during period ④, when the long signal and the short signal of the color component of [magenta (Mg)+cyan (Cy)], [green (G)+yellow (Ye)] and [green (G)+cyan (Cy)] are outputted from the image memory 34, the same processing is performed. A signal after the gain is given by the gain adjustment means 37 to the short signal is expressed as the short' signal hereinafter.

Based on the long signal and on the short' signal whose gain is adjusted, a synthesization is performed by the image synthesizer means 38 at a post-stage with a method as shown in the conventional principle of the dynamic range expansion.

With the above-mentioned method, even when as with a fluorescent lamp, the phase is different for each color component, the ratio in the exposure amount of the long signal to the short signal over the whole screen can be determined at a high accuracy, so that the synthesis image by the image synthesizer means 38 using the long signal and the gain-adjusted short signal can obtain gradation characteristics and color characteristics which are continuously stable from a low-brightness portion to a high-brightness portion.

The signal synthesized in the image synthesizer means 38 is subject to processings such as separating of brightness signal from color signal, noise removing, edge enhancing, gamma correcting, matrix operating, and encoding to a specific format, in the later processing, as with Embodiment 5.

Although in Embodiment 8, the arrangement of color filter for magenta, cyan, green, yellow on the photodiode of the solid-state imaging element 32 is explained, the present invention is not to limited to such an arrangement, and can be applied also to the arrangement of color separation filters with various and different spectral characteristics. The present invention can be applied also to the arrangement of colorization means by color separation prisms in place of color separation filters.

There can be an embodiment obtained by combining Embodiment 7 with Embodiment 8, though not shown. That is, it is sufficient that the configuration is such that the integrator meanss Σ MY, Z MC, Σ GY and Σ GC for each color component are added to respective the integrator meanss Σ BL1, Σ BL2 through Σ BLn in block units.

INDUSTRIAL APPLICABILITY

The present invention is utilized suitably as a solid-state imaging device which controls the exposure of a solid-state imaging element and the signal read mode, picks up the short-time exposure signal for one field and the long-time exposure signal for one frame, and synthesizes these signals, thereby allowing an image whose dynamic range is expanded while having a resolution equivalent to the number of pixels of the solid-state imaging element to be picked up.

The invention claimed is:

1. A solid-state imaging device comprising:
a solid-state imaging element for outputting two image signals which are different from each other in an exposure amount and the number of pixels;
interpolation means for converting an image signal having a small number of pixels of said two image signals having a different number of pixels, into an image signal having the same signal type as an image signal having a large number of pixels by an interpolation process; and
signal synthesizer means for synthesizing said image signal having a large number of pixels and said image signal converted into the same signal type as said image signal having a large number of pixels by said interpolation means according to a synthesis control signal, said synthesis control signal being at least one of said image signal having a small number of pixels, said image signal converted into the same signal type as said image signal having a large number of pixels by said interpolation means, and said image signal having a large number of pixels,
wherein the signal synthesizer means includes:
coefficient generation means for generating a certain coefficient k according to a signal level of said synthesis control signal, and
synthesizer means for weighting and adding said image signal having a large number of pixels and said image signal converted into the same signal type as said image signal having a large number of pixels by said interpolation means according to the coefficient k generated by said coefficient generation means.

2. A solid-state imaging device comprising:
a solid-state imaging element for outputting two image signals which are different from one another in an exposure amount and the number of pixels;
brightness signal extraction means for extracting a brightness signal from an image signal having a small number of pixels or an image signal having a large number of pixels of said two image signals having a different number of pixels;
first interpolation means for converting said brightness signal extracted from said image signal having a small number of pixels, into a brightness signal having the same signal type as a brightness signal obtained from said image signal having a large number of pixels by an interpolation process;
brightness signal synthesizer means for synthesizing said brightness signal converted into the same signal type as said brightness signal obtained from said image signal having a large number of pixels by said first interpolation means and said brightness signal extracted from said image signal having a large number of pixels according to a synthesis control signal, said synthesis control signal being at least one of said brightness signal extracted from said image signal having a small number of pixels, said brightness signal converted into the same signal type as a brightness signal obtained from said image signal having a large number of pixels by the first interpolation means, and said brightness signal obtained from said image signal having a large number of pixels by the first interpolation means;
second interpolation means for converting said image signal having a small number of pixels, into an image signal having the same signal type as said image signal having a large number of pixels by an interpolation signal process; and
signal synthesizer means for synthesizing said image signal converted into the same signal type as said image signal having a large number of pixels and said image signal having a large number of pixels according to said synthesis control signal,
wherein said brightness signal synthesizer means includes
first coefficient generation means for generating a certain coefficient k according to a signal level of said synthesis control signal; and
first synthesizer means for weighting and adding the brightness signal converted to the same signal type as the brightness signal obtained from said image signal having a large number of pixels by the first interpolation means, and the brightness signal extracted from said image signal having a large number of pixels, according to the coefficient k generated by the first coefficient generation means.

3. A solid-state imaging device comprising:
a solid-state imaging element for outputting two image signals which are different from one another in an exposure amount and the number of pixels;
brightness signal extraction means for extracting a brightness signal from an image signal having a small number of pixels or an image signal having a large number of pixels of said two image signals having a different number of pixels;
first interpolation means for converting said brightness signal extracted from said image signal having a small number of pixels, into a brightness signal having the same signal type as a brightness signal obtained from said image signal having a large number of pixels by an interpolation process;
brightness signal synthesizer means for synthesizing said brightness signal converted into the same signal type as said brightness signal obtained from said image signal having a large number of pixels by said first interpolation means and said brightness signal extracted from said image signal having a large number of pixels according to a synthesis control signal, said synthesis control signal being at least one of said brightness signal extracted from said image signal having a small number of pixels, said brightness signal converted into the same signal type as a brightness signal obtained from said image signal having a large number of pixels by the first interpolation means, and said brightness signal obtained from said image signal having a large number of pixels by the first interpolation means;
second interpolation means for converting said image signal having a small number of pixels, into an image signal having the same signal type as said image signal having a large number of pixels by an interpolation signal process; and
signal synthesizer means for synthesizing said image signal converted into the same signal type as said image signal having a large number of pixels and said image signal having a large number of pixels according to said synthesis control signal,
wherein said signal synthesizer means includes:
second synthesizer means for weighting and adding said image signal converted to the same signal type as said image signal having a large number of pixels by said second interpolation means, and said image signal having a large number of pixels, according to at least one of the coefficients k generated by said first coefficient generation means.

4. A solid-state imaging device comprising:
a solid-state imaging element for outputting two image signals which are different from one another in an exposure amount and the number of pixels;
brightness signal extraction means for extracting a brightness signal from an image signal having a small number of pixels or an image signal having a large number of pixels of said two image signals having a different number of pixels;
first interpolation means for converting said brightness signal extracted from said image signal having a small number of pixels, into a brightness signal having the same signal type as a brightness signal obtained from said image signal having a large number of pixels by an interpolation process;
brightness signal synthesizer means for synthesizing said brightness signal converted into the same signal type as said brightness signal obtained from said image signal having a large number of pixels by said first interpolation means and said brightness signal extracted from said image signal having a large number of pixels according to a synthesis control signal, said synthesis control signal being at least one of said brightness signal extracted from said image signal having a small number of pixels, said brightness signal converted into the same signal type as a brightness signal obtained from said image signal having a large number of pixels by the first interpolation means, and said brightness signal obtained from said image signal having a large number of pixels by the first interpolation means;
second interpolation means for converting said image signal having a small number of pixels, into an image signal having the same signal type as said image signal having a large number of pixels by an interpolation signal process; and
signal synthesizer means for synthesizing said image signal converted into the same signal type as said image signal having a large number of pixels and said image signal having a large number of pixels according to said synthesis control signal,
wherein said signal synthesizer means includes:
second synthesizer means for weighting and adding said image signal converted to the same signal type as said image signal having a large number of pixels by said second interpolation means, and said image signal having a large number of pixels, according to at least one of the mean value, maximum value, minimum value and intermediate value of a plurality of coefficients k, of the coefficients k generated by said first coefficient generation means.

5. A solid-state imaging device comprising:
a solid-state imaging element for outputting two image signals which are different from one another in an exposure amount and the number of pixels;
brightness signal extraction means for extracting a brightness signal from an image signal having a small number of pixels or an image signal having a large number of pixels of said two image signals having a different number of pixels;
first interpolation means for converting said brightness signal extracted from said image signal having a small number of pixels, into a brightness signal having the same signal type as a brightness signal obtained from said image signal having a large number of pixels by an interpolation process;
brightness signal synthesizer means for synthesizing said brightness signal converted into the same signal type as said brightness signal obtained from said image signal having a large number of pixels by said first interpolation means and said brightness signal extracted from said image signal having a large number of pixels according to a synthesis control signal, said synthesis control signal being at least one of said brightness signal extracted from said image signal having a small number of pixels, said brightness signal converted into the same signal type as a brightness signal obtained from said image signal having a large number of pixels by the first interpolation means, and said brightness signal obtained from said image signal having a large number of pixels by the first interpolation means;
second interpolation means for converting said image signal having a small number of pixels, into an image signal having the same signal type as said image signal having a large number of pixels by an interpolation signal process; and
signal synthesizer means for synthesizing said image signal converted into the same signal type as said image signal having a large number of pixels and said image signal having a large number of pixels according to said synthesis control signal,
wherein said signal synthesizer means includes:
second coefficient generation means for generating a certain coefficient k according to a signal level of said synthesis control signal; and
second synthesizer means for weighting and adding said image signal converted to the same signal type as said image signal having a large number of pixels by said interpolation means, and said image signal having a large number of pixels, according to the coefficient k generated by said second coefficient generation means.

6. A solid-state imaging device comprising:
a solid-state imaging element for outputting two image signals which are different from each other in an exposure amount and the number of pixels;
brightness signal extraction means for extracting a brightness signal from an image signal having a small number of pixels or an image signal having a large number of pixels of the two image signals which are different from each other in the number of pixels;
interpolation means for converting said, brightness signal extracted from said image signal having a small number of pixels, into an image signal having the same signal type as a brightness signal obtained from said image signal having a large number of pixels by an interpolation process;
brightness signal synthesizer means for synthesizing said brightness signal converted to the same signal type as said brightness signal obtained from said image signal having a large number of pixels by said first interpolation means, and said brightness signal obtained from said image signal having a large number of pixels, according to a synthesis control signal, said synthesis control signal being at least one of said brightness signal extracted from said image signal having a small number of pixels, said brightness signal converted to the same signal type as said brightness signal obtained from said image signal having a large number of pixels by said interpolation means, or said brightness signal extracted from said image signal having a large number of pixels;

thinning out means for converting said image signal having a large number of pixels, into the same signal type as said image signal having a small number of pixels by a thinning out process; and signal synthesizer means for synthesizing said image signal converted into the same signal type as said image signal having a small number of pixels by said thinning out means, and said image signal having a small number of pixels, according to said synthesis control signal, wherein said brightness signal synthesizer means includes:

first coefficient generation means for generating a certain coefficient k according to a signal level of said synthesis control signal; and first synthesizer means for weighting and adding said brightness signal converted to the same signal type as said brightness signal obtained from said image signal having a large number of pixels by said interpolation means, and said brightness signal extracted form said image signal having a large number of pixels, according to the coefficient k generated by said first coefficient generation means.

7. A solid-state imaging device comprising:

a solid-state imaging element for outputting two image signals which are different from each other in an exposure amount and the number of pixels;

brightness signal extraction means for extracting a brightness signal from an image signal having a small number of pixels or an image signal having a large number of pixels of the two image signals which are different from each other in the number of pixels;

interpolation means for converting said, brightness signal extracted from said image signal having a small number of pixels, into an image signal having the same signal type as a brightness signal obtained from said image signal having a large number of pixels by an interpolation process;

brightness signal synthesizer means for synthesizing said brightness signal converted to the same signal type as said brightness signal obtained from said image signal having a large number of pixels by said first interpolation means, and said brightness signal obtained from said image signal having a large number of pixels, according to a synthesis control signal, said synthesis control signal being at least one of said brightness signal extracted from said image signal having a small number of pixels, said brightness signal converted to the same signal type as said brightness signal obtained from said image signal having a large number of pixels by said interpolation means, or said brightness signal extracted from said image signal having a large number of pixels;

thinning out means for converting said image signal having a large number of pixels, into the same signal type as said image signal having a small number of pixels by a thinning out process; and signal synthesizer means for synthesizing said image signal converted into the same signal type as said image signal having a small number of pixels by said thinning out means, and said image signal having a small number of pixels, according to said synthesis control signal, wherein said signal synthesizer means includes:

second synthesizer means for weighting and adding said image signal converted to the same signal type as said image signal having a small number of pixels by said thinning out means, and said image signal having a small number of pixels, according to at least one of said coefficients k generated by said first coefficient generation means.

8. A solid-state imaging device comprising:

a solid-state imaging element for outputting two image signals which are different from each other in an exposure amount and the number of pixels;

brightness signal extraction means for extracting a brightness signal from an image signal having a small number of pixels or an image signal having a large number of pixels of the two image signals which are different from each other in the number of pixels;

interpolation means for converting said, brightness signal extracted from said image signal having a small number of pixels, into an image signal having the same signal type as a brightness signal obtained from said image signal having a large number of pixels by an interpolation process;

brightness signal synthesizer means for synthesizing said brightness signal converted to the same signal type as said brightness signal obtained from said image signal having a large number of pixels by said first interpolation means, and said brightness signal obtained from said image signal having a large number of pixels, according to a synthesis control signal, said synthesis control signal being at least one of said brightness signal extracted from said image signal having a small number of pixels, said brightness signal converted to the same signal type as said brightness signal obtained from said image signal having a large number of pixels by said interpolation means, or said brightness signal extracted from said image signal having a large number of pixels;

thinning out means for converting said image signal having a large number of pixels, into the same signal type as said image signal having a small number of pixels by a thinning out process; and signal synthesizer means for synthesizing said image signal converted into the same signal type as said image signal having a small number of pixels by said thinning out means, and said image signal having a small number of pixels, according to said synthesis control signal, wherein said signal synthesizer means includes:

second synthesizer means for weighting and adding said image signal converted to the same signal type as said image signal having a small number of pixels by said thinning out means, and said image signal having a small number of pixels, according to at least one of the mean value, maximum value, minimum value and intermediate value of a plurality of coefficients k, of the coefficients k generated by said first coefficient generation means.

9. A solid-state imaging device comprising:

a solid-state imaging element for outputting two image signals which are different from each other in an exposure amount and the number of pixels;

brightness signal extraction means for extracting a brightness signal from an image signal having a small number of pixels or an image signal having a large number of pixels of the two image signals which are different from each other in the number of pixels;

interpolation means for converting said, brightness signal extracted from said image signal having a small number of pixels, into an image signal having the same signal type as a brightness signal obtained from said image signal having a large number of pixels by an interpolation process;

brightness signal synthesizer means for synthesizing said brightness signal converted to the same signal type as said brightness signal obtained from said image signal having a large number of pixels by said first interpolation means, and said brightness signal obtained from said image signal having a large number of pixels, according to a synthesis control signal, said synthesis control signal being at least one of said brightness signal extracted from said image signal having a small number of pixels, said brightness signal converted to the same signal type as said brightness signal obtained from said image signal having a large number of pixels by said interpolation means, or said brightness signal extracted from said image signal having a large number of pixels;

thinning out means for converting said image signal having a large number of pixels, into the same signal type as said image signal having a small number of pixels by a thinning out process; and signal synthesizer means for synthesizing said image signal converted into the same signal type as said image signal having a small number of pixels by said thinning out means, and said image signal having a small number of pixels, according to said synthesis control signal, wherein said signal synthesizer means includes:

second coefficient generation means for generating a certain coefficient k according to a signal level of the synthesis control signal; and second synthesizer means for weighting and adding said image signal converted to the same signal type as said image signal having a small number of pixels by said thinning out means, and said image signal having a small number of pixels, according to said coefficient k generated by said second coefficient generation means.

10. A solid-state imaging device comprising:

a solid-state imaging element for outputting two image signals which are different from each other in an exposure amount and the number of pixels;

brightness signal extraction means for extracting a brightness signal from an image signal having a small number of pixels or an image signal having a large number of pixels of the two image signals which are different from each other in the number of pixels;

interpolation means for converting said brightness signal extracted from said image signal having a small number of pixels into the same signal type as a brightness signal obtained from said image signal having a large number of pixels by an interpolation process;

brightness signal synthesizer means for synthesizing said brightness signal converted into to the same signal type as a brightness signal obtained from said image signal having a large number of pixels by said interpolation means and said brightness signal extracted from said image signal having a large number of pixels according to a synthesis control signal, said synthesis control signal being at least one of said brightness signal extracted from said image signal having a small number of pixels, said brightness signal converted to the same signal type as said brightness signal obtained from said image signal having a large number of pixels by said interpolation means, or said brightness signal extracted from said image signal having a large number of pixels;

first thinning out means for thinning out pixels of said image signal having a large number of pixels by a thinning out process;

second thinning out means for thinning out pixels of said image signal having a small number of pixels by a thinning out process; and signal synthesizer means for synthesizing said image signals whose pixels are thinned out by said first thinning out means and said second thinning out means according to said synthesis control signal wherein said brightness signal synthesizer means includes:

first coefficient generation means for generating a certain coefficient k according to a signal level of the synthesis control signal; and first synthesizer means for weighting and adding a brightness signal converted to the same signal type as a brightness signal obtained from said image signal having a large number of pixels by said interpolation means, and a brightness signal extracted from said image signal having a large number of pixels, according to the coefficient k generated by said first coefficient generation means.

11. A solid-state imaging device comprising:

a solid-state imaging element for outputting two image signals which are different from each other in an exposure amount and the number of pixels;

brightness signal extraction means for extracting a brightness signal from an image signal having a small number of pixels or an image signal having a large number of pixels of the two image signals which are different from each other in the number of pixels;

interpolation means for converting said brightness signal extracted from said image signal having a small number of pixels, into the same signal type as a brightness signal obtained from said image signal having a large number of pixels by an interpolation process;

brightness signal synthesizer means for synthesizing said brightness signal converted into to the same signal type as a brightness signal obtained from said image signal having a large number of pixels by said interpolation means and said brightness signal extracted from said image signal having a large number of pixels according to a synthesis control signal, said synthesis control signal being at least one of said brightness signal extracted from said image signal having a small number of pixels, said brightness signal converted to the same signal type as said brightness signal obtained from said image signal having a large number of pixels by said interpolation means, or said brightness signal extracted from said image signal having a large number of pixels;

first thinning out means for thinning out pixels of said image signal having a large number of pixels by a thinning out process;

second thinning out means for thinning out pixels of said image signal having a small number of pixels by a thinning out process; and signal synthesizer means for synthesizing said image signals whose pixels are thinned out by said first thinning out means and said second thinning out means, according to said synthesis control signal, wherein said signal synthesizer means includes:

second synthesizer means for weighting and adding said image signals whose pixels are thinned out by said first thinning out means and said second thinning out means, according to at least one of said coefficients k generated by said first coefficient generation means.

12. A solid-state imaging device comprising:

a solid-state imaging element for outputting two image signals which are different from each other in an exposure amount and the number of pixels;

brightness signal extraction means for extracting a brightness signal from an image signal having a small number of pixels or an image signal having a large number of pixels of the two image signals which are different from each other in the number of pixels;

interpolation means for converting said brightness signal extracted from said image signal having a small number of pixels, into the same signal type as a brightness signal obtained from said image signal having a large number of pixels by an interpolation process;

brightness signal synthesizer means for synthesizing said brightness signal converted into to the same signal type as a brightness signal obtained from said image signal having a large number of pixels by said interpolation means and said brightness signal extracted from said image signal having a large number of pixels according to a synthesis control signal, said synthesis control signal being at least one of said brightness signal extracted from said image signal having a small number of pixels, said brightness signal converted to the same signal type as said brightness signal obtained from said image signal having a large number of pixels by said interpolation means, or said brightness signal extracted from said image signal having a large number of pixels;

first thinning out means for thinning out pixels of said image signal having a large number of pixels by a thinning out process;

second thinning out means for thinning out pixels of said image signal having a small number of pixels by a thinning out process; and signal synthesizer means for synthesizing said image signals whose pixels are thinned out by said first thinning out means and said second thinning out means, according to said synthesis control signal, wherein said signal synthesizer means includes:

second synthesizer means for weighting and adding said image signals whose pixels are thinned out by said first thinning out means and said second thinning out means, according to at least one of the mean value, maximum value, minimum value and intermediate value of a plurality of coefficients k, of said coefficients k generated by said first coefficient generation means.

13. A solid-state imaging device comprising:

a solid-state imaging element for outputting two image signals which are different from each other in an exposure amount and the number of pixels;

brightness signal extraction means for extracting a brightness signal from an image signal having a small number of pixels or an image signal having a large number of pixels of the two image signals which are different from each other in the number of pixels;

interpolation means for converting said brightness signal extracted from said image signal having a small number of pixels, into the same signal type as a brightness signal obtained from said image signal having a large number of pixels by an interpolation process;

brightness signal synthesizer means for synthesizing said brightness signal converted into to the same signal type as a brightness signal obtained from said image signal having a large number of pixels by said interpolation means and said brightness signal extracted from said image signal having a large number of pixels according to a synthesis control signal, said synthesis control signal being at least one of said brightness signal extracted from said image signal having a small number of pixels, said brightness signal converted to the same signal type as said brightness signal obtained from said image signal having a large number of pixels by said interpolation means, or said brightness signal extracted from said image signal having a large number of pixels;

first thinning out means for thinning out pixels of said image signal having a large number of pixels by a thinning out process;

second thinning out means for thinning out pixels of said image signal having a small number of pixels by a thinning out process; and signal synthesizer means for synthesizing said image signals whose pixels are thinned out by said first thinning out means and said second thinning out means, according to said synthesis control signal, wherein said signal synthesizer means includes:

second coefficient generation means for generating a certain coefficient k according to a signal level of the synthesis control signal; and second synthesizer means for weighting and adding said image signals whose pixels are thinned out by said first thinning out means and said second thinning out means, according to said coefficient k generated by said second coefficient generation means.

14. A solid-state imaging device comprising:

a solid-state imaging element for outputting two image signals which are different from each other in an exposure amount and the number of pixels;

interpolation means for converting an image signal having a small number of pixels of said two image signals having a different number of pixels, into an image signal having the same signal type as an image signal having a large number of pixels by an interpolation process; and signal synthesizer means for synthesizing said image signal having a large number of pixels and said image signal converted into the same signal type as said image signal having a large number of pixels by said interpolation means according to a synthesis control signal, said synthesis control signal being at least one of said image signal having a small number of pixels said image signal converted into the same signal type as said image signal having a large number of pixels by said interpolation means, and said image signal having a large number of pixels, wherein said coefficient generation means, said first coefficient generation means and said second coefficient generation means generate said coefficient k according to a signal level of at least one pixel of a plurality of pixels of said synthesis control signal.

15. A solid-state imaging device comprising:

a solid-state imaging element for outputting two image signals which are different from each other in an exposure amount and the number of pixels;

interpolation means for converting an image signal having a small number of pixels of said two image signals having a different number of pixels, into an image signal having the same signal type as an image signal having a large number of pixels by an interpolation process; and signal synthesizer means for synthesizing said image signal having a large number of pixels and said image signal converted into the same signal type as said image signal having a large number of pixels by said interpolation means according to a synthesis control signal, said synthesis control signal being at least one of said image signal having a small number of pixels, said image signal converted into the same signal type as said image signal having a large number of pixels by said interpolation means, and said image signal having a large number of pixels, wherein said coefficient generation means, said first coefficient generation means and said second coefficient generation means generate said coefficient k according to at least one of the mean value, maximum value, minimum value and intermediate value of each signal level of a plurality of pixels of said synthesis control signal.

16. A solid-state imaging device comprising:
a solid-state imaging element for outputting two image signals which are different from each other in an exposure amount and the number of pixels;
interpolation means for converting an image signal having a small number of pixels of said two image signals having a different number of pixels, into an image signal having the same signal type as an image signal having a large number of pixels by an interpolation process; and
signal synthesizer means for synthesizing said image signal having a large number of pixels and said image signal converted into the same signal type as said image signal having a large number of pixels by said interpolation means according to a synthesis control signal, said synthesis control signal being at least one of said image signal having a small number of pixels, said image signal converted into the same signal type as said image signal having a large number of pixels by said interpolation means, and said image signal having a large number of pixels,
wherein said coefficient generation means, said first coefficient generation means and said second coefficient generation means generate said coefficient k corresponding to each pixel of said synthesis control signal.

17. A solid-state imaging device comprising:
a solid-state imaging element for outputting two image signals which are different from each other in an exposure amount and the number of pixels;
interpolation means for converting an image signal having a small number of pixels of said two image signals having a different number of pixels, into an image signal having the same signal type as an image signal having a large number of pixels by an interpolation process; and
signal synthesizer means for synthesizing said image signal having a large number of pixels and said image signal converted into the same signal type as said image signal having a large number of pixels by said interpolation means according to a synthesis control signal, said synthesis control signal being at least one of said image signal having a small number of pixels, said image signal converted into the same signal type as said image signal having a large number of pixels by said interpolation means, and said image signal having a large number of pixels,
wherein said coefficient-generation means, said first coefficient generation means and said second coefficient generation means generate said coefficient k corresponding to a block consisting of a plurality of pixels of said synthesis control signal.

18. A solid-state imaging device comprising:
a solid-state imaging element for outputting two image signals which are different from each other in an exposure amount and the number of pixels;
interpolation means for converting an image signal having a small number of pixels of said two image signals having a different number of pixels, into an image signal having the same signal type as an image signal having a large number of pixels by an interpolation process; and
signal synthesizer means for synthesizing said image signal having a large number of pixels and said image signal converted into the same signal type as said image signal having a large number of pixels by said interpolation means according to a synthesis control signal, said synthesis control signal being at least one of said image signal having a small number of pixels, said image signal converted into the same signal type as said image signal having a large number of pixels by said interpolation means, and said image signal having a large number of pixels,
wherein said coefficient generation means, said first coefficient generation means and said second coefficient generation means generate said coefficient k according to at least one of the mean value, maximum value, minimum value and intermediate value of each signal level in the block consisting of a plurality of pixels of the synthesis control signal.

19. A solid-state imaging device comprising:
a solid-state imaging element for outputting two image signals which are different from each other in an exposure amount and the number of pixels;
interpolation means for converting an image signal having a small number of pixels of said two image signals having a different number of pixels, into an image signal having the same signal type as an image signal having a large number of pixels by an interpolation process; and
signal synthesizer means for synthesizing said image signal having a large number of pixels and said image signal converted into the same signal type as said image signal having a large number of pixels by said interpolation means according to a synthesis control signal, said synthesis control signal being at least one of said image signal having a small number of pixels, said image signal converted into the same signal type as said image signal having a large number of pixels by said interpolation means, and said image signal having a large number of pixels,
wherein said coefficient generation means, said first coefficient generation means and said second coefficient generation means generate a certain coefficient k according to a signal level of a pixel existing at a specific position in a block of each signal level in a block consisting of a plurality of pixels of said synthesis control signal.

20. A solid-state imaging device comprising:
a solid-state imaging element for outputting two image signals which are different from each other in an exposure amount and the number of pixels;
interpolation means for converting an image signal having a small number of pixels of said two image signals having a different number of pixels, into an image signal having the same signal type as an image signal having a large number of pixels by an interpolation process; and
signal synthesizer means for synthesizing said image signal having a large number of pixels and said image signal converted into the same signal type as said image signal having a large number of pixels by said interpolation means according to a synthesis control signal, said synthesis control signal being at least one of said image signal having a small number of pixels, said image signal converted into the same signal type as said image signal having a large number of pixels by said interpolation means, and said image signal having a large number of pixels,
wherein of said two image signals which are different from each other in said exposure amount and said number of pixels, said image signal having a small number of pixels is a short-time exposure signal, while said image signal having a large number of pixels is a long-time exposure signal.

21. A solid-state imaging device comprising:
a solid-state imaging element for outputting two image signals which are different from each other in an exposure amount and the number of pixels;

interpolation means for converting an image signal having a small number of pixels of said two image signals having a different number of pixels, into an image signal having the same signal type as an image signal having a large number of pixels by an interpolation process; and signal synthesizer means for synthesizing said image signal having a large number of pixels and said image signal converted into the same signal type as said image signal having a large number of pixels by said interpolation means according to a synthesis control signal, said synthesis control signal being at least one of said image signal having a small number of pixels, said image signal converted into the same signal type as said image signal having a large number of pixels by said interpolation means, and said image signal having a large number of pixels, wherein of said two image signals which are different from each other in said exposure amount and said number of pixels, said image signal having a small number of pixels is a long-time exposure signal, while said image signal having a large number of pixels is a short-time exposure signal.

* * * * *